United States Patent

[11] 3,566,762

[72] Inventors Leslie Vadas
Los Gatos;
Robert W. Drake, San Jose, Calif.
[21] Appl. No. 711,967
[22] Filed Mar. 11, 1968
[45] Patented Mar. 2, 1971
Division of Ser. No. 461,738 filed June 7, 1965, Pat. No. 3,456,419
[73] Assignee FMC Corporation
San Jose, Calif.

[54] CARTON FORMING APPARATUS
24 Claims, 81 Drawing Figs.
[52] U.S. Cl............................................. 93/44.1, 93/59
[51] Int. Cl.......................................... B31b 1/02
[50] Field of Search.............................. 93/44.1, 59

[56] References Cited
UNITED STATES PATENTS
| | | | |
|---|---|---|---|
| 3,207,049 | 9/1965 | Monroe et al. .............. | 93/44.1 |
| 3,252,386 | 5/1966 | Reimers ....................... | 93/44.1 |
| 3,382,775 | 5/1968 | Allen............................. | 93/44.1 |
| 3,405,505 | 10/1968 | Mistarz......................... | 93/44.1X |

Primary Examiner—Bernard Stickney
Attorneys—Francis W. Anderson and C. E. Tripp

ABSTRACT: Carton forming apparatus which is adjustable to handle thermoplastic cartons of different sizes. A plurality of adjustable mandrels on an intermittently driven turret receives folded carton blanks from a magazine with the bottom closure flaps projecting outward of the mandrels. The intermittently driven turret then moves the cartons past apparatus wherein thermoplastic material on the bottom closure flaps is heated to a bonding temperature, the flaps are folded to a closed position, sealing pressure is applied to the flaps, and the cartons with the flaps sealed are stripped from the mandrels.

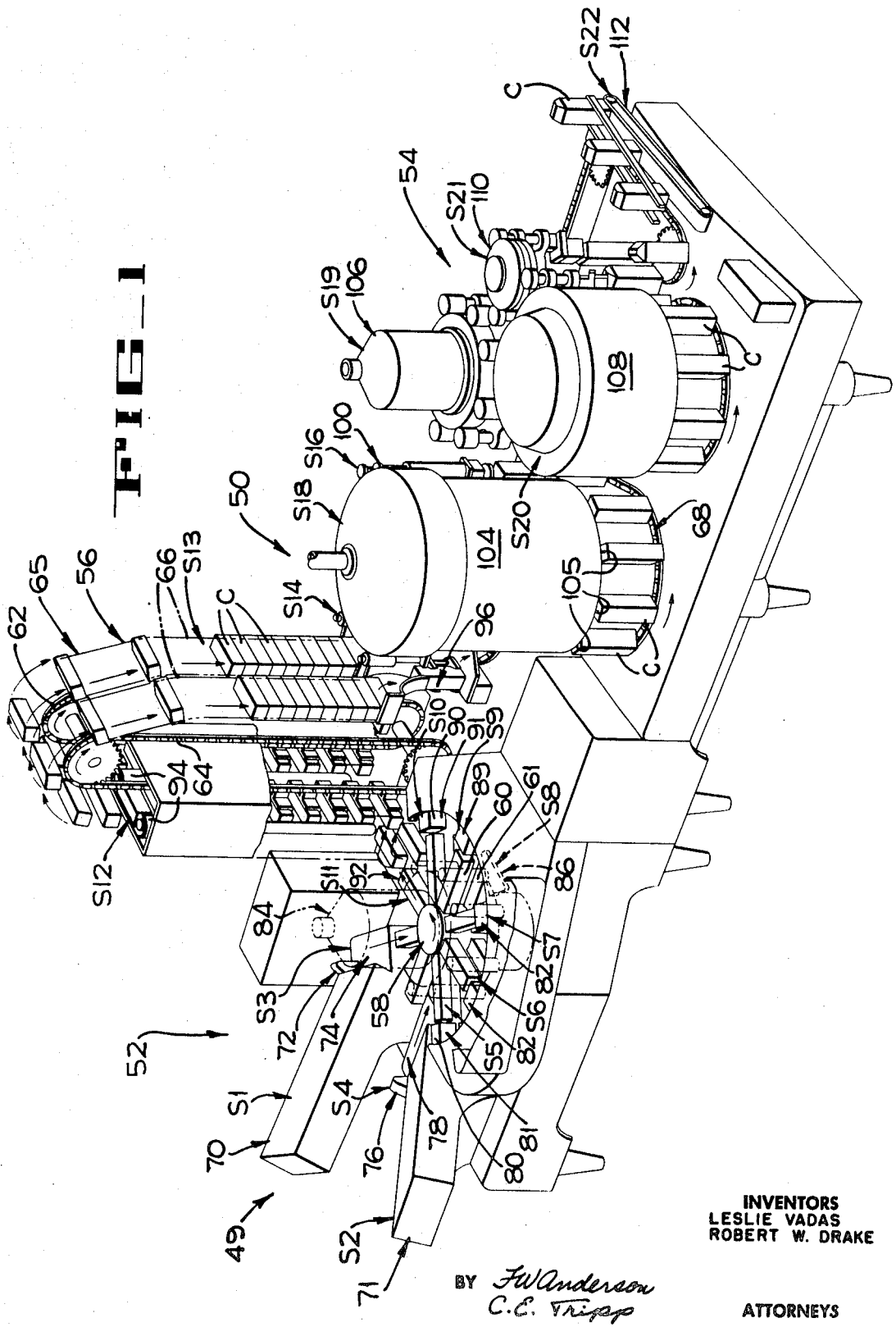

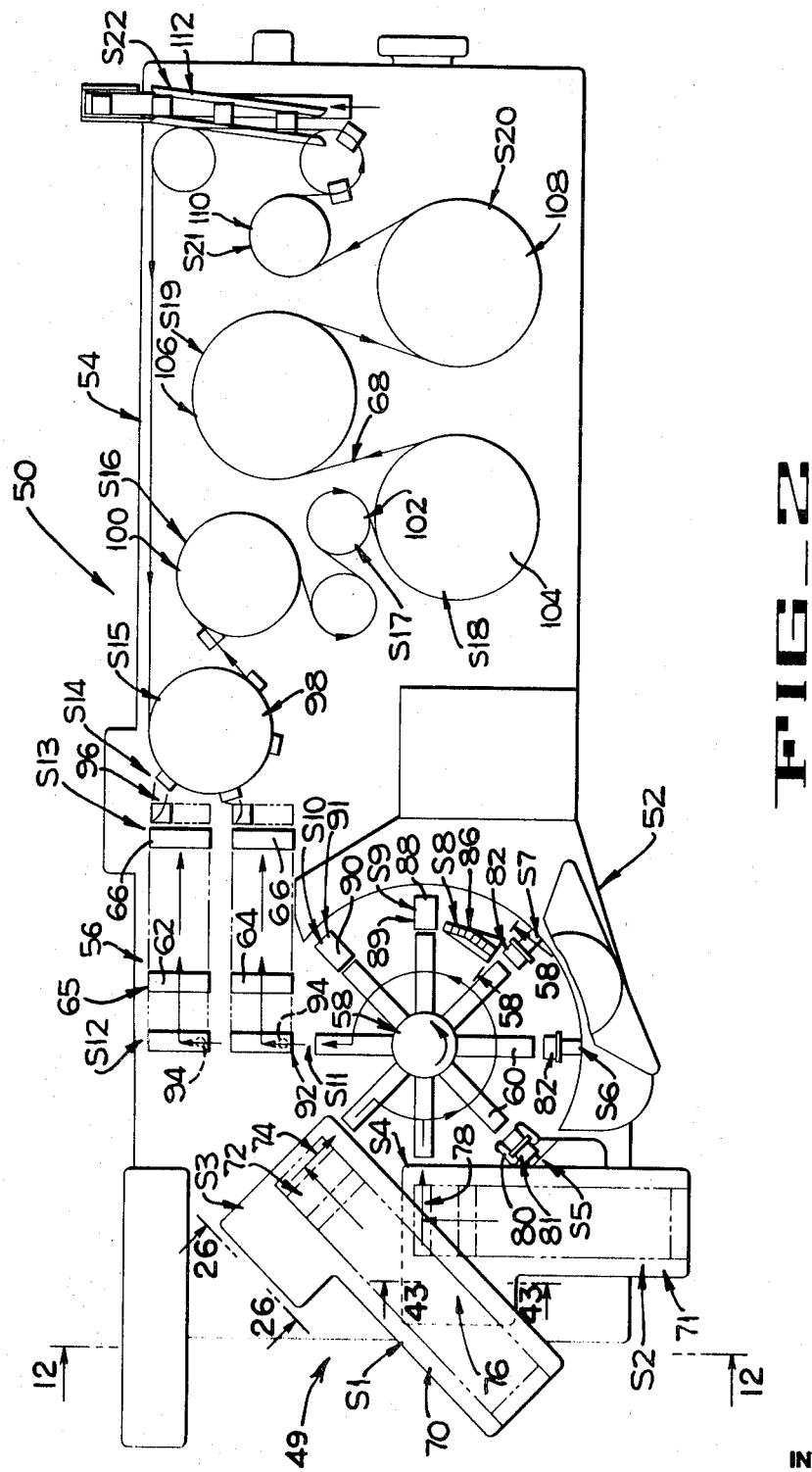

Patented March 2, 1971
3,566,762
40 Sheets-Sheet 3
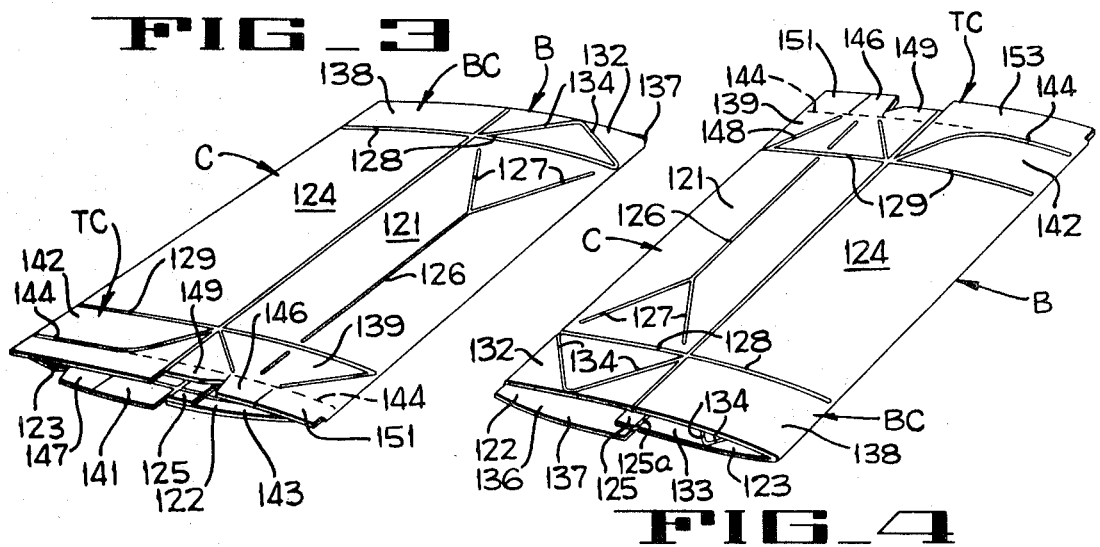
FIG_3
FIG_4
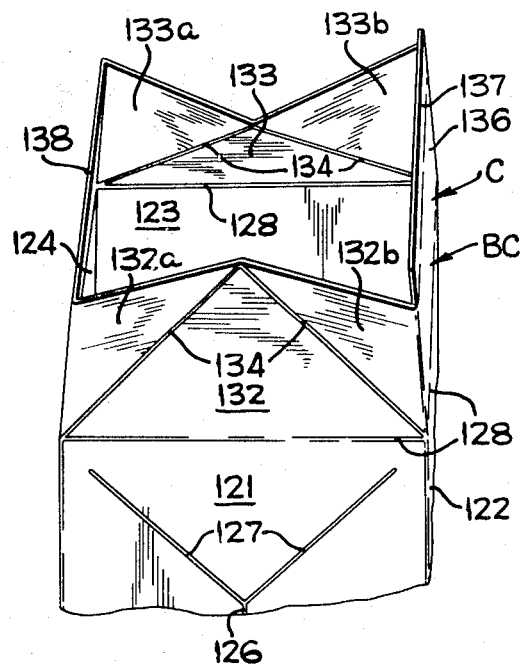
FIG_5
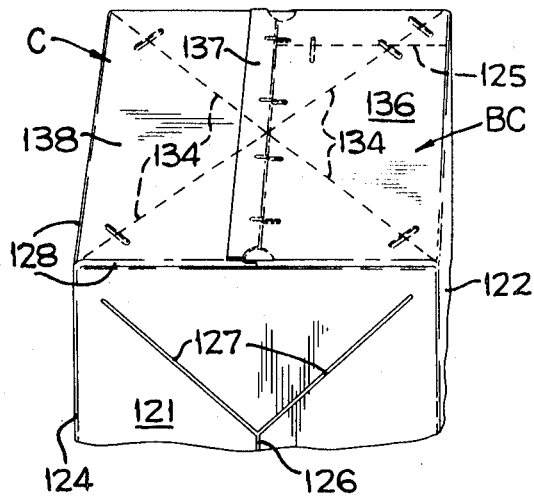
FIG_6
INVENTORS
LESLIE VADAS
ROBERT W. DRAKE
BY *F.W. Anderson*
*C.E. Tripp*
ATTORNEYS

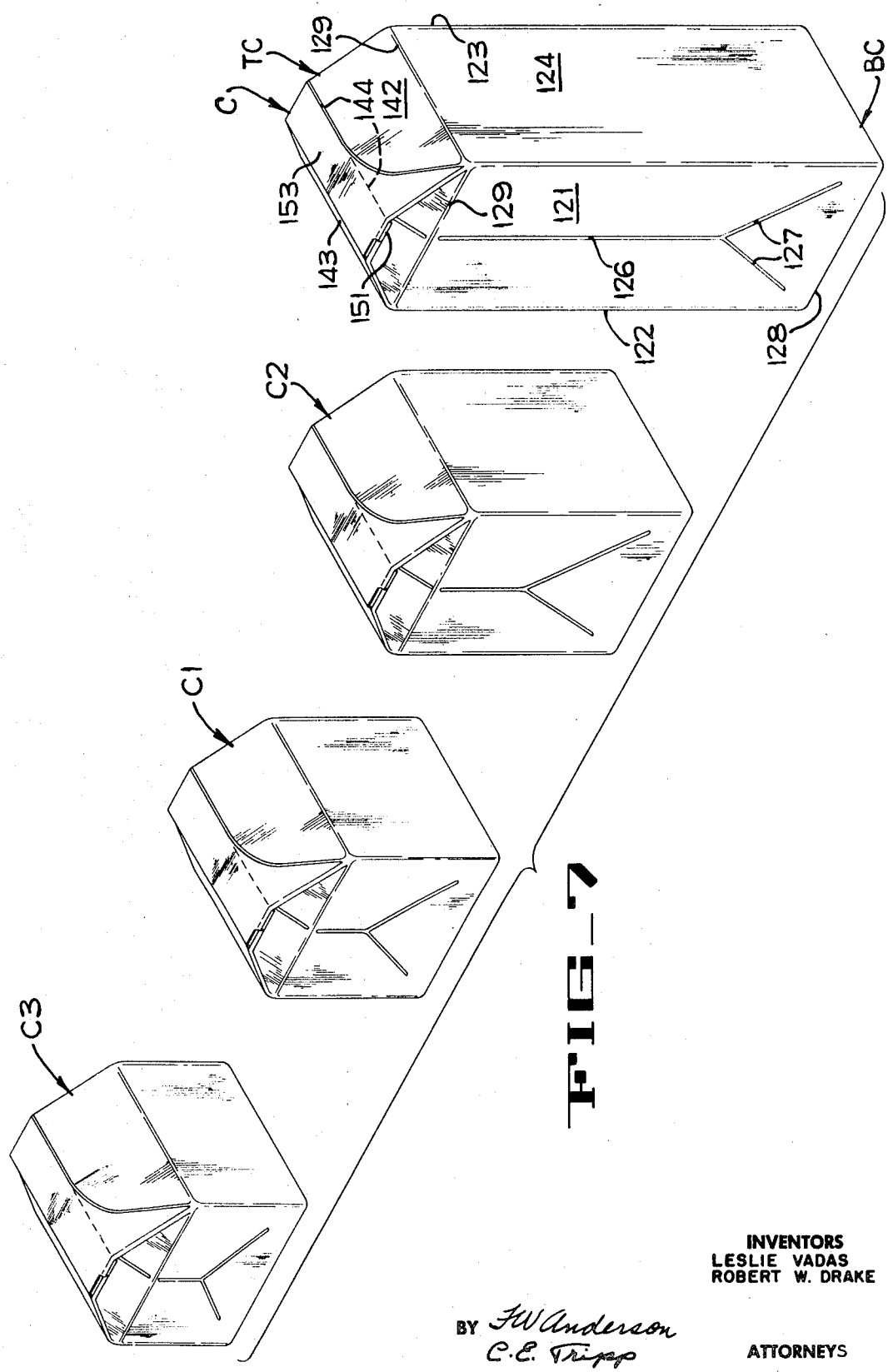

Patented March 2, 1971
3,566,762
40 Sheets-Sheet 5
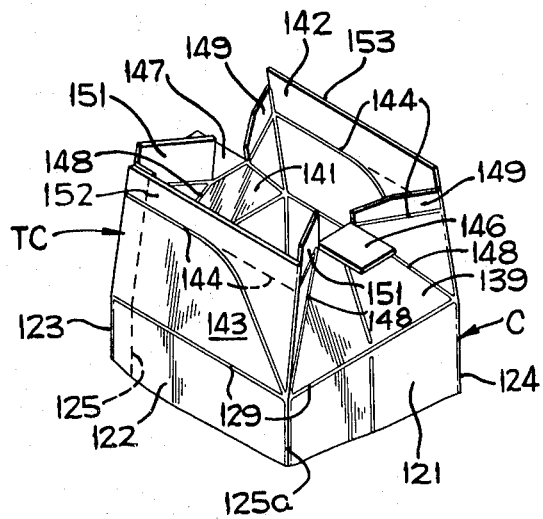
FIG_8
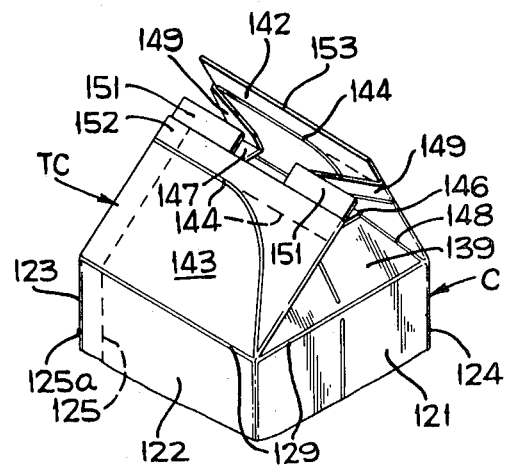
FIG_9
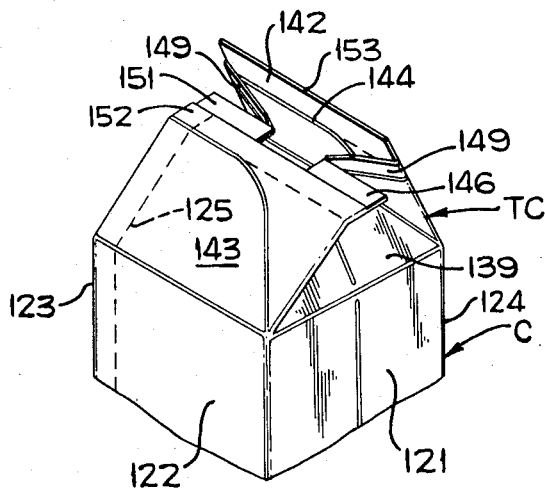
FIG_10
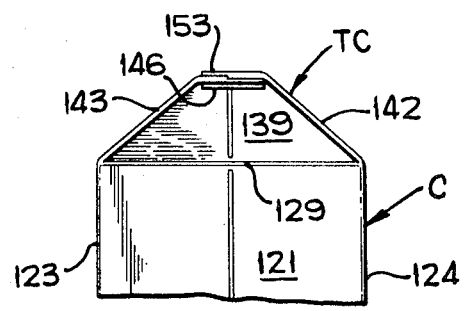
FIG_11
INVENTORS
LESLIE VADAS
ROBERT W. DRAKE
BY J.W. Anderson
C. C. Trijayo
ATTORNEYS

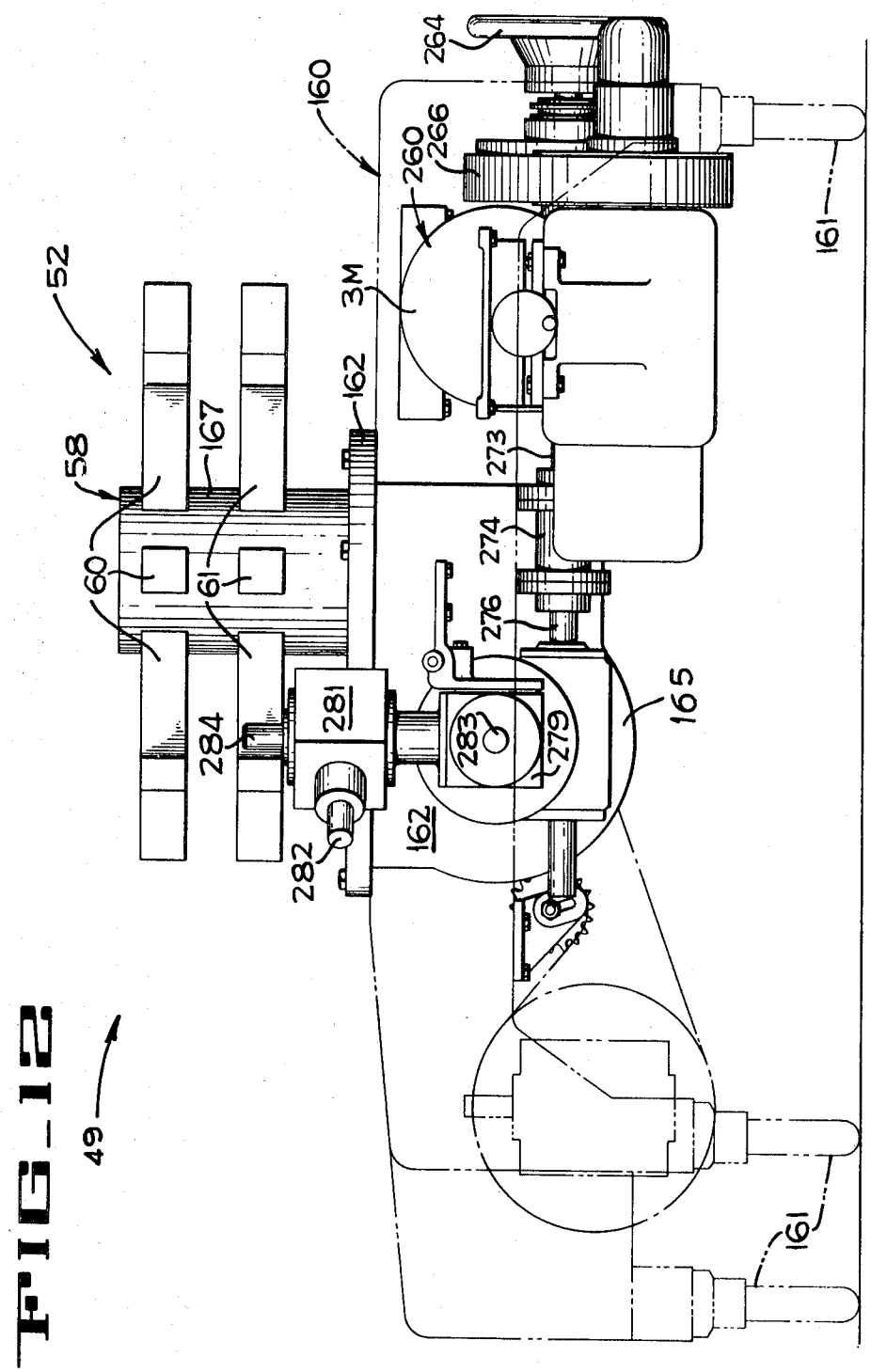

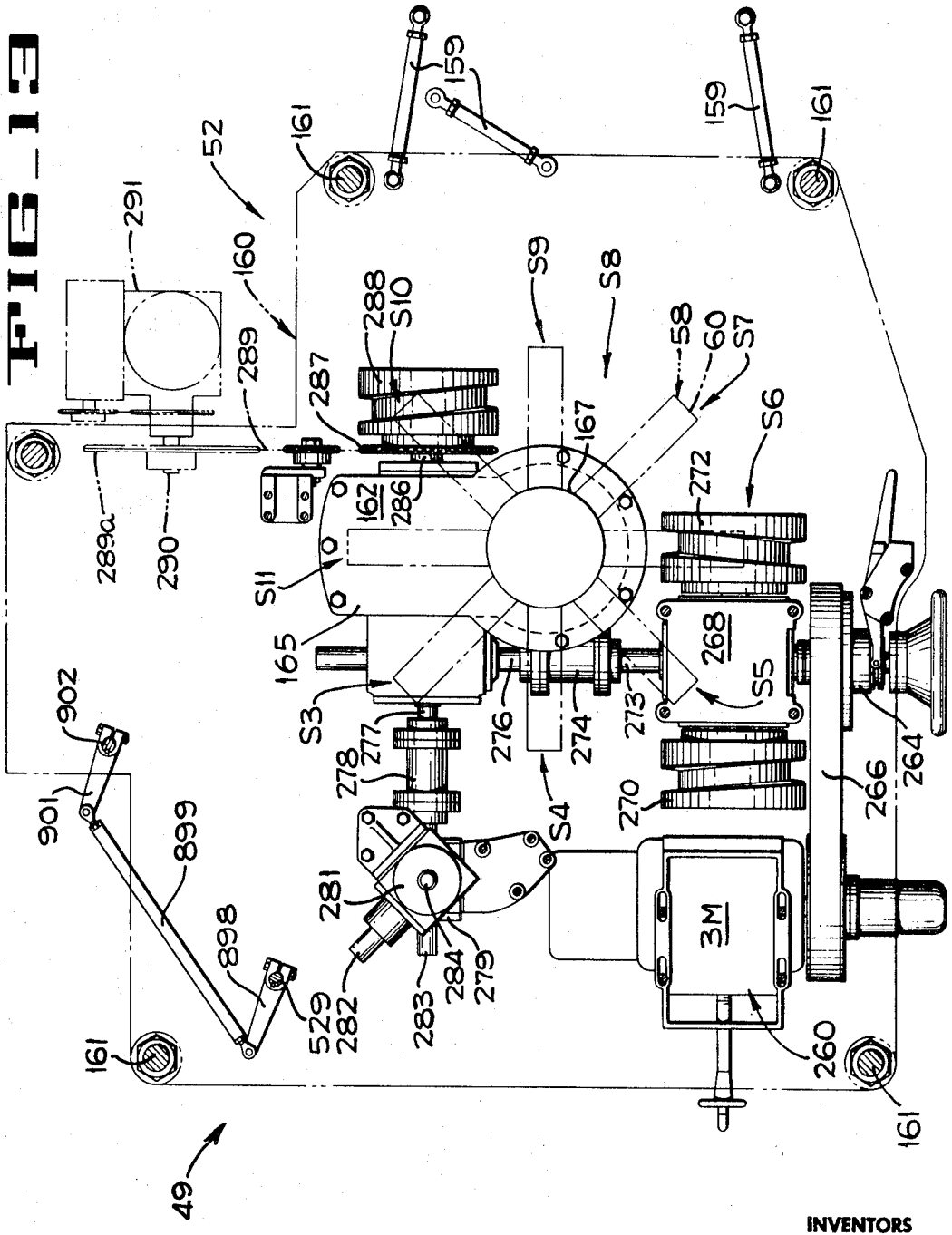

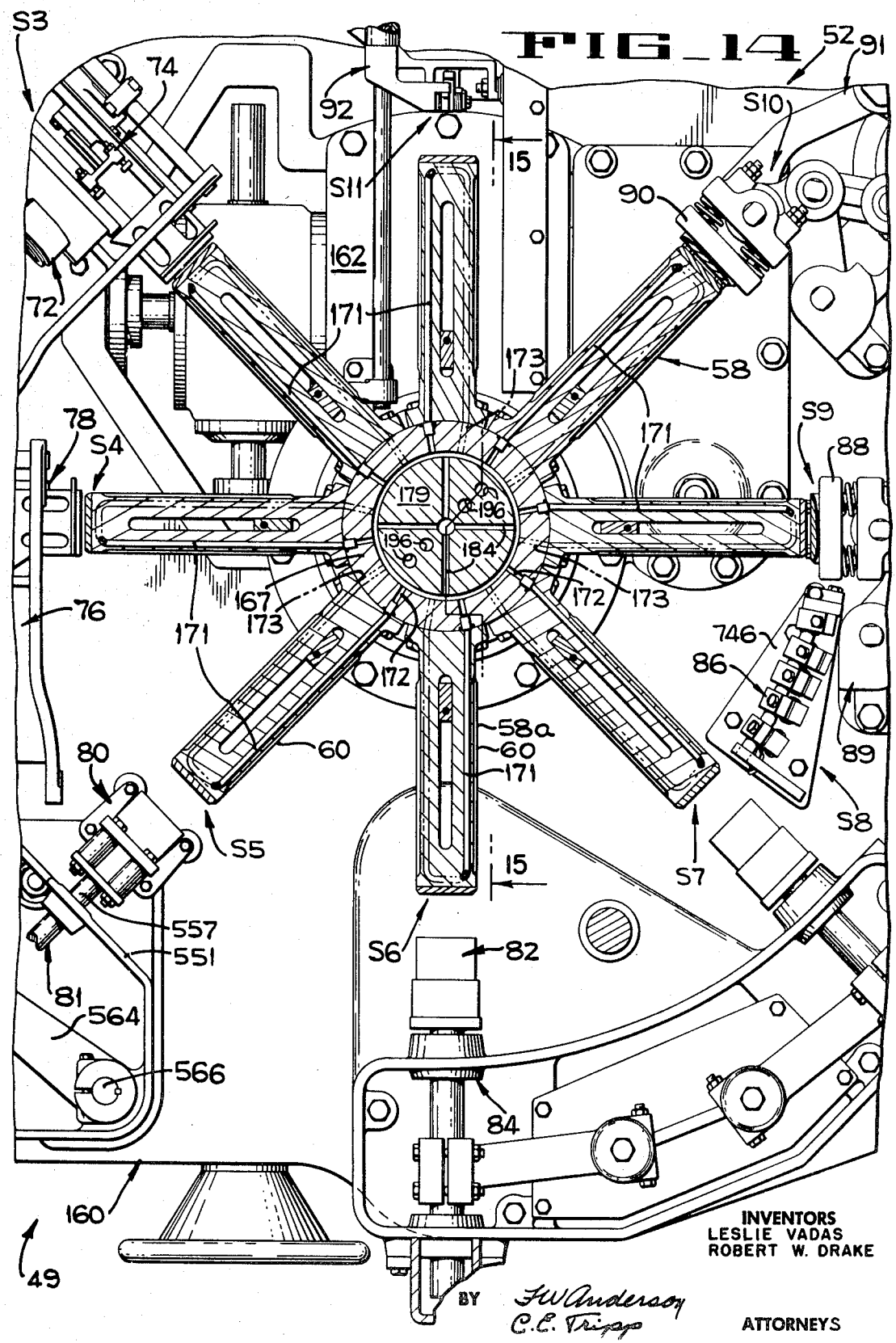

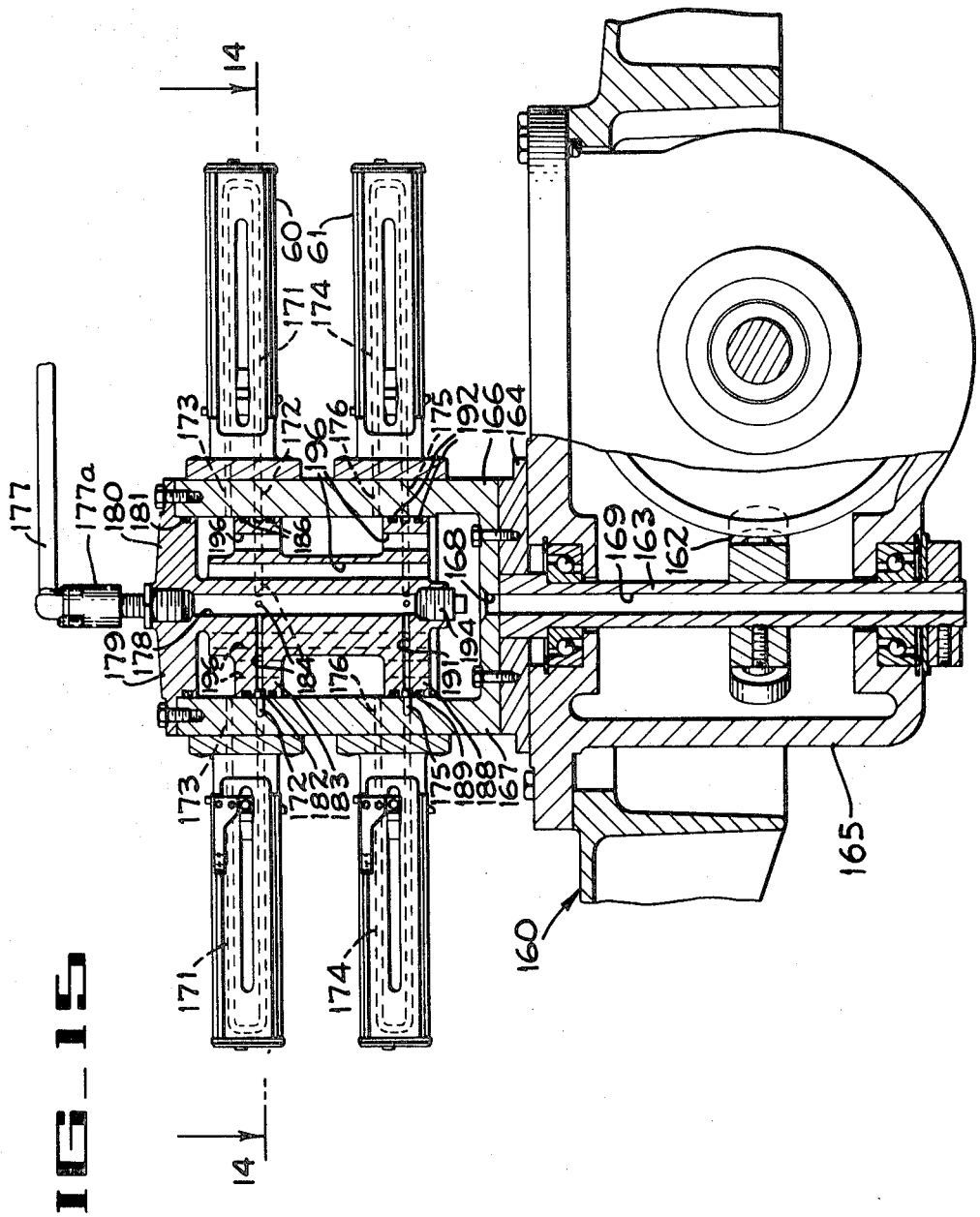

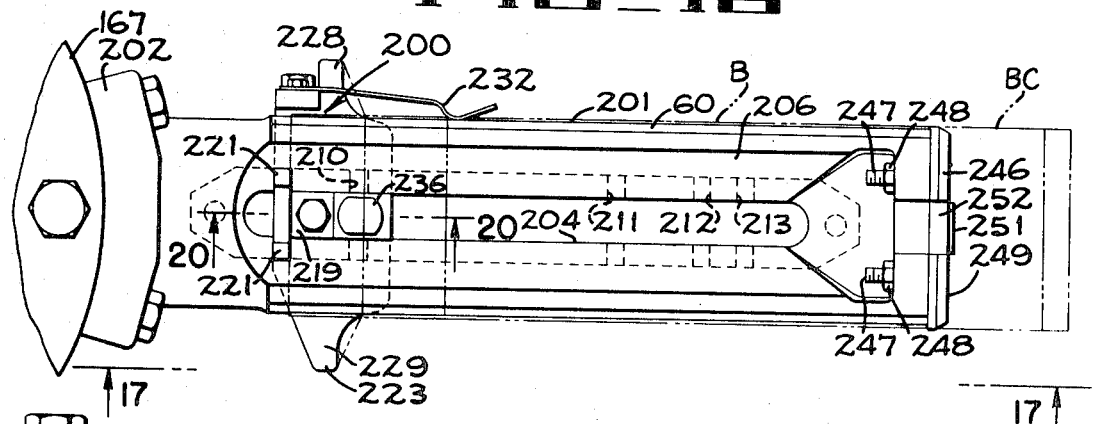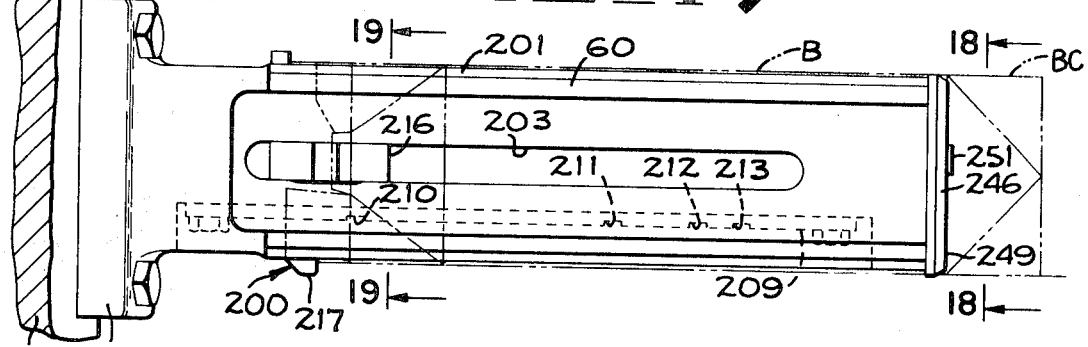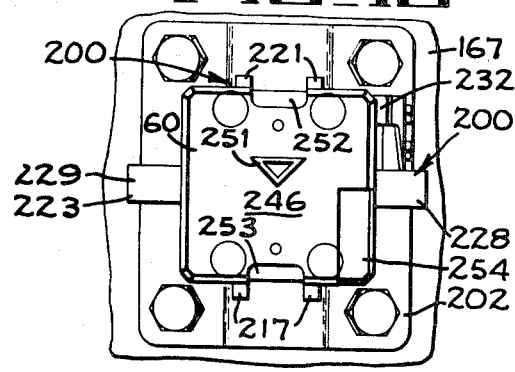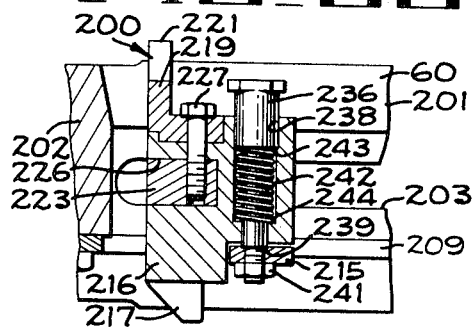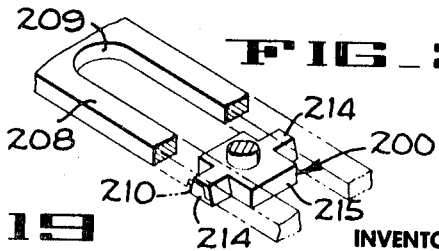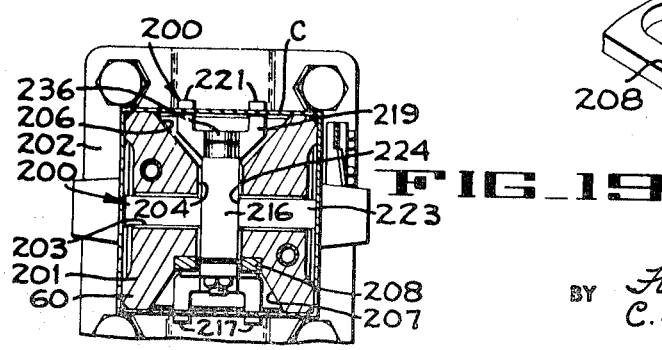

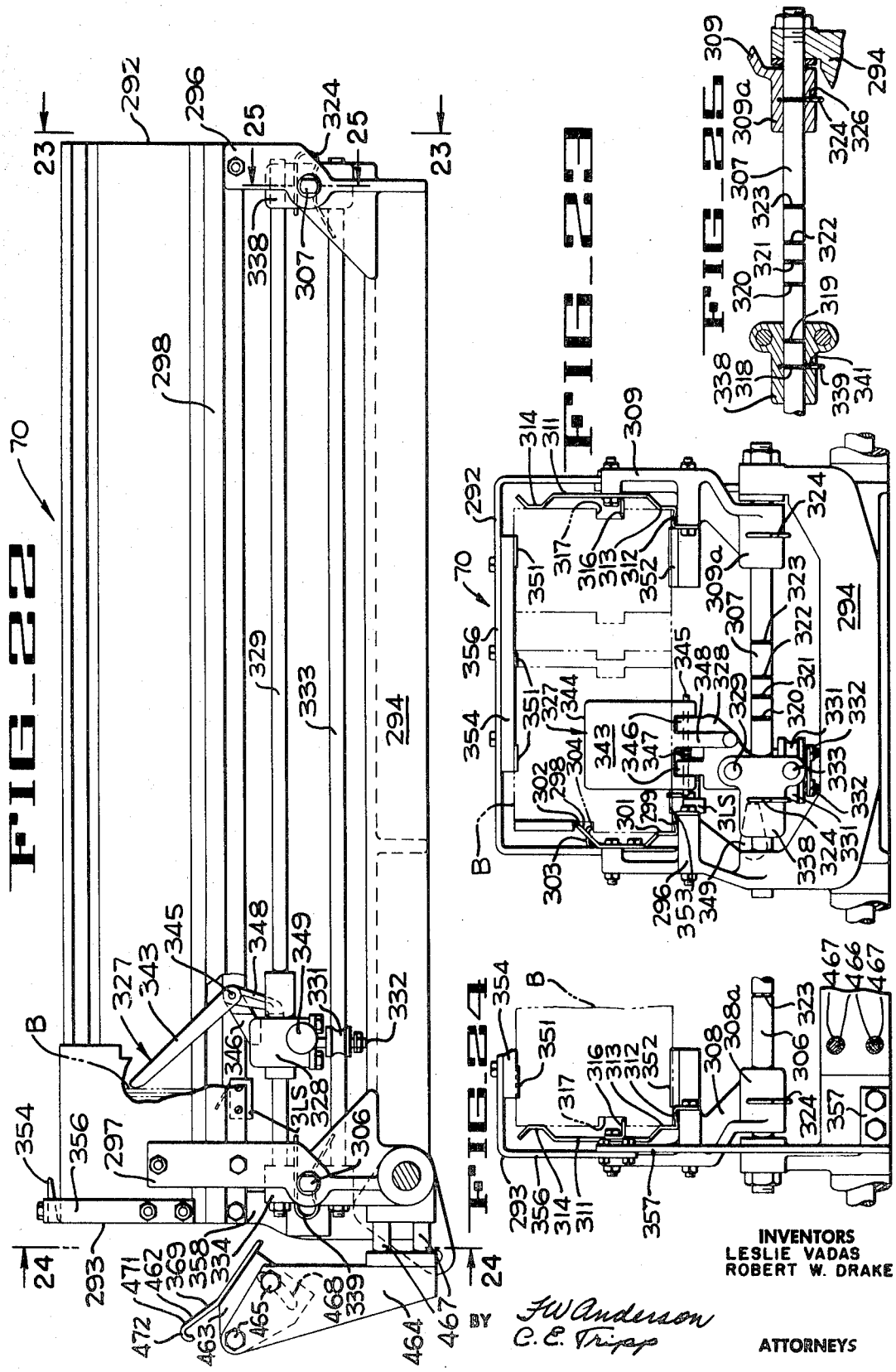

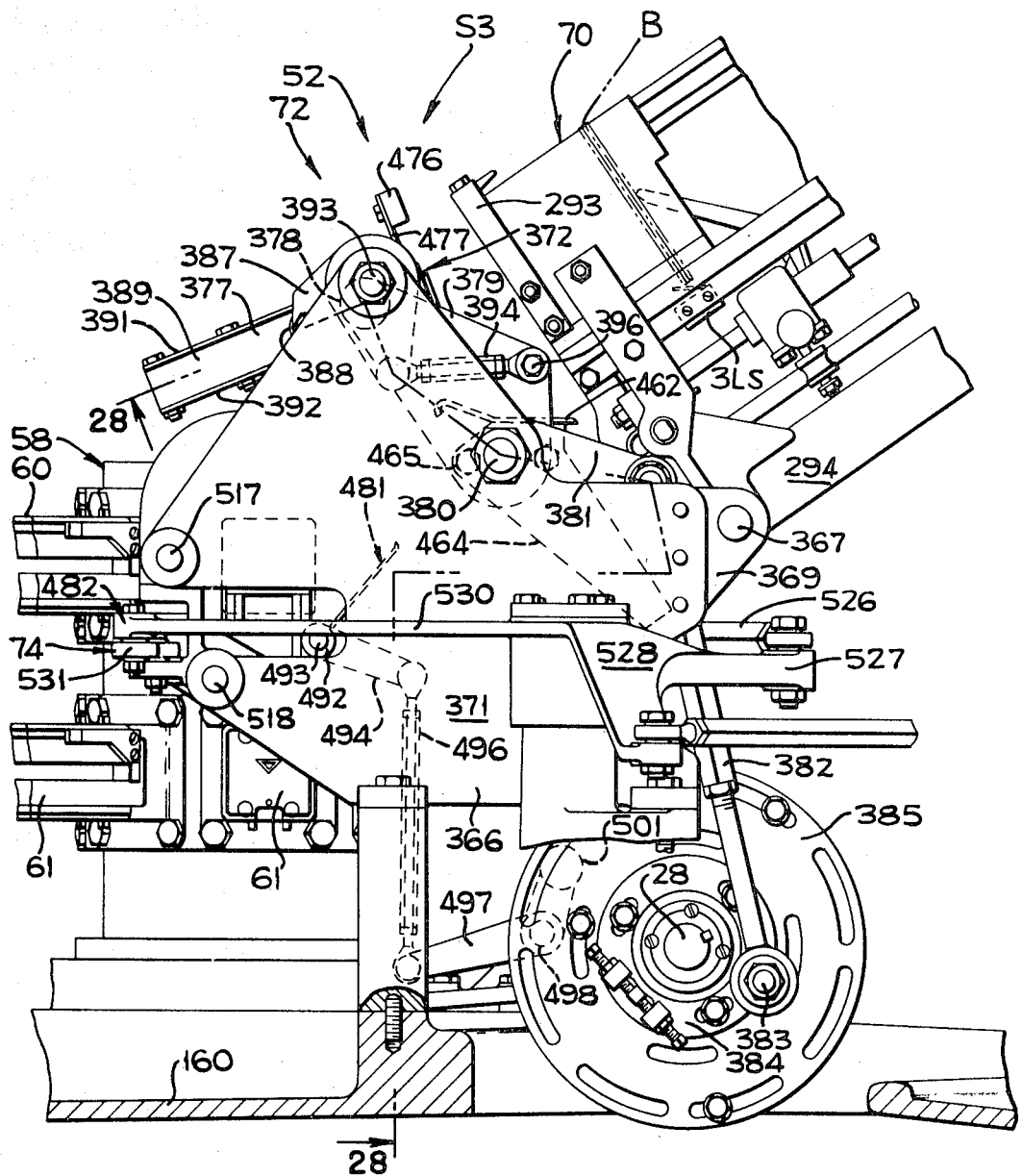
FIG_26

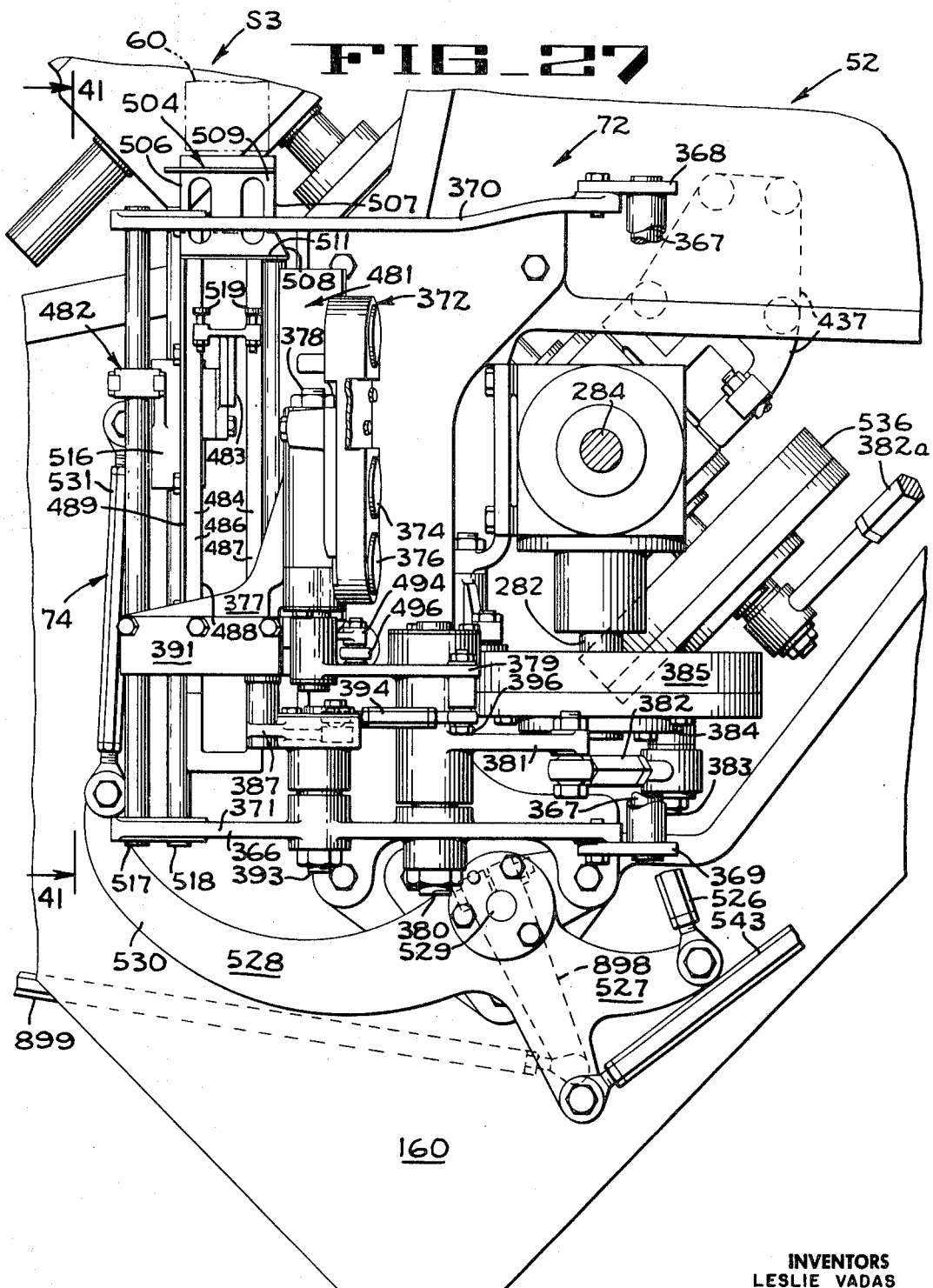

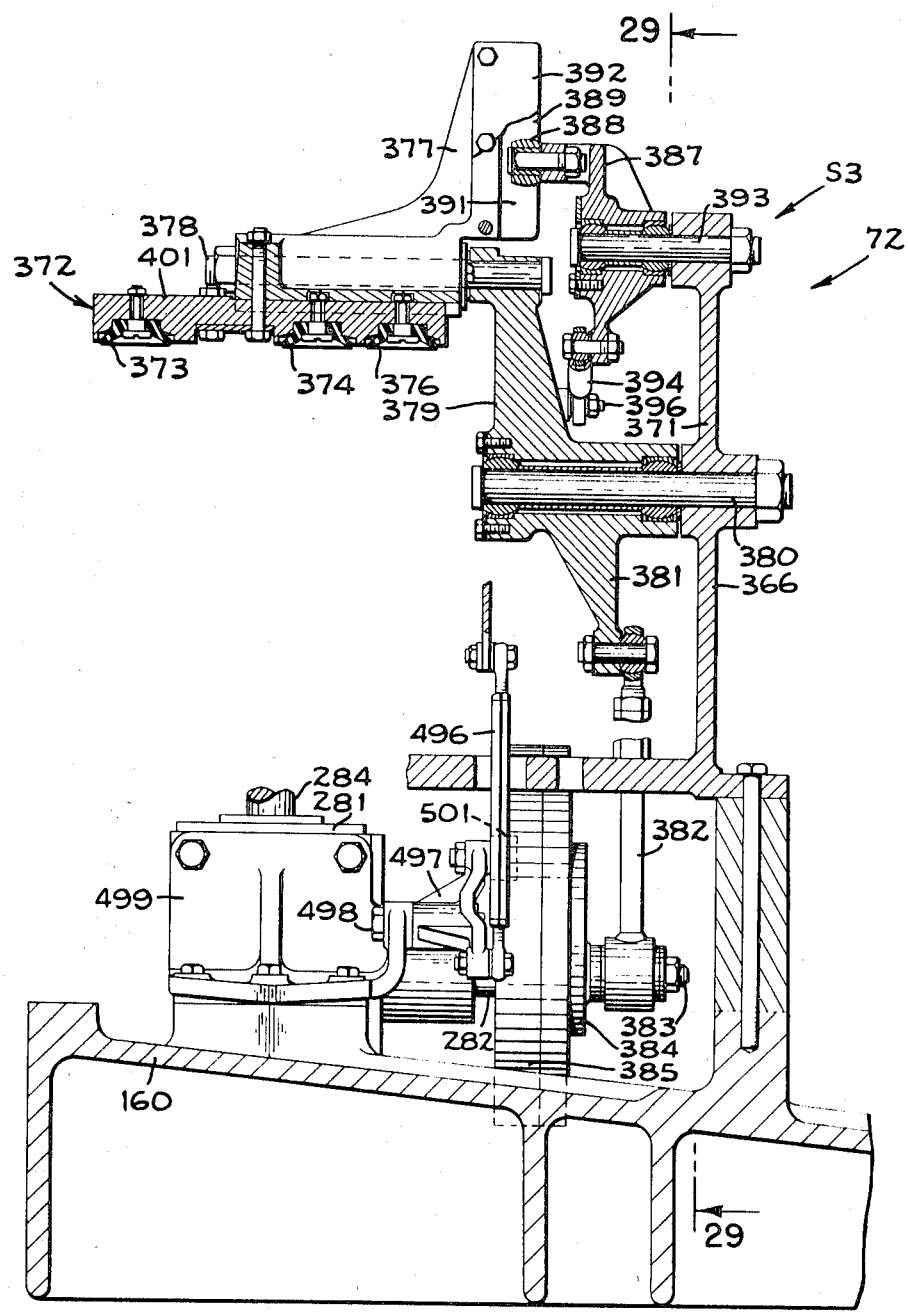

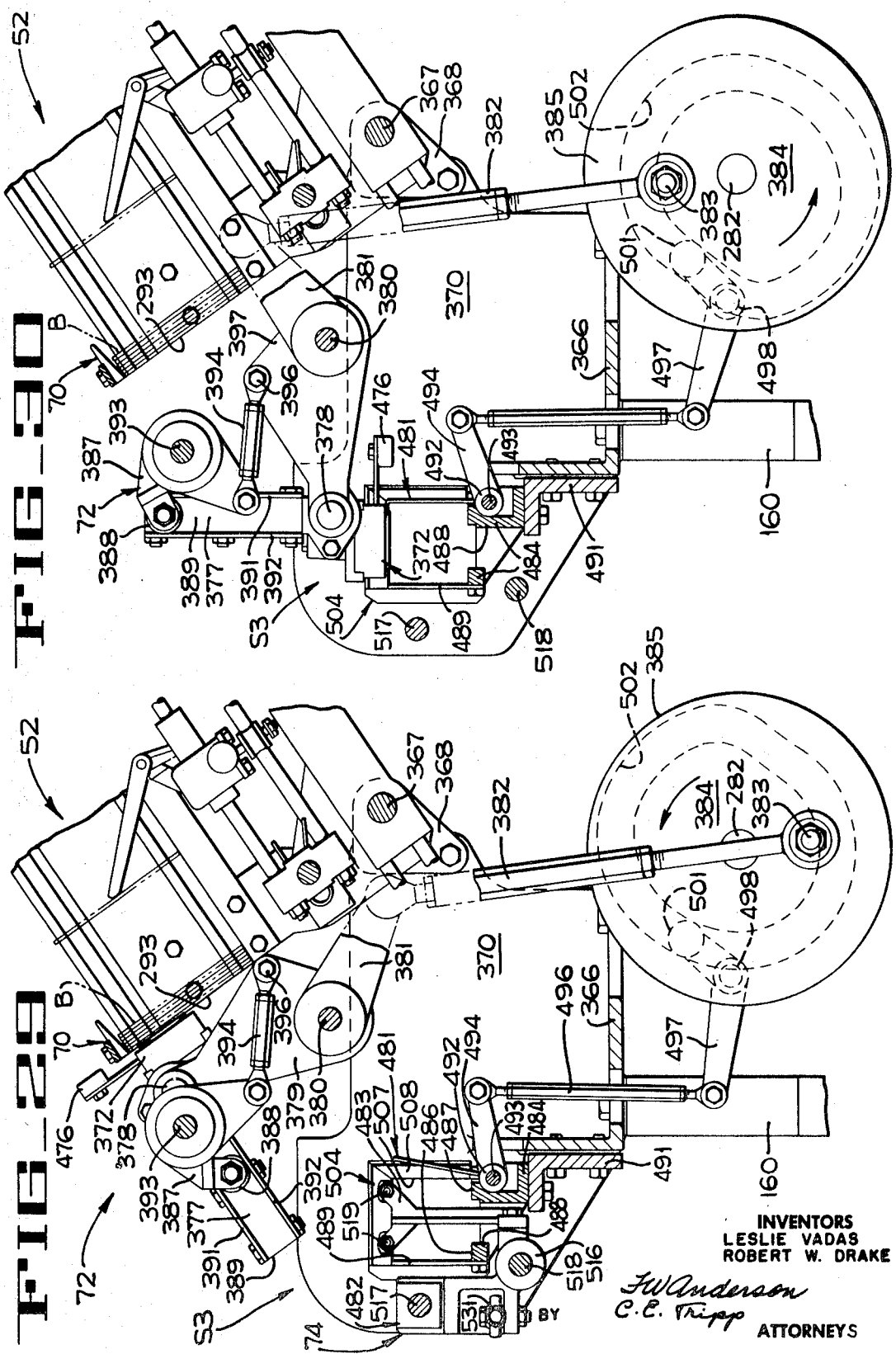

Patented March 2, 1971
3,566,762
40 Sheets-Sheet 16
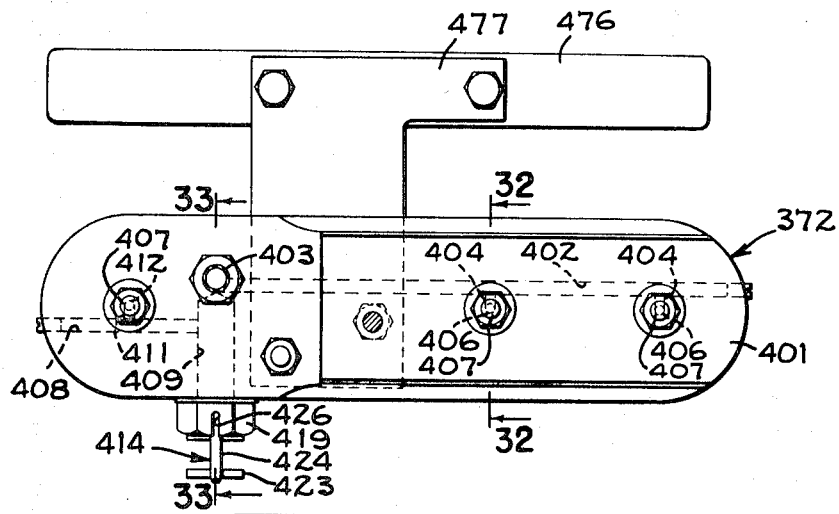
FIG_31
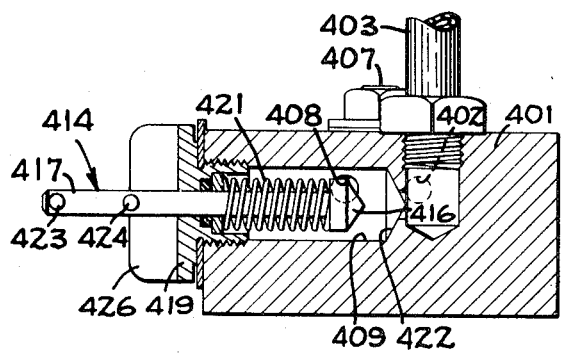
FIG_33
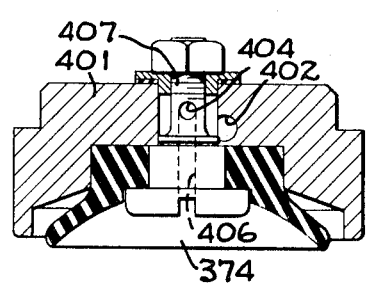
FIG_32
INVENTORS
LESLIE VADAS
ROBERT W. DRAKE
BY J.W.Anderson
C.E.Tripp
ATTORNEYS Patented March 2, 1971
3,566,762
40 Sheets-Sheet 17
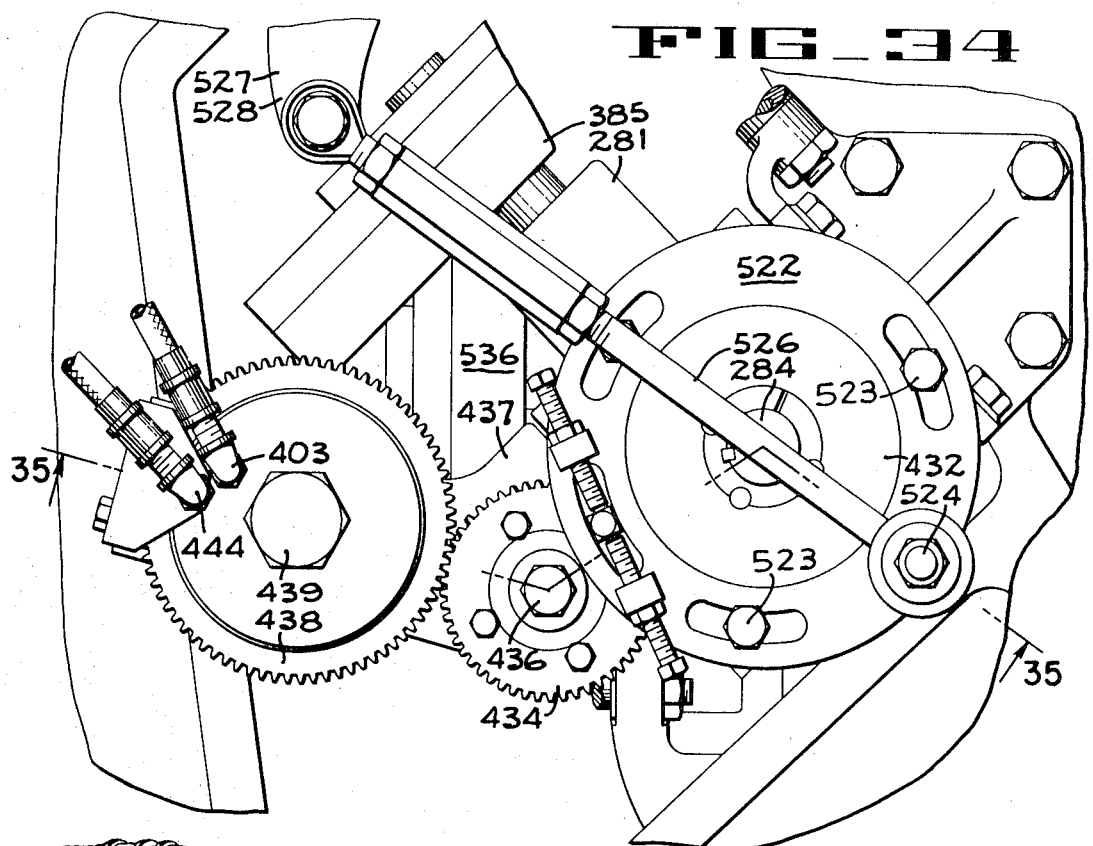
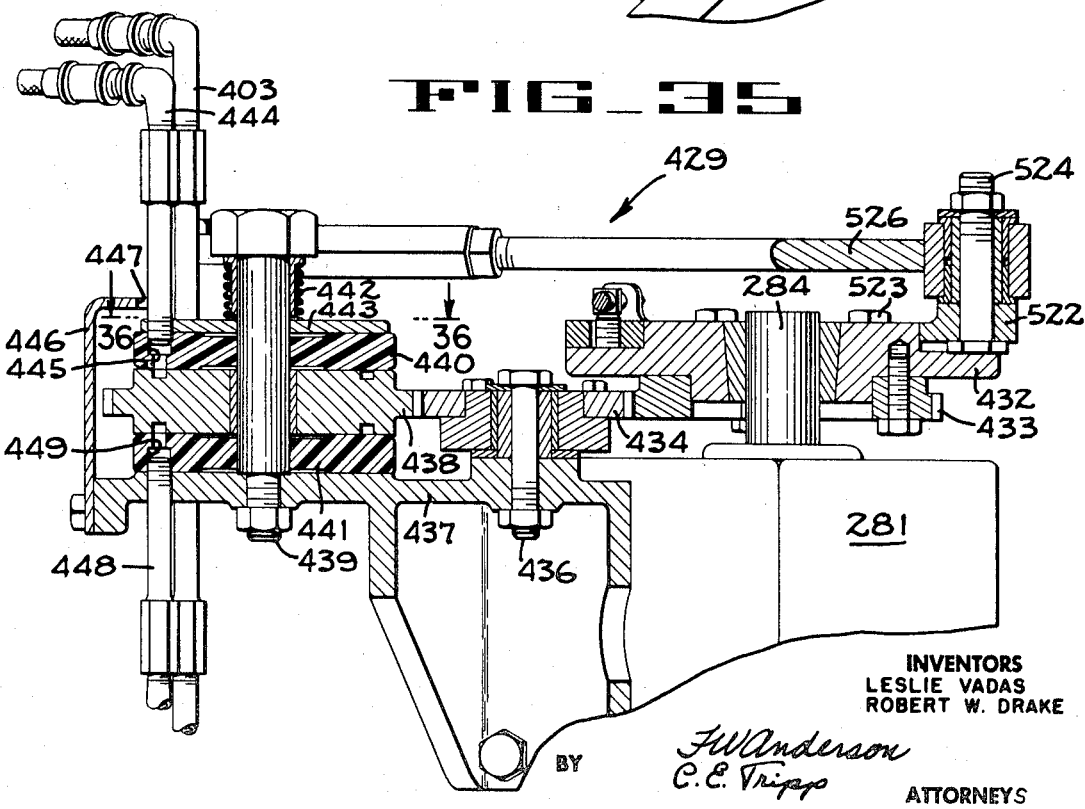
INVENTORS
LESLIE VADAS
ROBERT W. DRAKE
BY J.W. Anderson
C.E. Tripp
ATTORNEYS

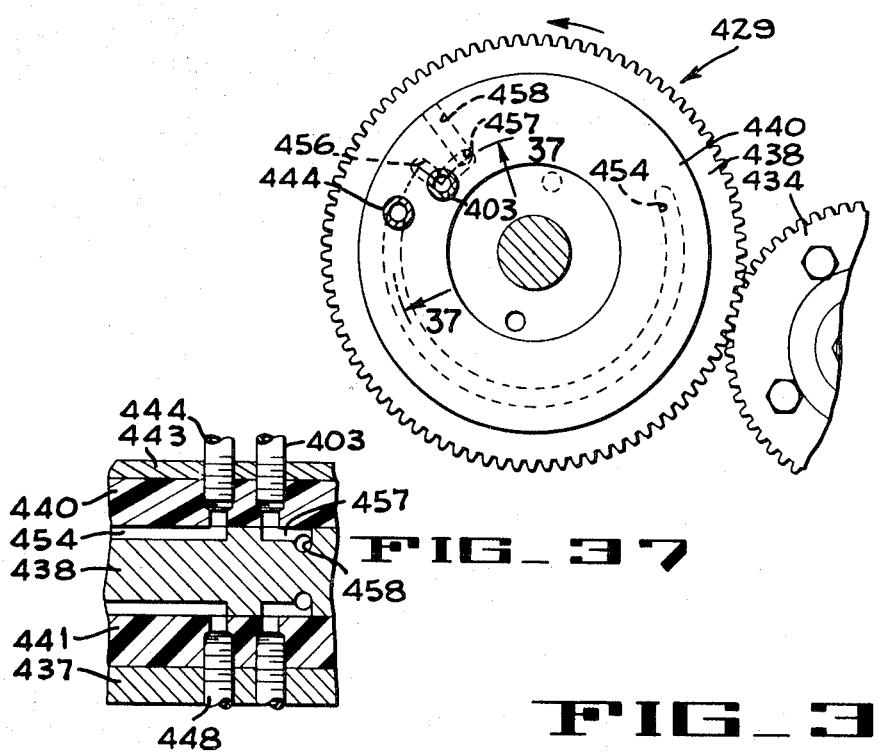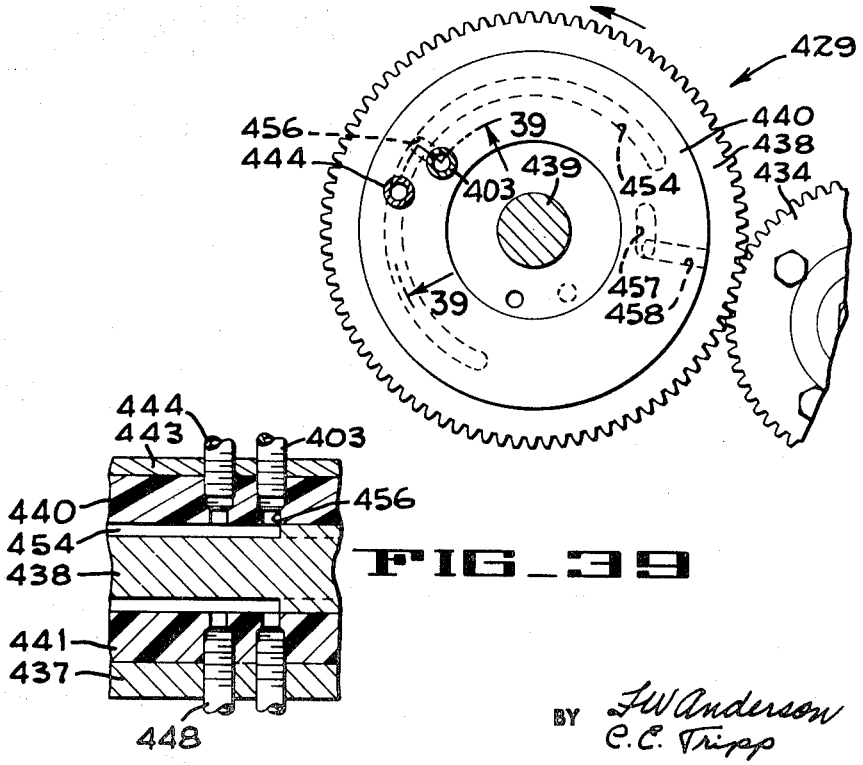

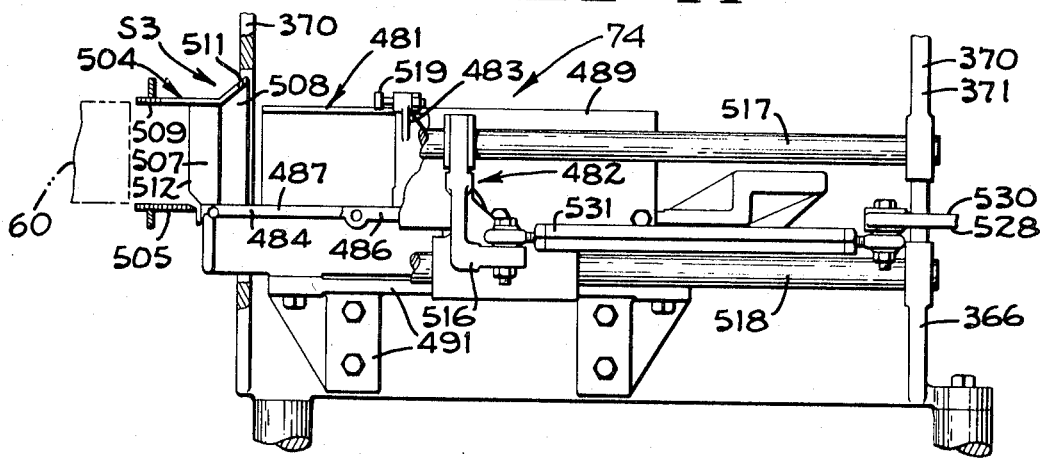
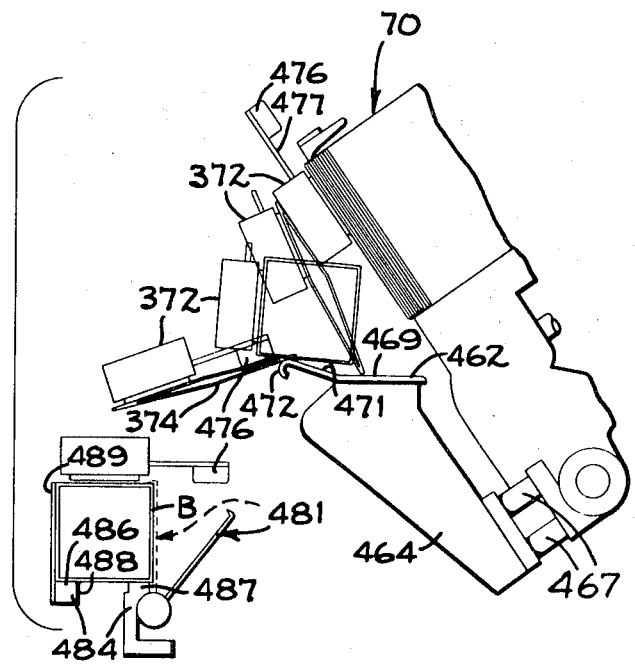

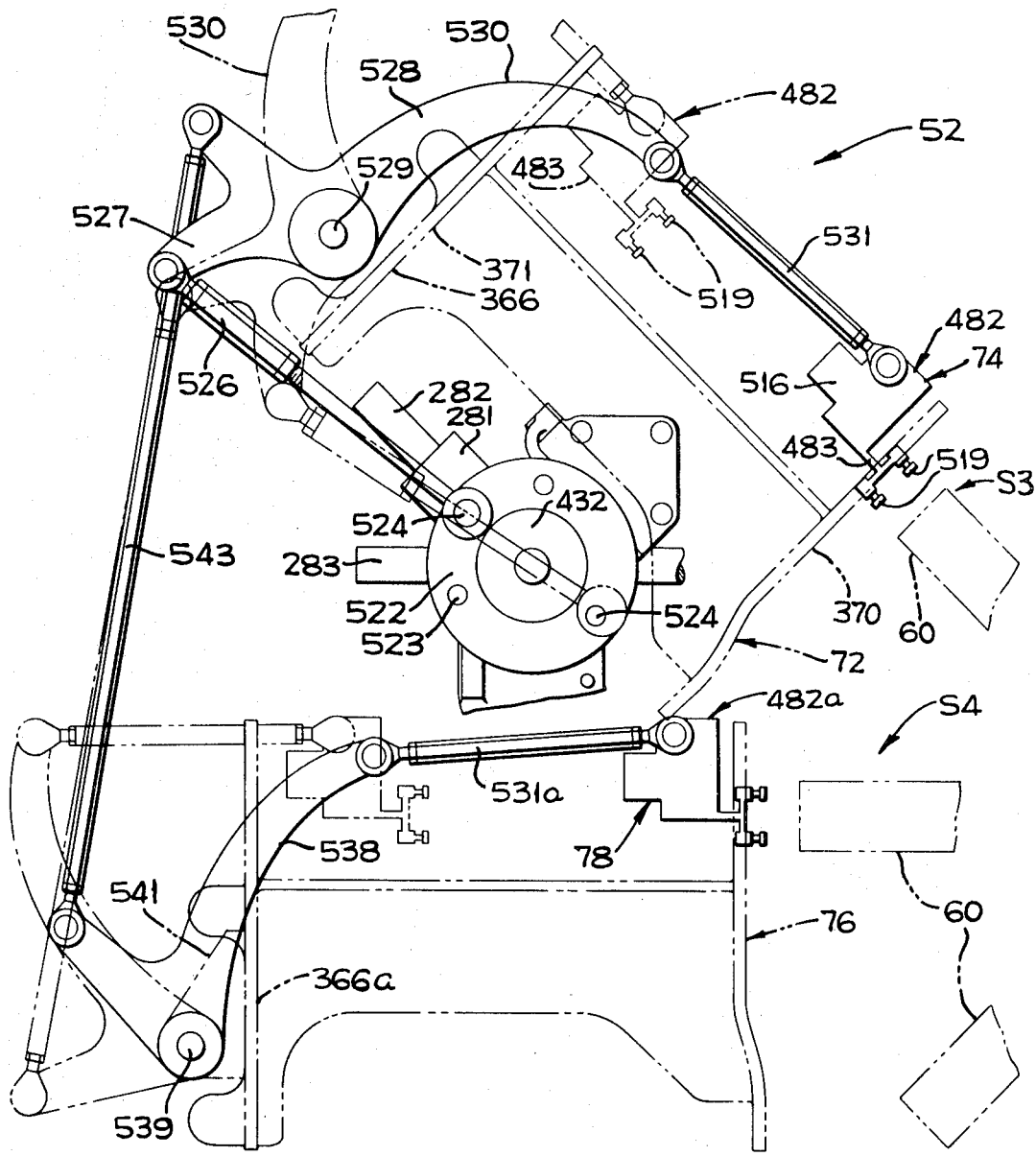
FIG_42

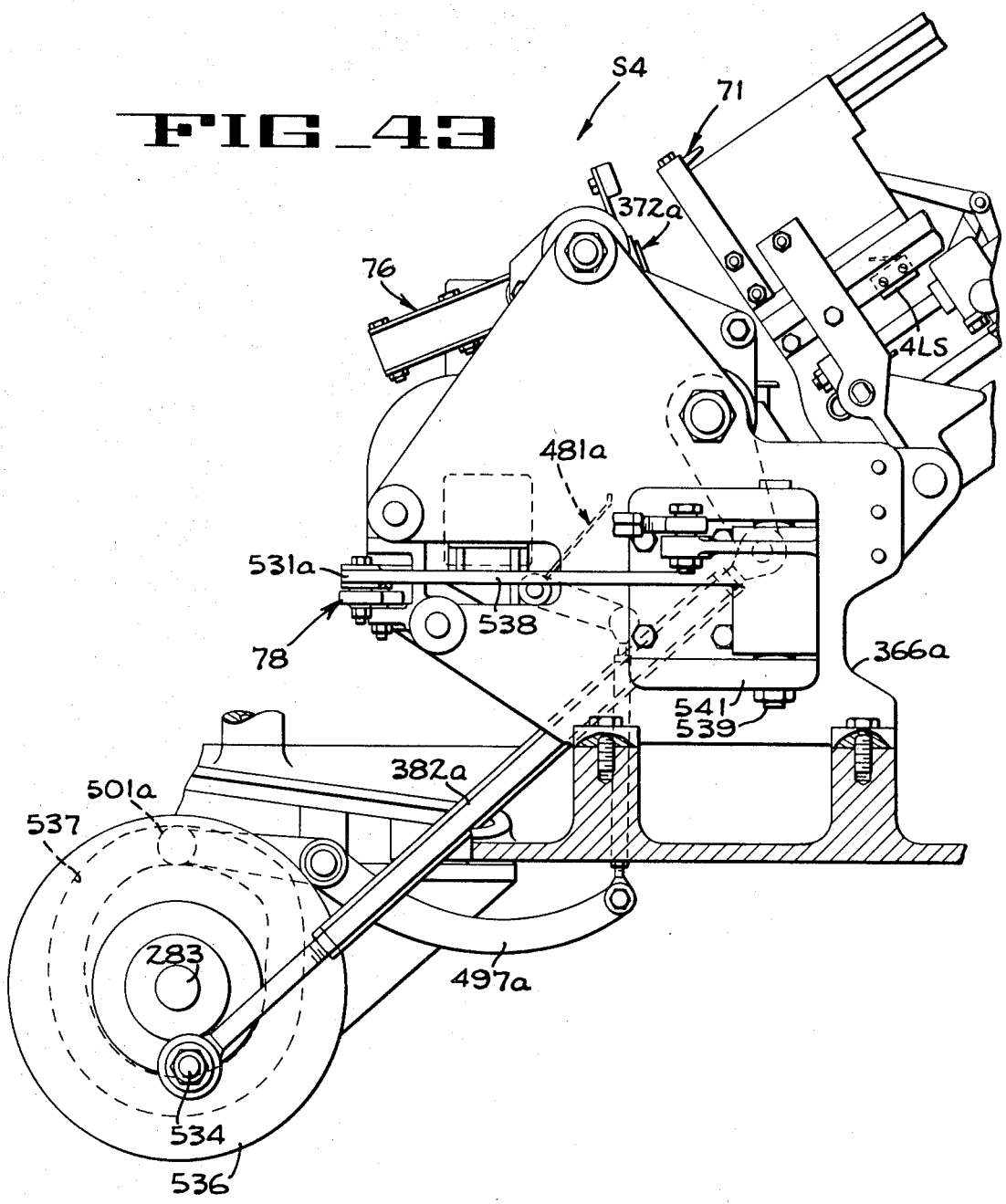

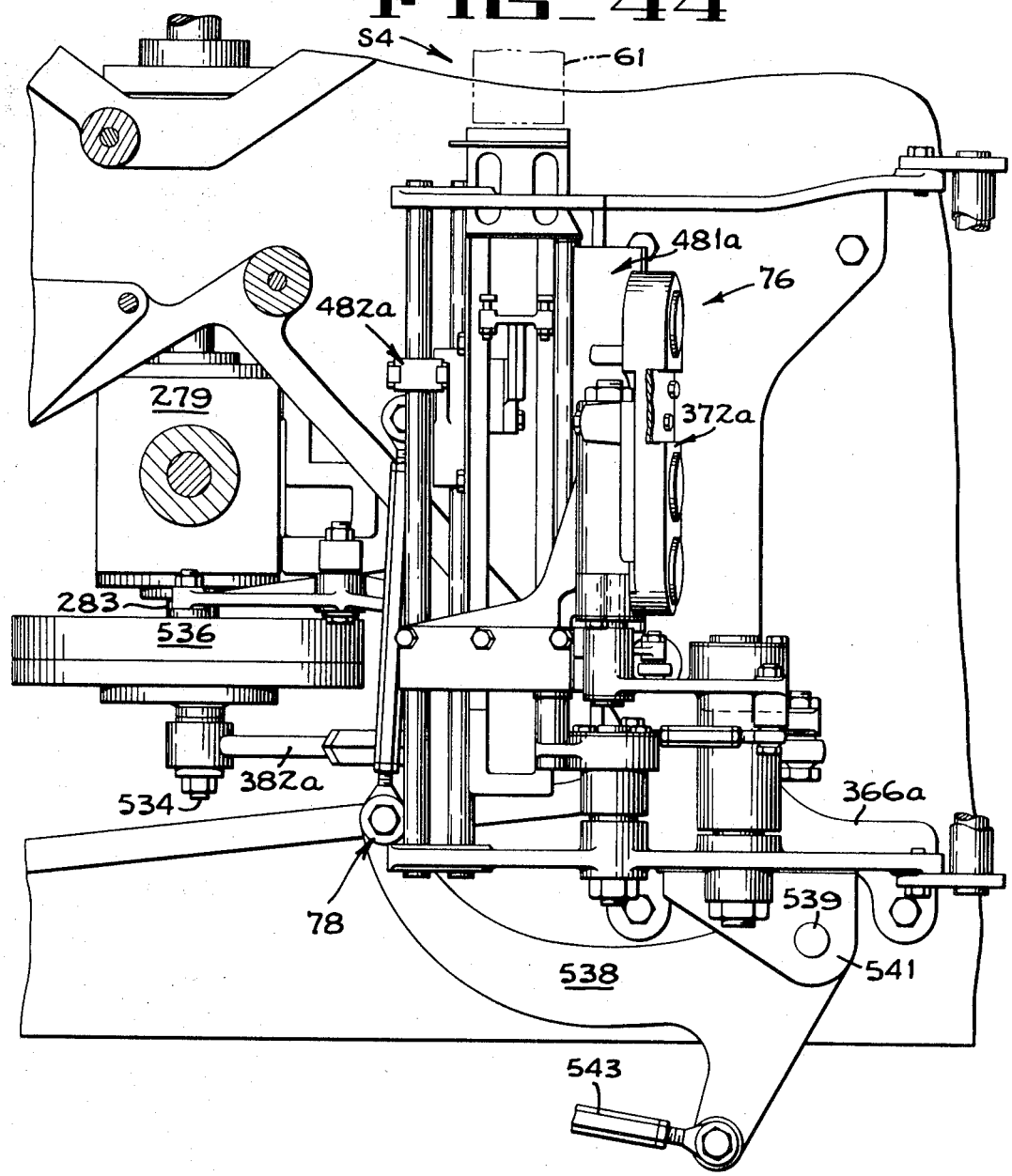
INVENTORS
LESLIE VADAS
ROBERT W. DRAKE
BY *FW Anderson*
*C.E. Tripp*
ATTORNEYS

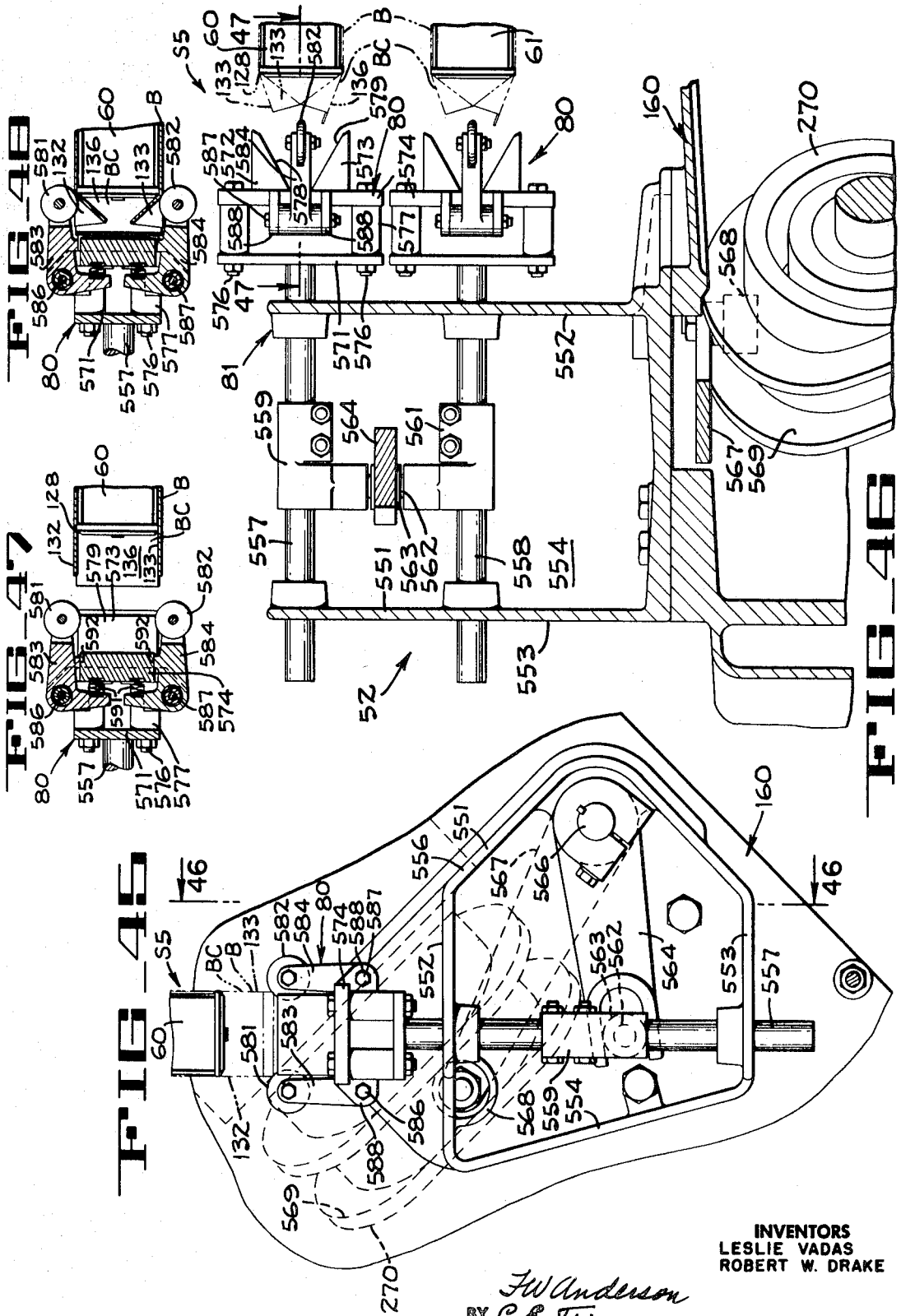

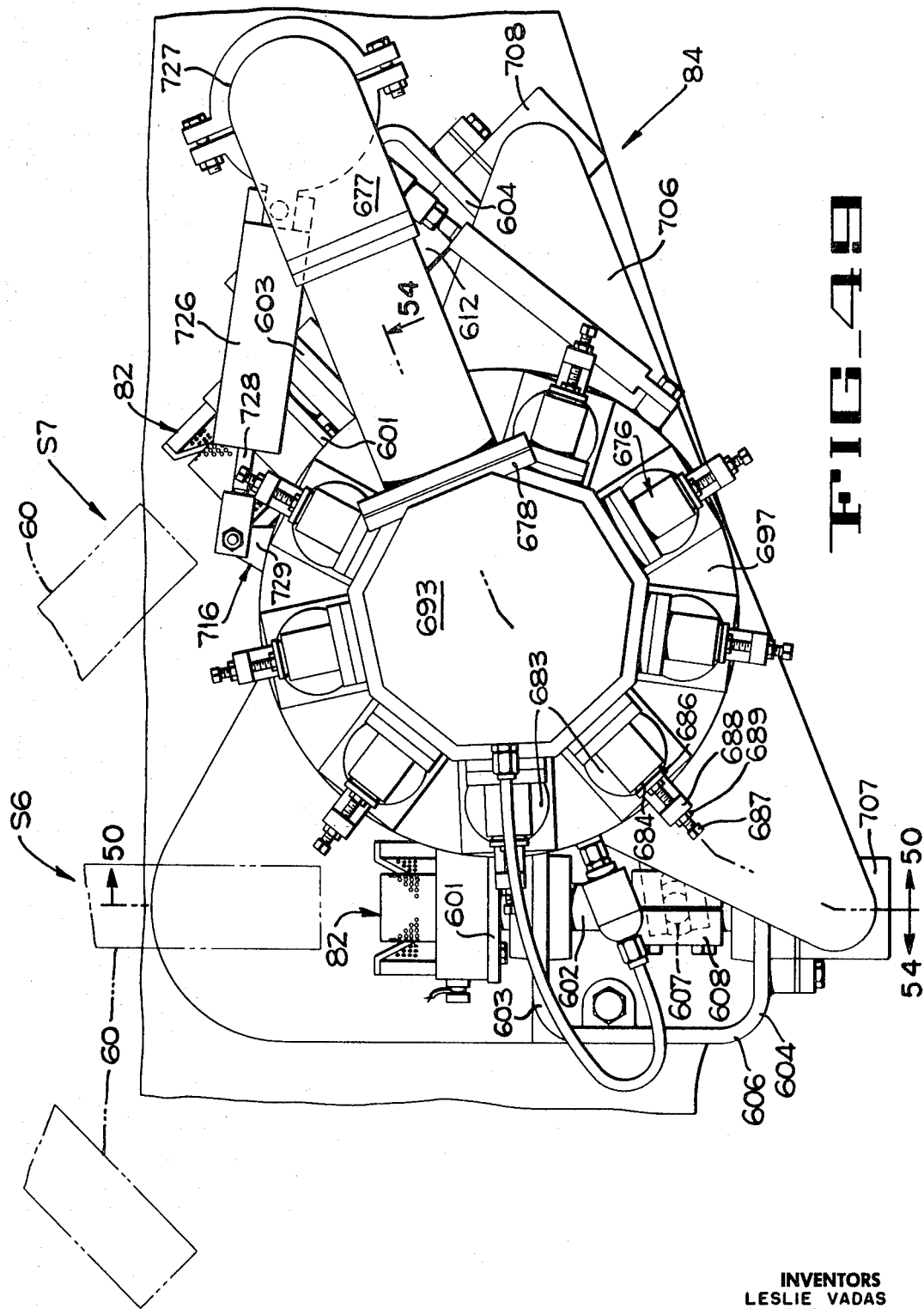

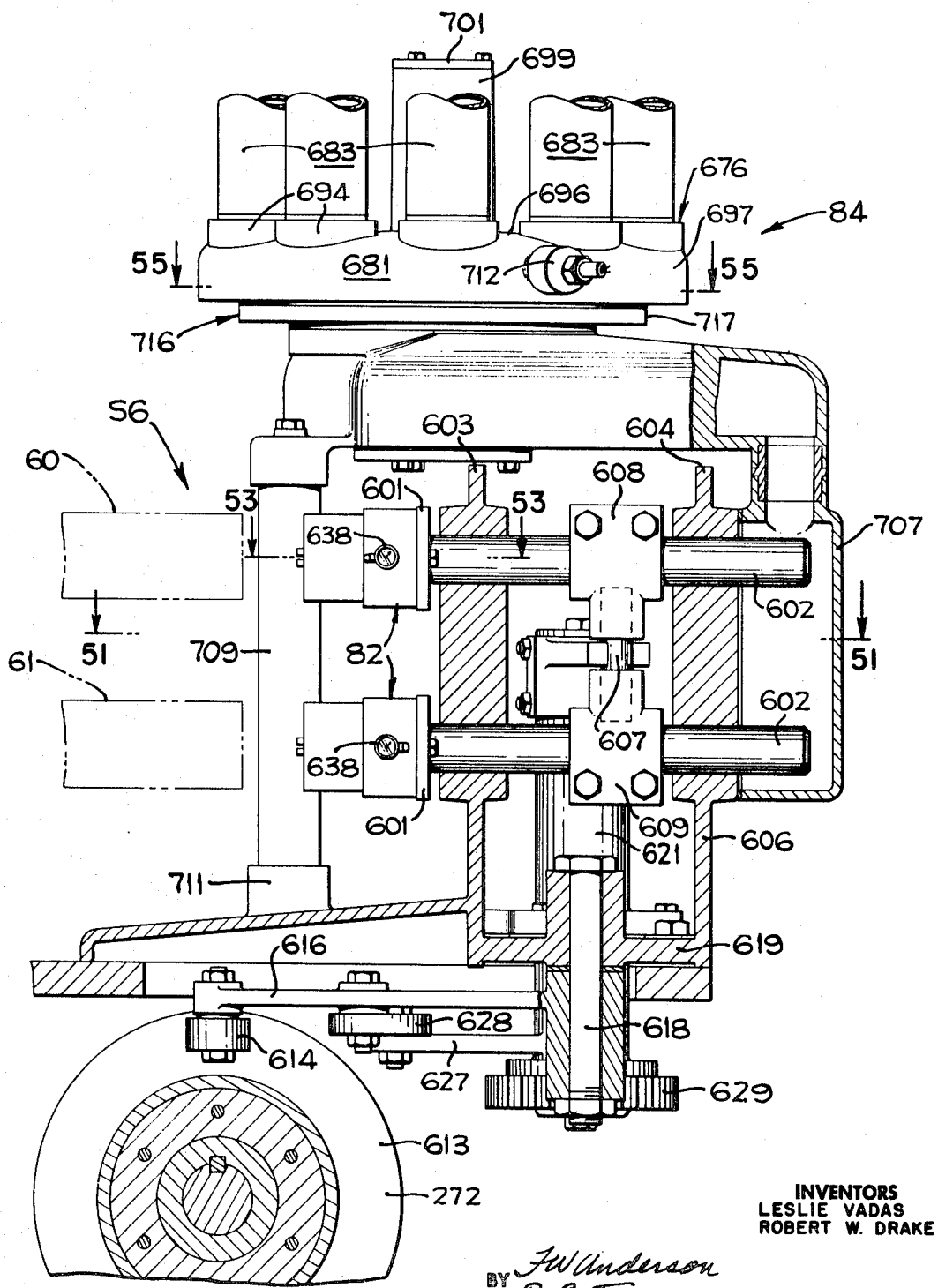

Patented March 2, 1971

INVENTORS
LESLIE VADAS
ROBERT W. DRAKE

BY F.W. Anderson
C.E. Tripp

ATTORNEYS

Patented March 2, 1971
3,566,762
40 Sheets-Sheet 27
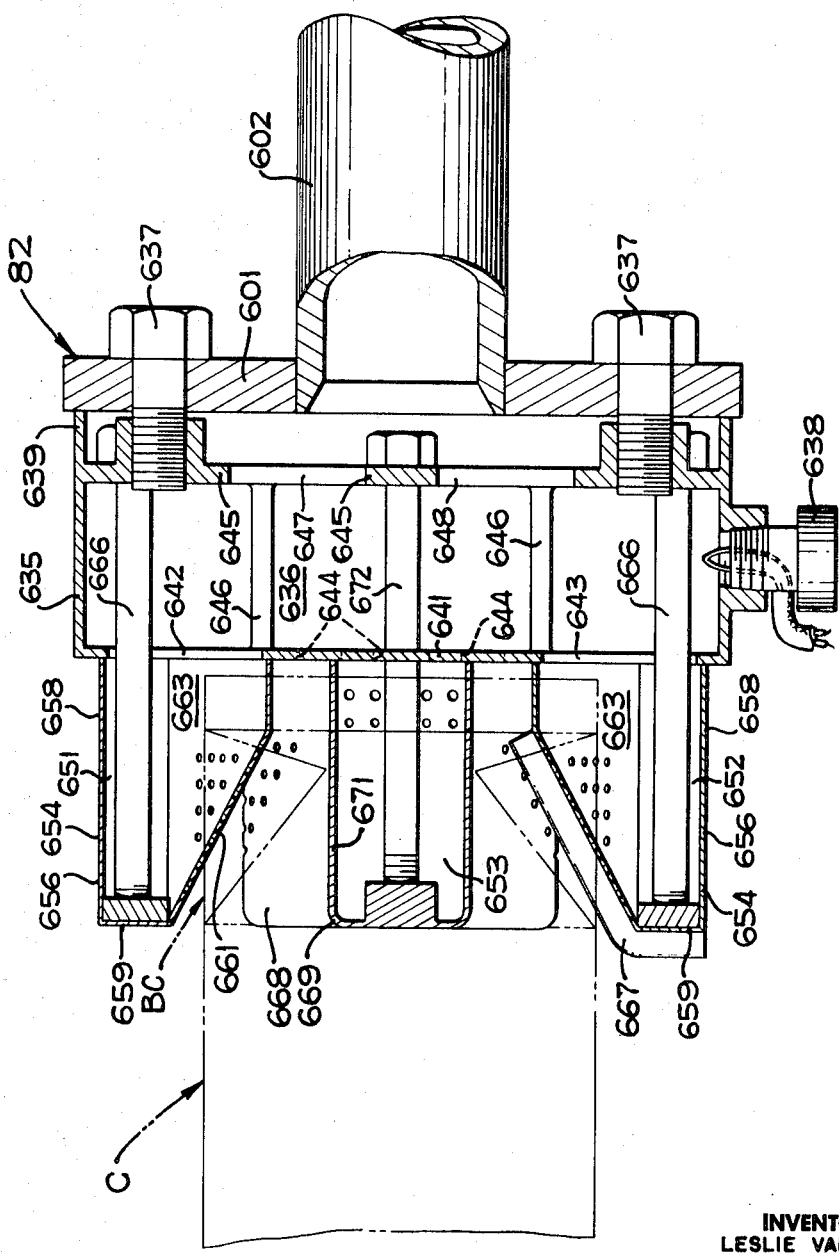
INVENTORS
LESLIE VADAS
ROBERT W. DRAKE
BY J.W. Anderson
C.C. Trippo
ATTORNEYS

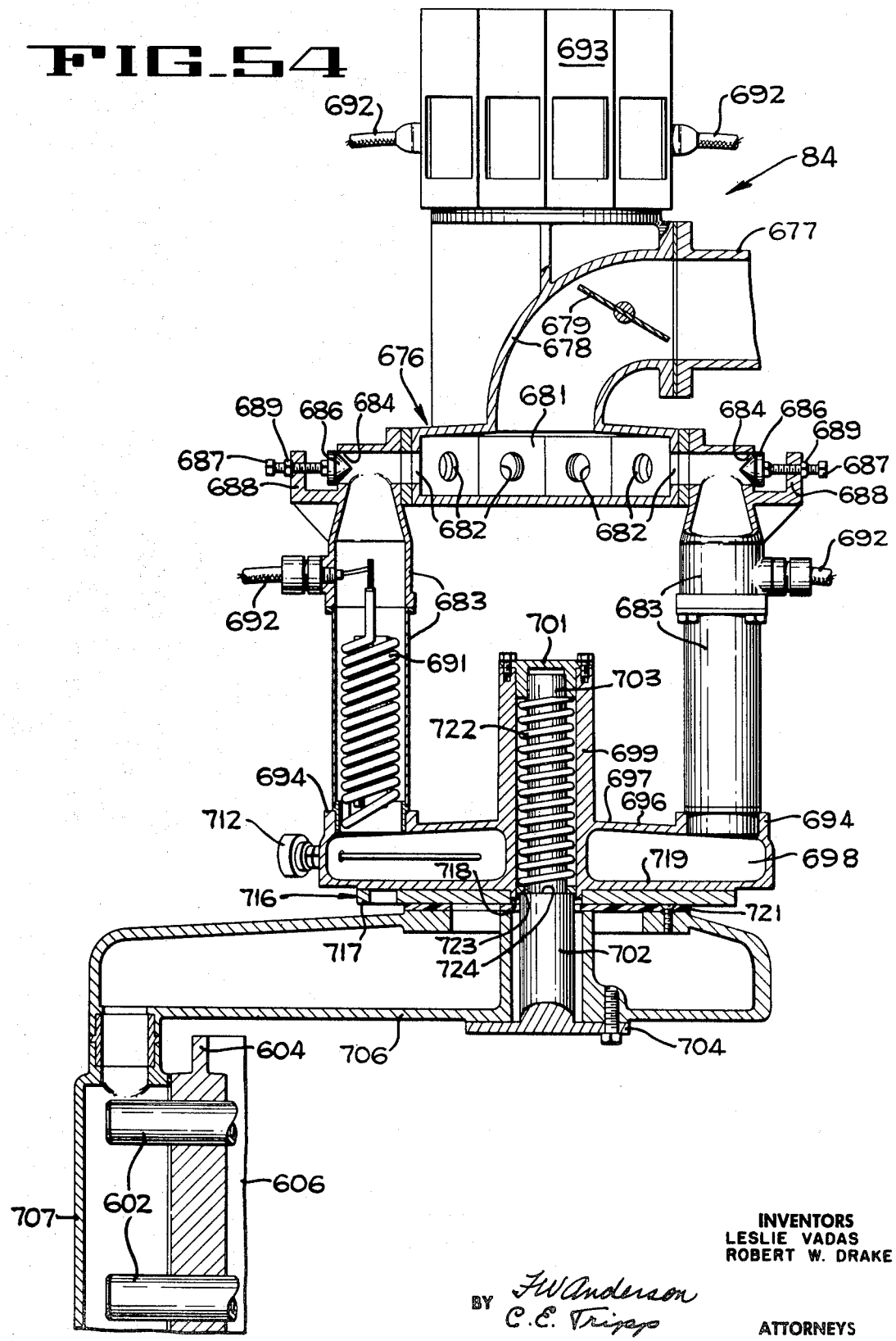

Patented March 2, 1971
3,566,762
40 Sheets-Sheet 29
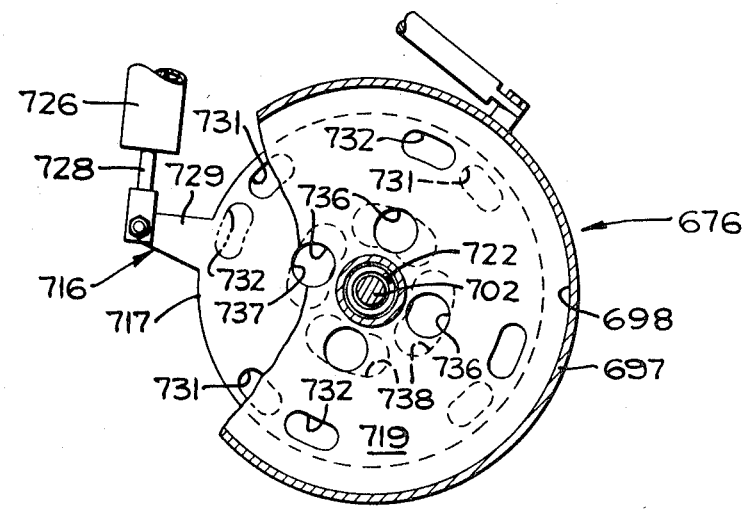
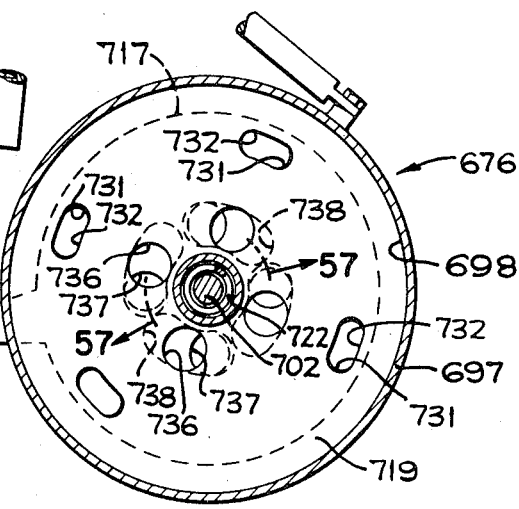
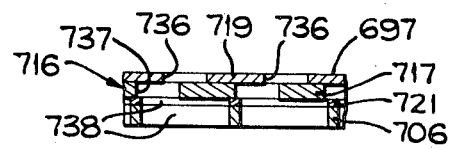
INVENTORS
LESLIE VADAS
ROBERT W. DRAKE
BY J.W. Anderson
C. E. Triggs
ATTORNEY Patented March 2, 1971
3,566,762
40 Sheets-Sheet 30
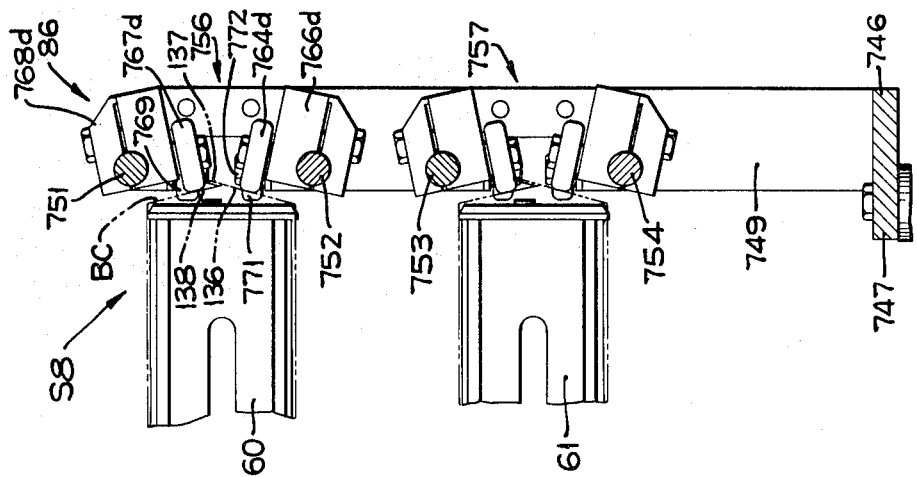
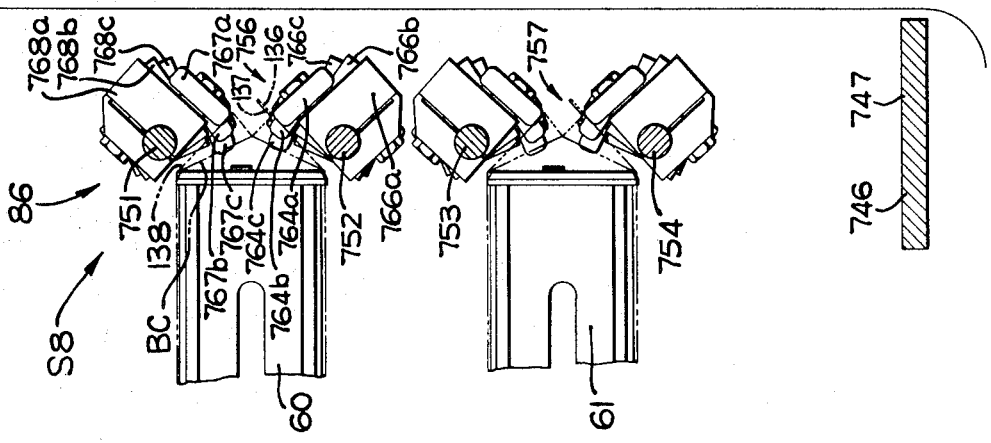
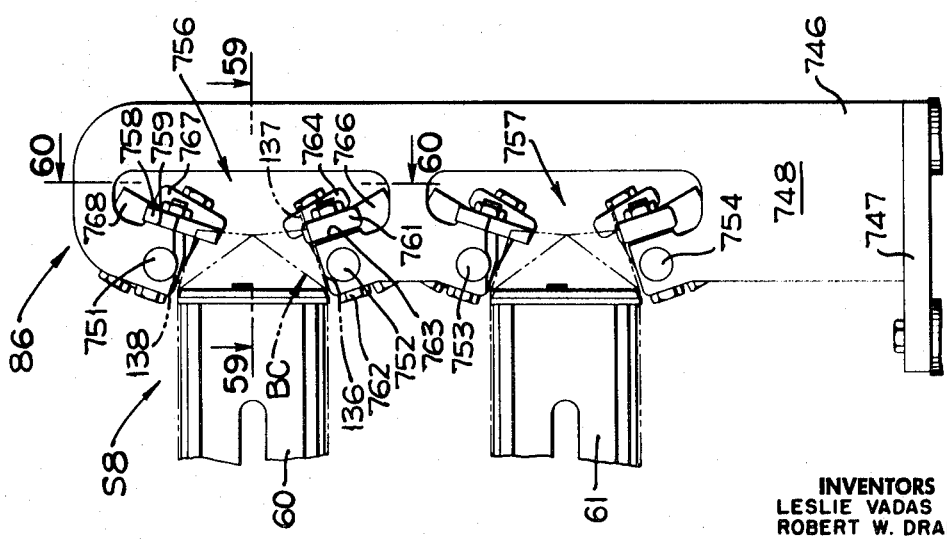
INVENTORS
LESLIE VADAS
ROBERT W. DRAKE
BY  F.W. Anderson
C.E. Tripp
ATTORNEYS

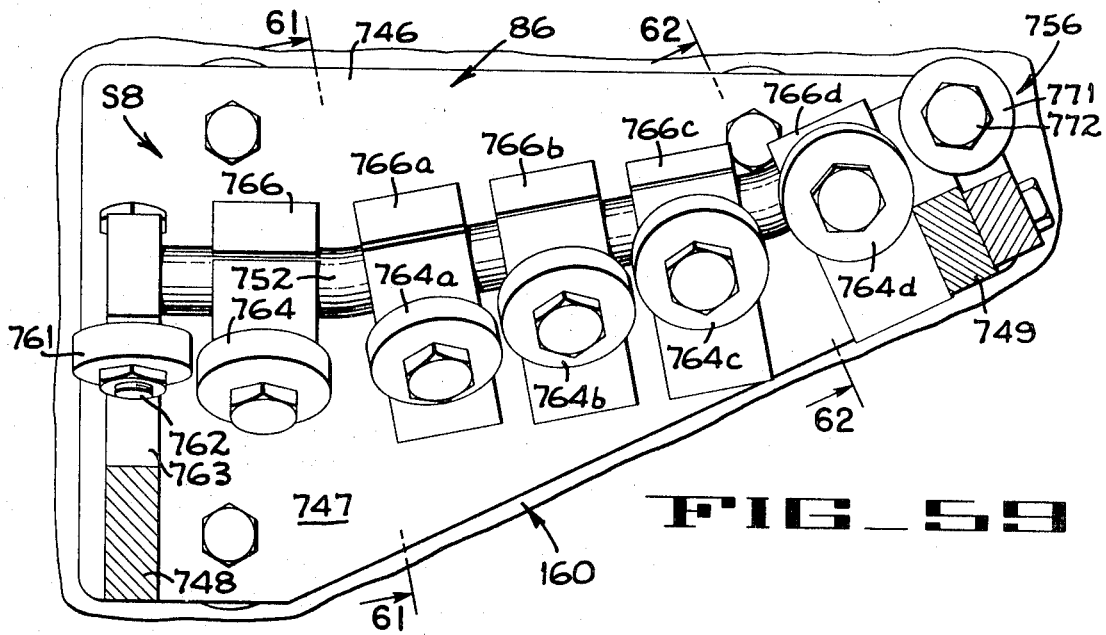
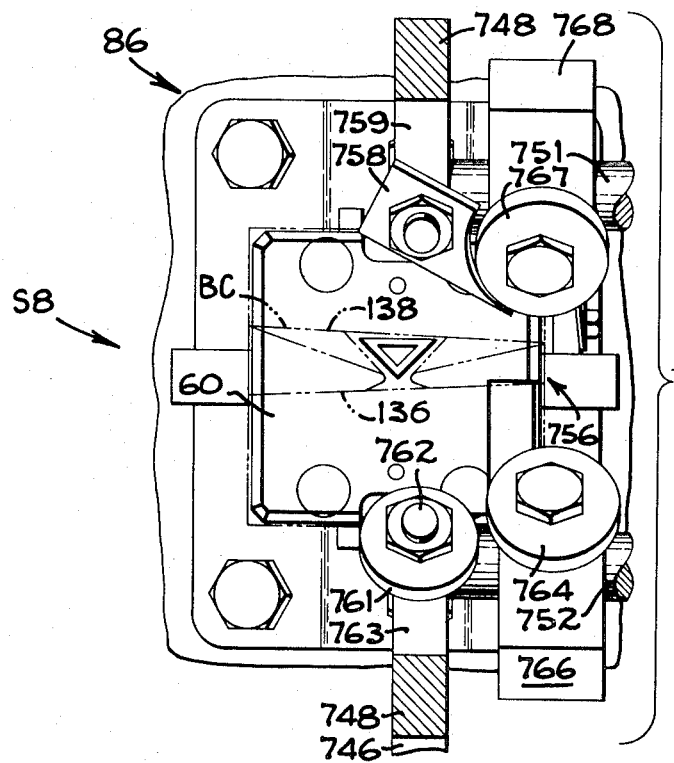

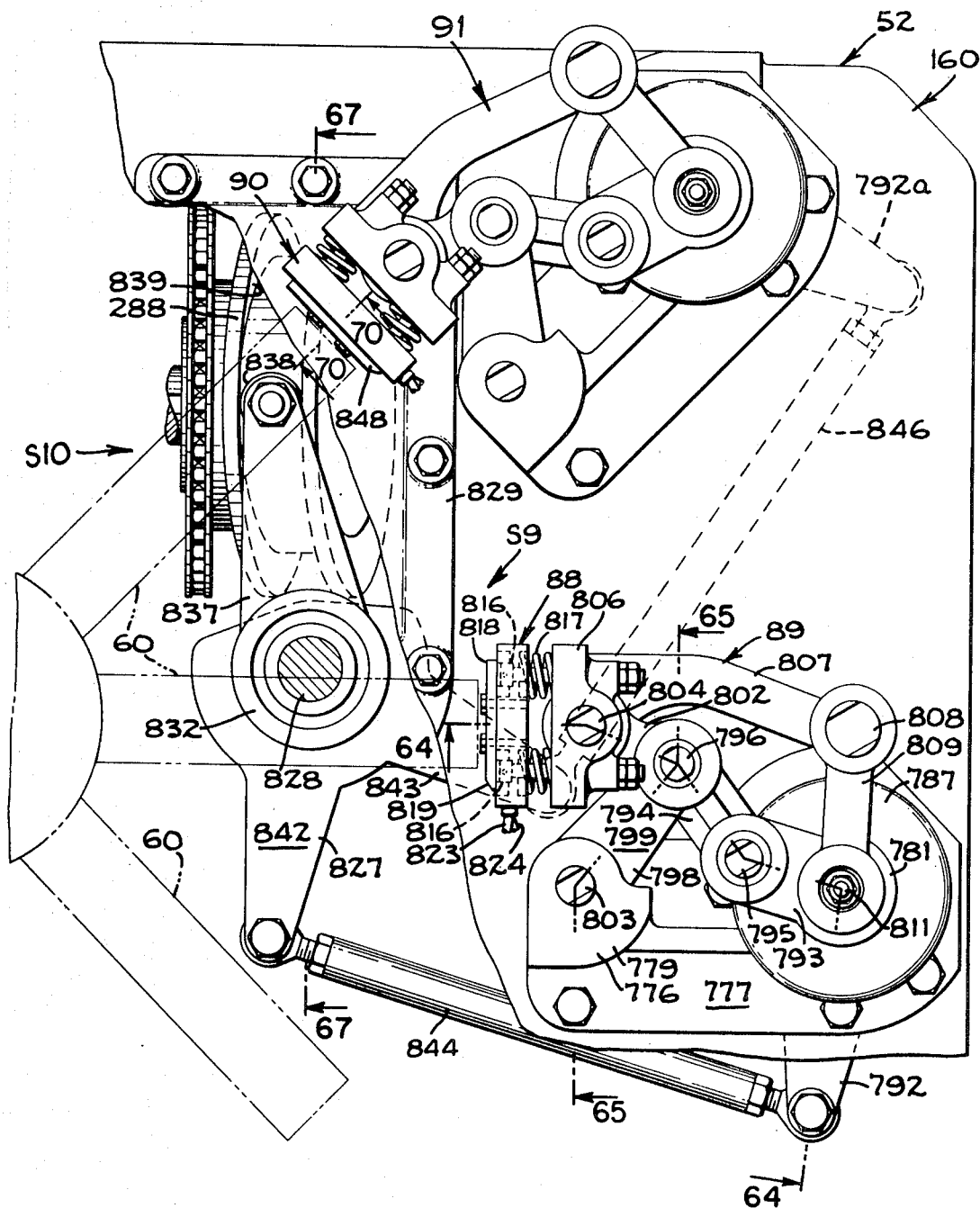

Patented March 2, 1971
3,566,762
40 Sheets-Sheet 33
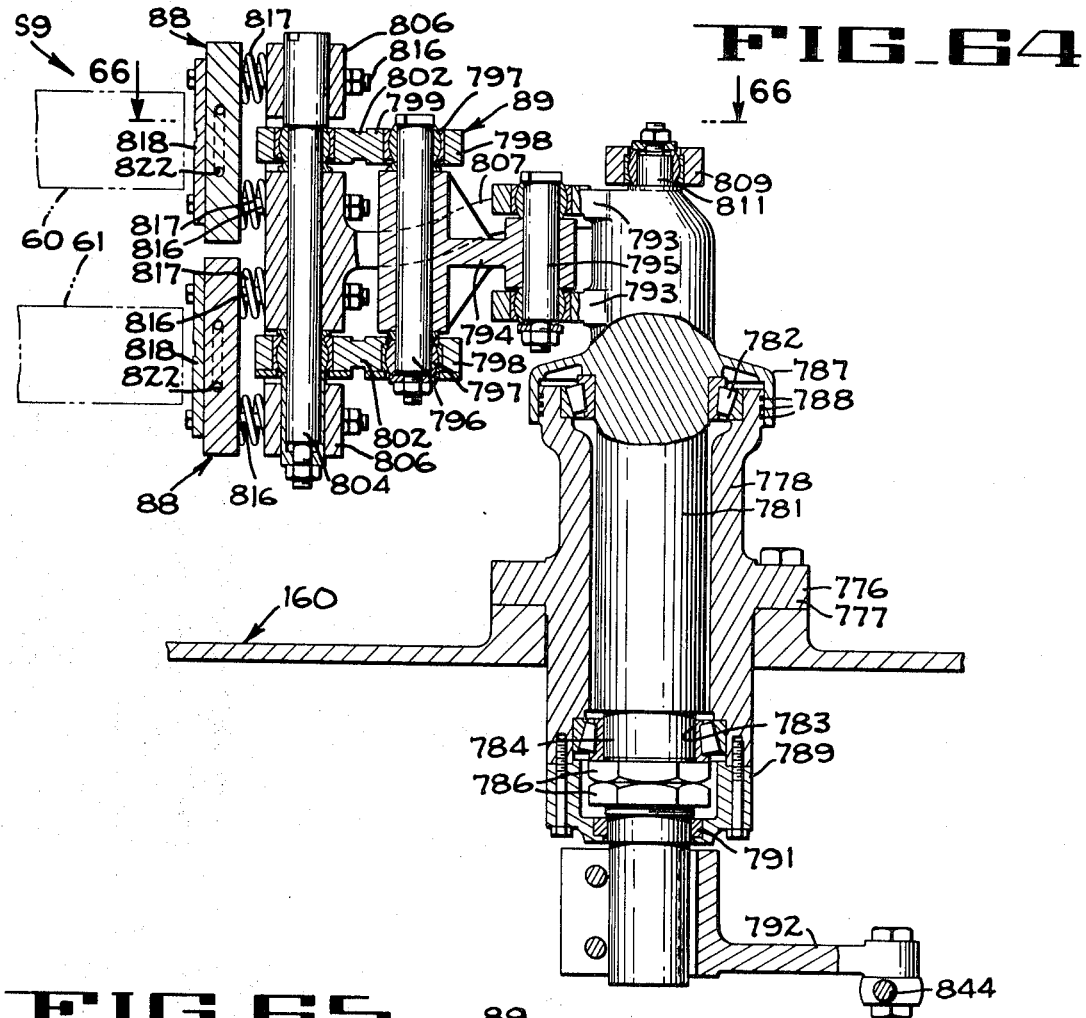
FIG_64
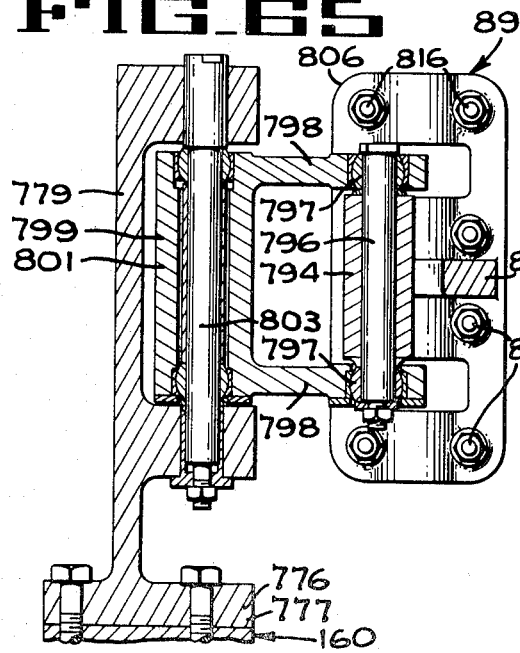
FIG_65
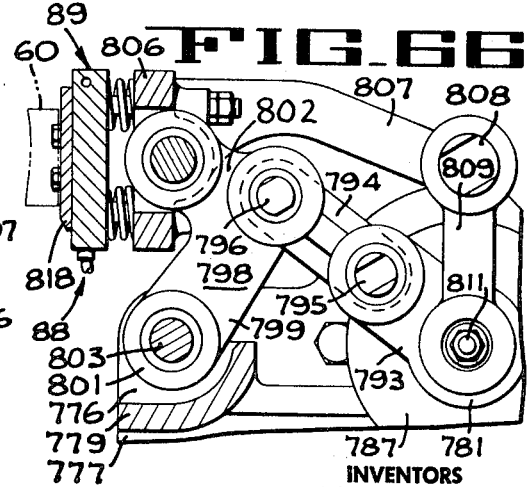
FIG_66
INVENTORS
LESLIE VADAS
ROBERT W. DRAKE
BY F.W. Anderson
C.E. Tripp
ATTORNEYS

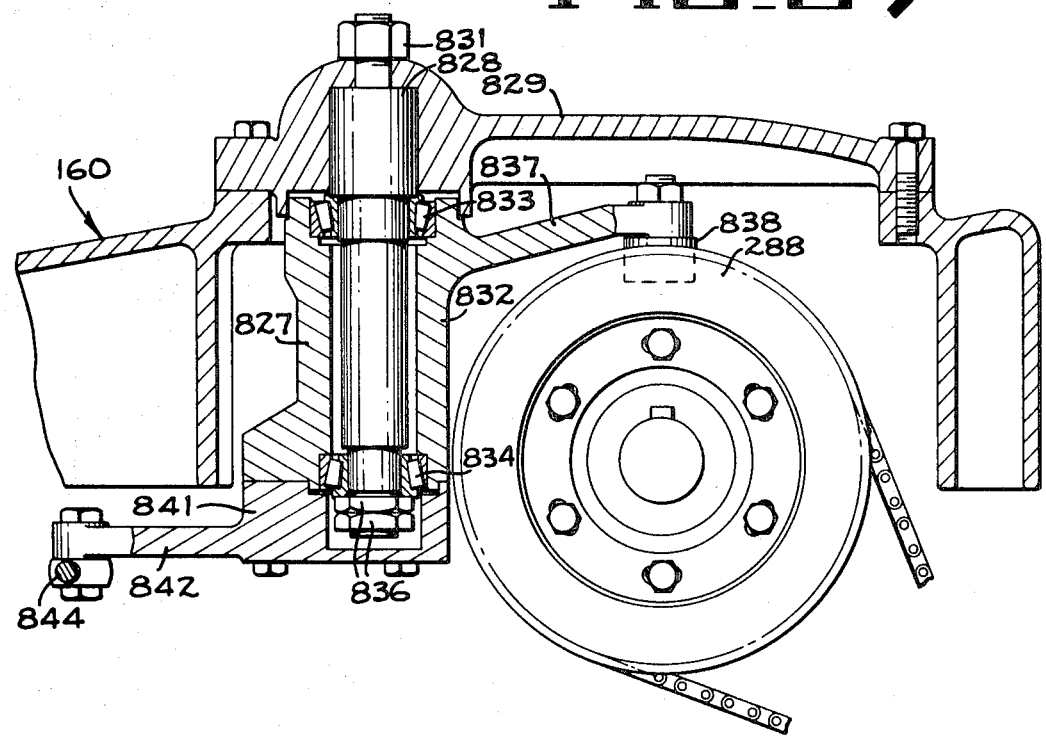
FIG_67
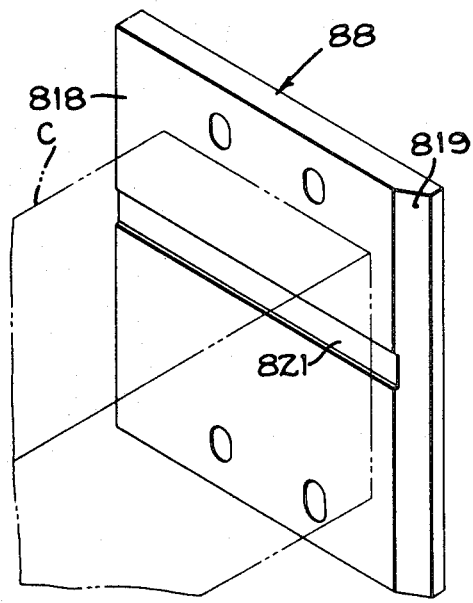
FIG_68
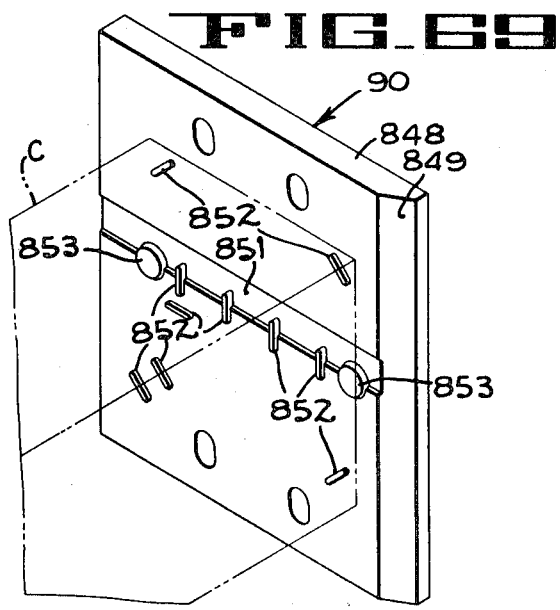
FIG_69
INVENTORS
LESLIE VADAS
ROBERT W. DRAKE
BY F.W. Anderson
C.E. Tripp
ATTORNEYS Patented March 2, 1971
3,566,762
40 Sheets-Sheet 35
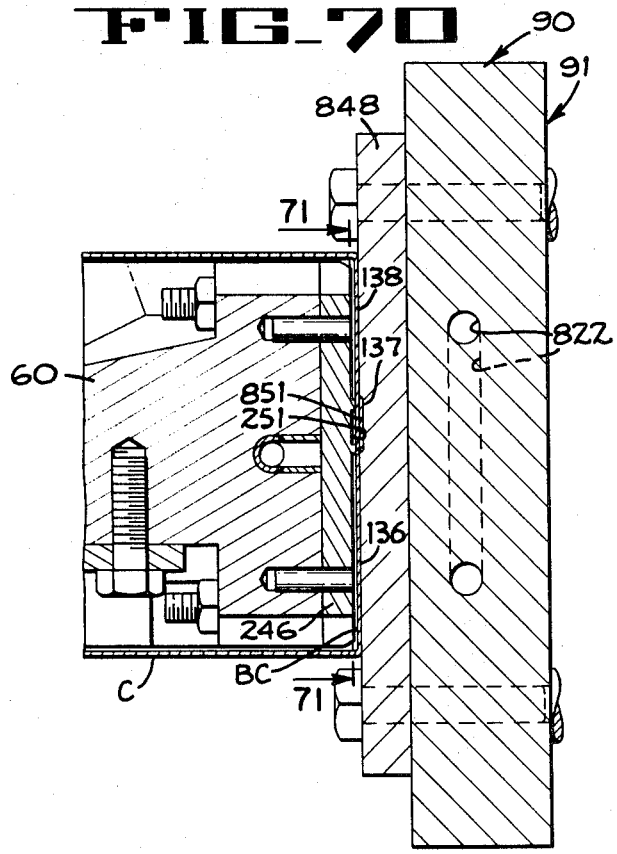
FIG_70
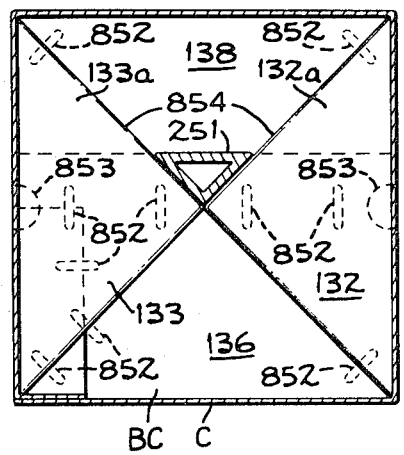
FIG_71
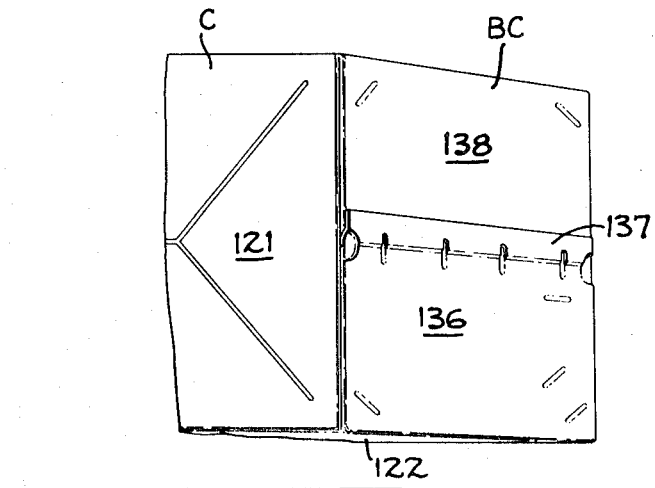
FIG_72
INVENTORS
LESLIE VADAS
ROBERT W. DRAKE
BY F.W. Anderson
C.E. Tripp
ATTORNEYS

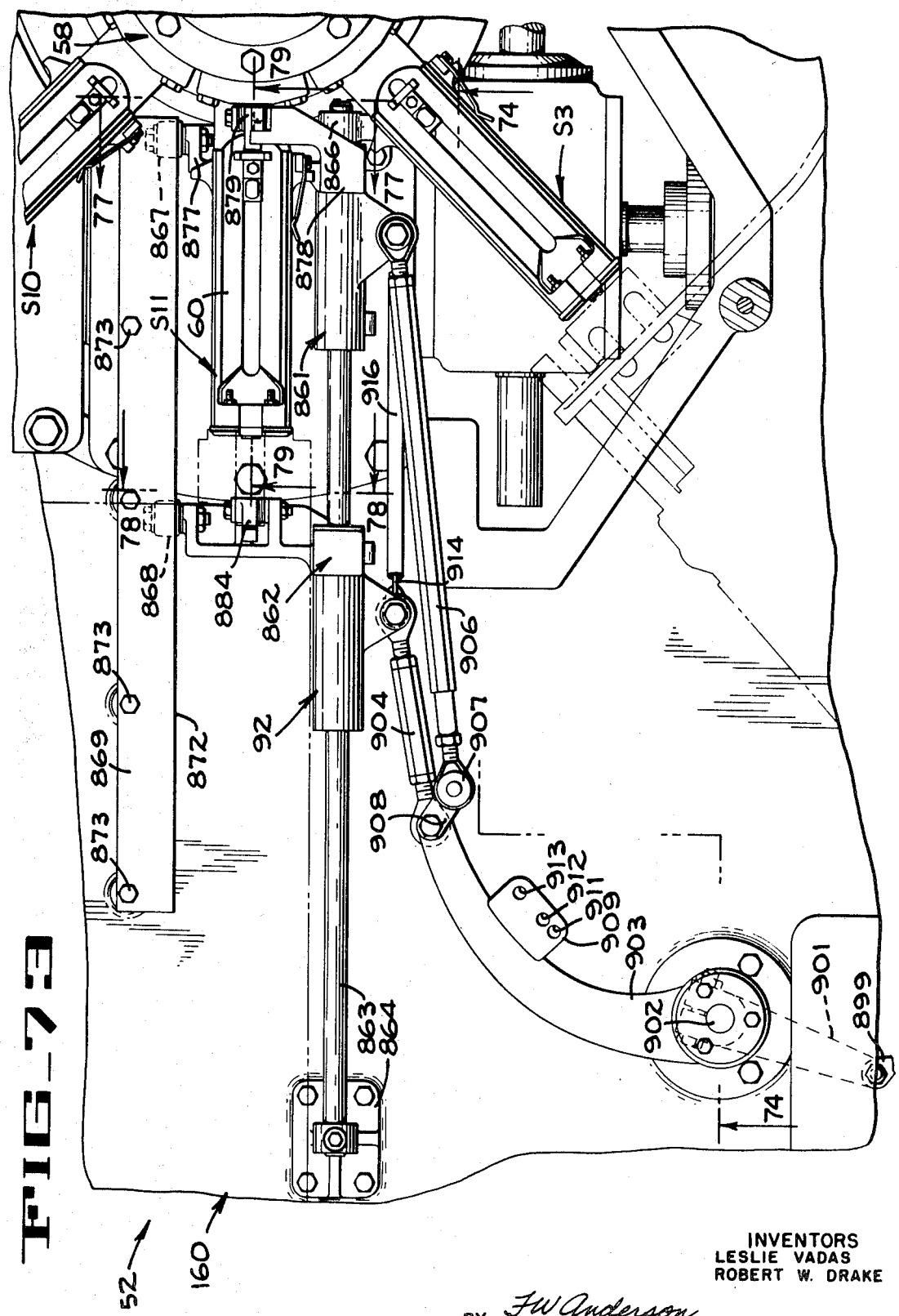

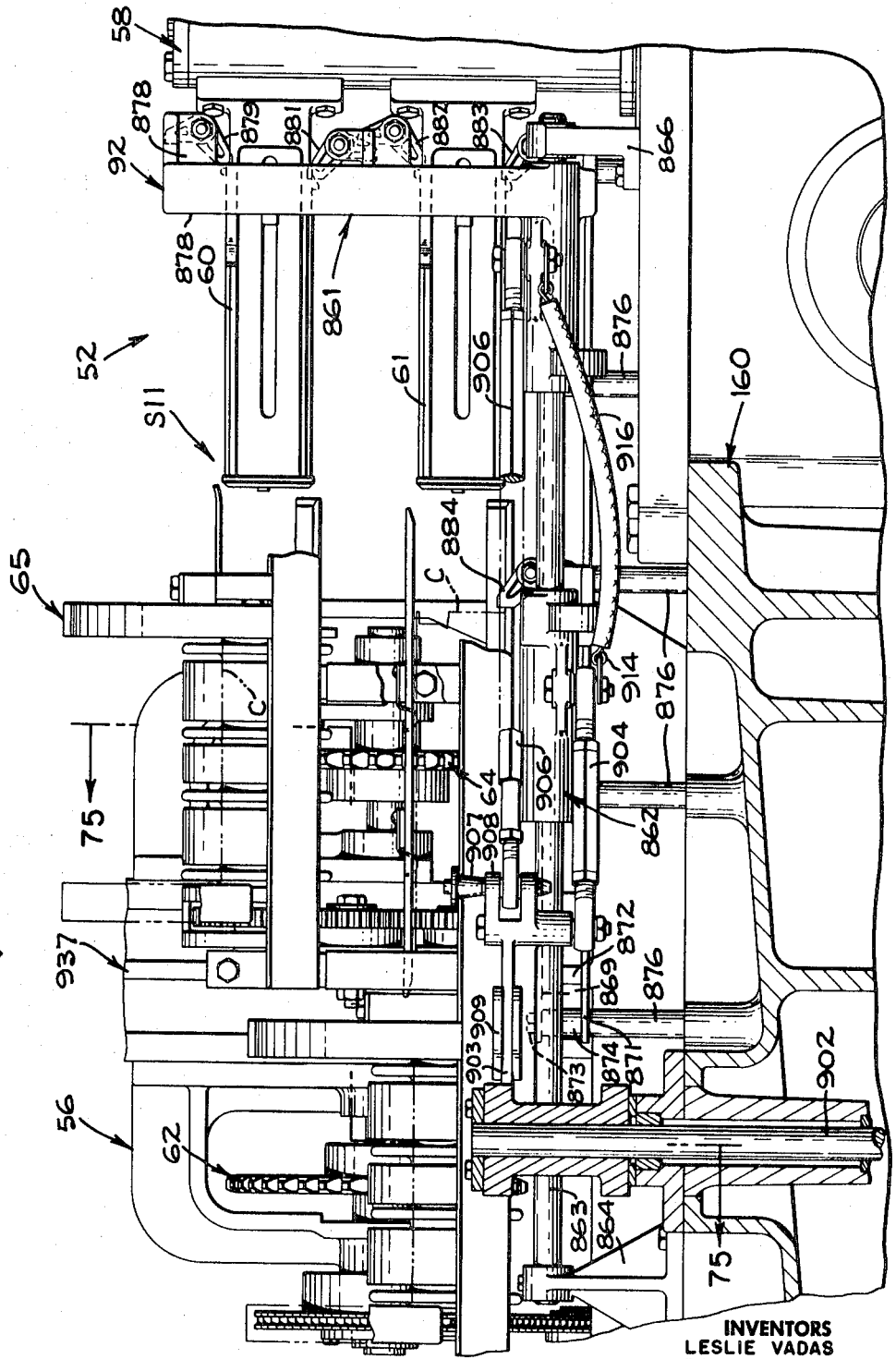

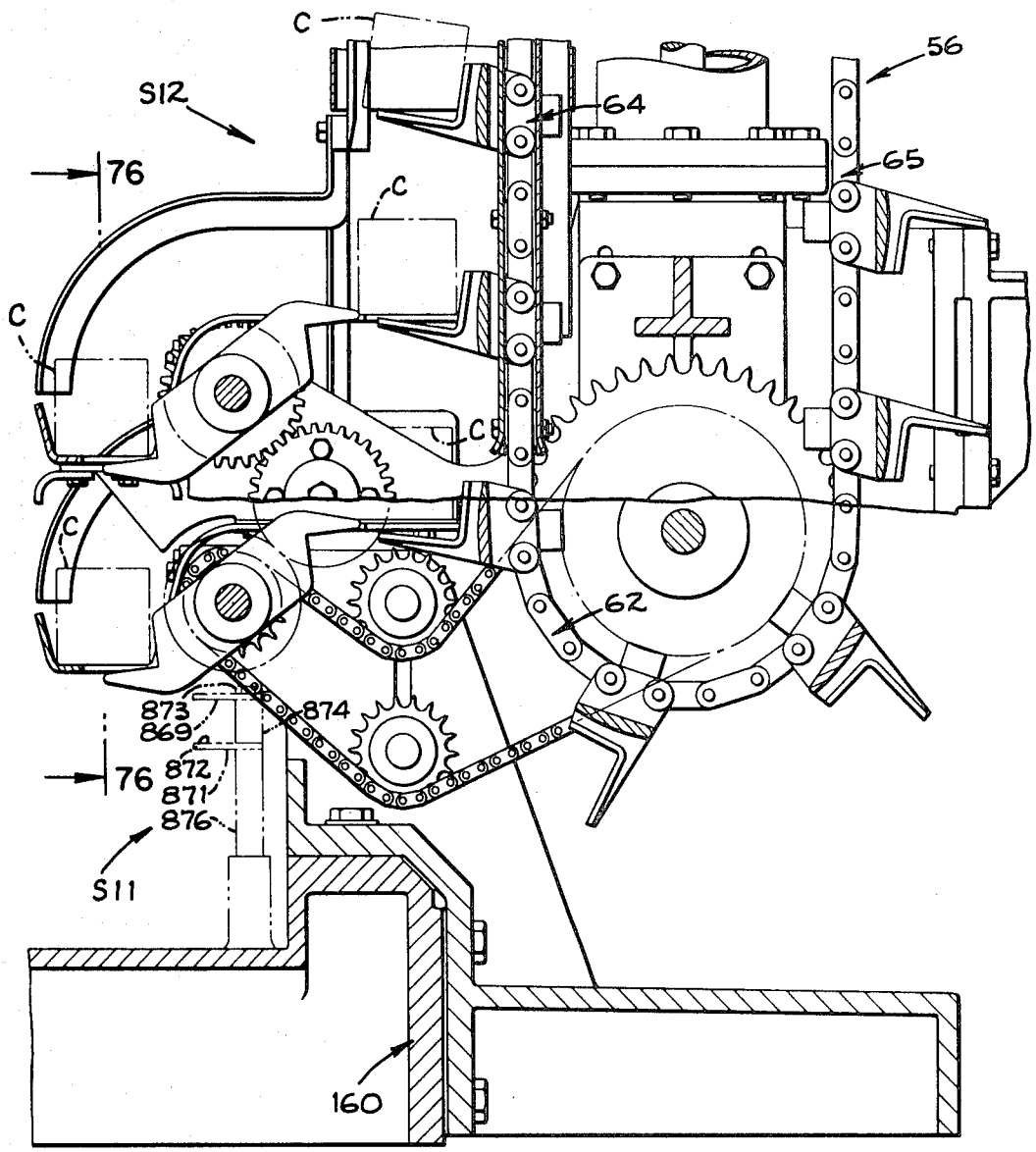
FIG_75

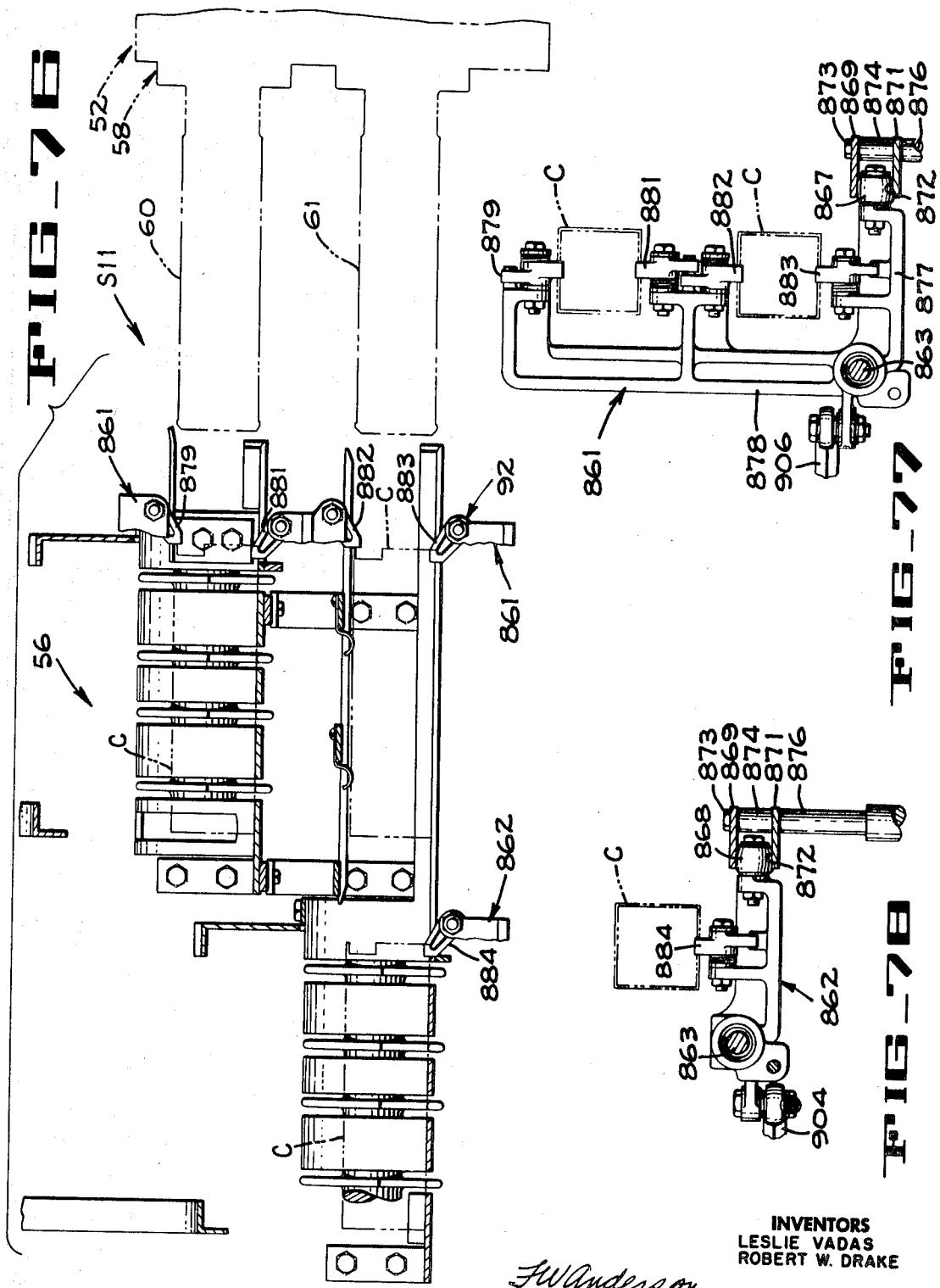

Patented March 2, 1971
3,566,762
40 Sheets-Sheet 40
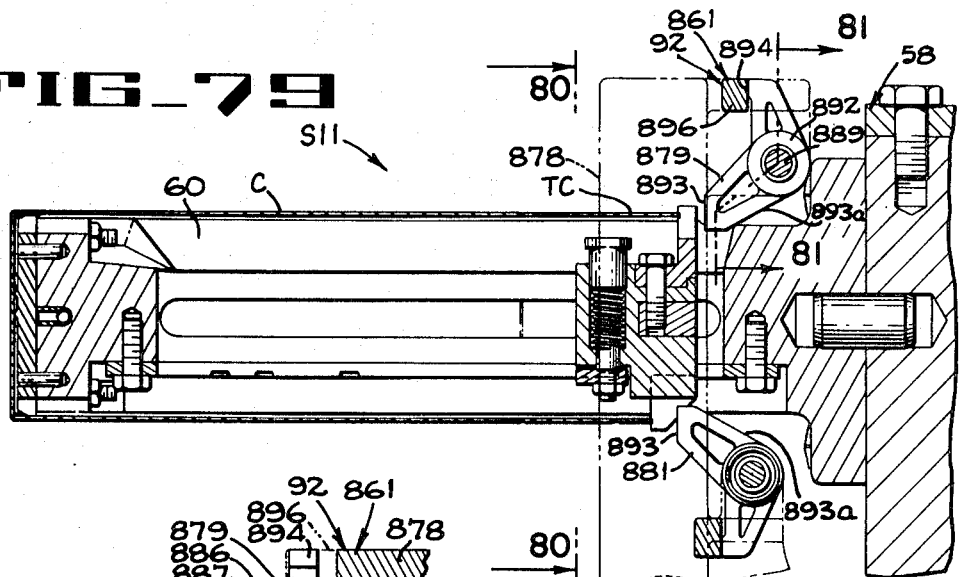
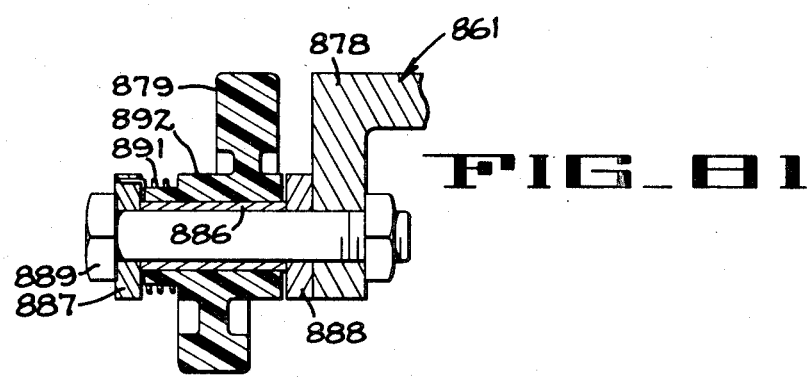
INVENTORS
LESLIE VADAS
ROBERT W. DRAKE
BY F.W. Anderson
C.C. Tripp
ATTORNEYS

CARTON FORMING APPARATUS

CROSS-REFERENCE TO RELATED APPLICATIONS

This application is a division of application Ser. No. 461,738, filed Jun. 7, 1965, which issued as U.S. Pat. No. 3,456,419 on Jul. 22, 1969.

BACKGROUND OF THE INVENTION

This invention pertains to packaging machines and more specifically relates to an apparatus for handling cartons of different sizes, which apparatus forms the cartons from folded thermoplastic carton blanks and seals the bottom closures thereof in fluidtight relationship.

Dairy products are frequently packaged in cartons of quart, pint, half-pint and one-third quart sizes to provide for the varied requirements of the customers. Heretofore, these dairies were required to have a separate machine for filling each size of carton, thus making the cost of packaging equipment excessive.

DESCRIPTION OF PRIOR ART

Carton forming and filling machines capable of handling thermoplastic cartons of one size only are well-known in the art. Such machines are disclosed in the U.S. Pat. Nos. to Heffelfinger et al. 3,248,841 and the U.S. Pat. No. to Monroe et al. 3,207,049. However, these prior art machines are capable of handling cartons of one size only which limits the dairy or other packager to packaging his products in this one size of containers unless he is able to purchase additional machines to handle the other sizes of cartons.

SUMMARY OF THE INVENTION

The carton forming apparatus of the present invention is readily adjustable to handle several sizes of cartons. The apparatus receives flat folded thermoplastic carton blanks from a magazine, erects and places the carton blanks on mandrels supported by an intermittently driven turret with the bottom closure flaps thereof projecting outward of the mandrels. The turret then intermittently moves the carton blanks past a plurality of bottom forming stations so that apparatus at these stations will heat the bottom closures, fold them into sealing position, and seal them. The cartons with their bottom closures sealed are then stripped from the mandrels. The mandrels, magazine, and stripping mechanism are all adjustable thereby providing a carton forming apparatus capable of handling cartons of different sizes.

BRIEF DESCRIPTION OF THE DRAWINGS

FIG. 1 is a diagrammatic perspective, with certain parts being cut away, illustrating a carton forming and filling machine having the carton forming apparatus of the present invention therein.

FIG. 2 is a diagrammatic plan of the machine of FIG. 1 illustrating the relative positions of the several components of the machine.

FIG. 3 is a perspective illustrating two sides of a folded carton blank taken looking toward the top closure.

FIG. 4 is a perspective illustrating the same two sides of the folded carton blank taken looking toward the bottom closure.

FIG. 5 is a perspective showing the bottom closure of a carton after certain breaking and forming operations have been performed thereon.

FIG. 6 is a perspective of the completely formed and sealed bottom closure of a carton particularly illustrating certain depressions formed therein for the purpose of blocking any potential leakage passages in the bottom closure.

FIG. 7 is a perspective showing the four sizes of carton which are handled by the machine of the present invention.

FIGS. 8, 9 and 10 are perspectives of the top closure of a carton showing progressive positions of the top closure flaps after certain forming and sealing operations have been performed thereon.

FIG. 11 is a side elevation showing the top closure of a carton when completely sealed.

FIG. 12 is an enlarged end elevation looking in the direction of arrows 12–12 of FIG. 2 illustrating the forming turret and the drive for the carton forming apparatus, certain parts being illustrated in phantom and other parts being removed.

FIG. 13 is a plan of the drive for the carton forming apparatus, the carton forming turret being illustrated in phantom.

FIG. 14 is an enlarged horizontal section through the forming turret taken along lines 14–14 of FIG. 15 and illustrating certain carton forming mechanisms associated with the forming turret.

FIG. 15 is a vertical section of the forming turret taken along lines 15–15 of FIG. 14.

FIG. 16 is an enlarged plan of one of the forming turret mandrels.

FIG. 17 is an elevation of the mandrel of FIG. 16 looking in the direction of arrows 17–17 of FIG. 16.

FIG. 18 is an end elevation of the mandrel of FIG. 17 looking in the direction of arrows 18–18 of FIG. 17.

FIG. 19 is a section taken along lines 19–19 of FIG. 17.

FIG. 20 is a section taken along lines 20–20 of FIG. 16 illustrating the adjustable carton stop.

FIG. 21 is a perspective of a portion of the adjustable carton stop.

FIG. 22 is a side elevation of the upper magazine, certain parts being cut away.

FIG. 23 is an end view taken looking in the direction of the arrows 23–23 of FIG. 22, an adjustable guide rail being shown in position to handle quart size carton blanks while a carton pusher is shown in position to handle one-third quart, and half-pint size carton blanks.

FIG. 24 is an elevation taken in the direction of arrows 24–24 in FIG. 22 showing a fragment of the discharge end of the upper magazine.

FIG. 25 is a section taken along lines 25–25 of FIG. 22 illustrating the structure for locking the slide blocks in adjusted position.

FIG. 26 is en enlarged side elevation of the upper carton erecting mechanism and of the upper loader taken in the direction of arrows 26–26 of FIG. 2, certain parts being cut away to illustrate operating components of the mechanism.

FIG. 27 is a plan of the upper carton erecting mechanism and loader of FIG. 26, certain parts being cut away.

FIG. 28 is a section taken along lines 28–28 of FIG. 26.

FIG. 29 is a vertical section taken substantially along lines 29–29 of FIG. 28 illustrating the suction head in position to remove a carton from the upper magazine.

FIG. 30 is a vertical section similar to FIG. 29 but illustrating the suction head in position for placing a squared carton blank in position to be engaged by the top loader.

FIG. 31 is an enlarged top plan of the suction head.

FIG. 32 is an enlarged section taken along lines 32–32 of FIG. 31 illustrating one of the suction cups.

FIG. 33 is an enlarged section taken along lines 33–33 of FIG. 31 illustrating a valve arrangement for adapting the head to handle either quart size cartons or pint, one-third quart and ½pint size cartons.

FIG. 34 is a plan of a vacuum control mechanism for the suction heads of the upper and lower carton erecting mechanisms, the orientation of the view in relation to other components of the machine being best illustrated in FIG. 42.

FIG. 35 is a vertical section taken along lines 35–35 of FIG. 34.

FIG. 36 is an enlarged horizontal section taken along lines 36–36 of FIG. 35 illustrating the vacuum control mechanism in a cup venting position.

FIG. 37 is an enlarged vertical section taken along lines 37–37 of FIG. 36.

FIG. 38 is a horizontal section similar to FIG. 36 but illustrating the vacuum control mechanism in a suction applying position.

FIG. 39 is a vertical section taken along lines 39–39 of FIG. 38.

FIG. 40 is a diagrammatic elevation illustrating a carton in several operative positions relative to an overbending plate as the carton is being moved from the magazine to a position in alignment with the upper loader.

FIG. 41 is an end elevation of the top loader looking in the direction of arrows 41–41 in FIG. 27.

FIG. 42 is a diagrammatic plan illustrating the upper and lower loaders in two operative positions.

FIG. 43 is a vertical section of the lower carton erecting mechanism and of the lower loader taken substantially along lines 43–43 OF FIG. 2, certain parts being broken away.

FIG. 44 is a plan of the lower carton erecting mechanism and of the lower loader of FIG. 43, certain parts being broken away.

FIG. 45 is a plan of the bottom former illustrating the bottom forming heads in a retracted position.

FIG. 46 is a vertical section taken along lines 46–46 of FIG. 45 illustrating in phantom lines the bottom closure of the carton after the bottom forming operation has been performed thereon.

FIG. 47 is a horizontal section taken along lines 47–47 of FIG. 46 but illustrating a carton as it appears before being acted upon by the bottom forming head.

FIG. 48 is a section similar to FIG. 47 but showing the bottom forming head in the active carton forming position.

FIG. 49 is a plan of the bottom heater.

FIG. 50 is a vertical section taken along lines 50–50 of FIG. 49 illustrating the bottom heating heads in a retracted position.

FIG. 53 is an enlarged horizontal section taken along lines 53–53 of FIG. 50 illustrating the bottom closure of a carton in heating position.

FIG. 54 is a vertical section taken substantially along lines 54–54 of FIG. 49 illustrating the structure for heating and controlling the flow of hot air into the bottom heating heads.

FIG. 55 is a horizontal section with parts broken away taken along lines 55–55 of FIG. 50 illustrating a flow control valve in its normal operating position.

FIG. 56 is a horizontal section similar to FIG. 55 but illustrating the valve in an air diverting position.

FIG. 57 is an arcuate section taken along lines 57–57 of FIG. 56 illustrating certain passages in the flow control valve.

FIG. 58 is an elevation of the bottom folding roller plows taken looking in the direction of arrows 58–58 of FIG. 2.

FIG. 59 is a horizontal section taken along lines 59–59 of FIG. 58.

FIG. 60 is an enlarged vertical section taken along lines 60–60 of FIG. 58 illustrating the manner in which the bottom closure flaps enter the roller plow.

FIG. 61 is a vertical section taken along lines 61–61 of FIG. 59 said vertical section being illustrated on the same sheet as FIG. 58.

FIG. 62 is a vertical section taken along lines 62–62 of FIG. 59, said vertical section being illustrated on the same sheet as FIG. 58.

FIG. 63 is a plan with certain parts cut away illustrating the preliminary and final bottom sealers in the inactive positions.

FIG. 64 is a vertical section taken along lines 64–64 of FIG. 63.

FIG. 65 is a vertical section taken along lines 65–65 of FIG. 63.

FIG. 66 is a horizontal section taken along lines 66–66 of FIG. 64 illustrating the preliminary sealing head in an active sealing position.

FIG. 67 is a vertical section taken along lines 67–67 of FIG. 63 illustrating a portion of the actuating mechanism for the sealing heads.

FIG. 68 is an enlarged perspective of the press plate for the preliminary sealing head, the position of the bottom closure of a carton relative thereto being illustrated in phantom lines.

FIG. 69 is an enlarged perspective of the press plate for the final sealing head.

FIG. 70 is an enlarged vertical section taken along lines 70–70 of FIG. 63 illustrating the final sealing head in sealing position against the bottom closure of a carton.

FIG. 71 is a vertical section taken along lines 71–71 of FIG. 70 illustrating a portion of the mandrel and the internal surface of the bottom closure.

FIG. 72 is a perspective of the sealed bottom closure of a carton illustrating certain indented areas arranged to block potential flow passages in the sealed bottom closure.

FIG. 73 is a plan illustrating the mandrel unloading mechanism in the retracted position with the mechanism being adjusted to handle quart size cartons.

FIG. 74 is a side elevation of the unloader taken looking in the direction of arrows 74–74 of FIG. 73, certain parts being cut away.

FIG. 75 is a vertical section taken along lines 75–75 of FIG. 74 illustrating the accumulator conveyor loading rotors.

FIG. 76 is a vertical section taken substantially along lines 76–76 of FIG. 75 illustrating the mandrel unloading mechanism in an extended position.

FIG. 77 is a vertical section taken along lines 77–77 of FIG. 73 illustrating the mandrel unloading carrier.

FIG. 78 is a vertical section taken along lines 78–78 of FIG. 73 illustrating the carton transfer carrier.

FIG. 79 is an enlarged vertical section taken along lines 79–79 of FIG. 73 illustrating the mandrel unloader in its retracted position relative to a carton on the mandrel.

FIG. 80 is an enlarged section taken along lines 80–80 of FIG. 79.

FIG. 81 is an enlarged vertical section taken along lines 81–81 of FIG. 79 illustrating one of the carton engaging stripper fingers.

DESCRIPTION OF PREFERRED EMBODIMENT

Figure 51:
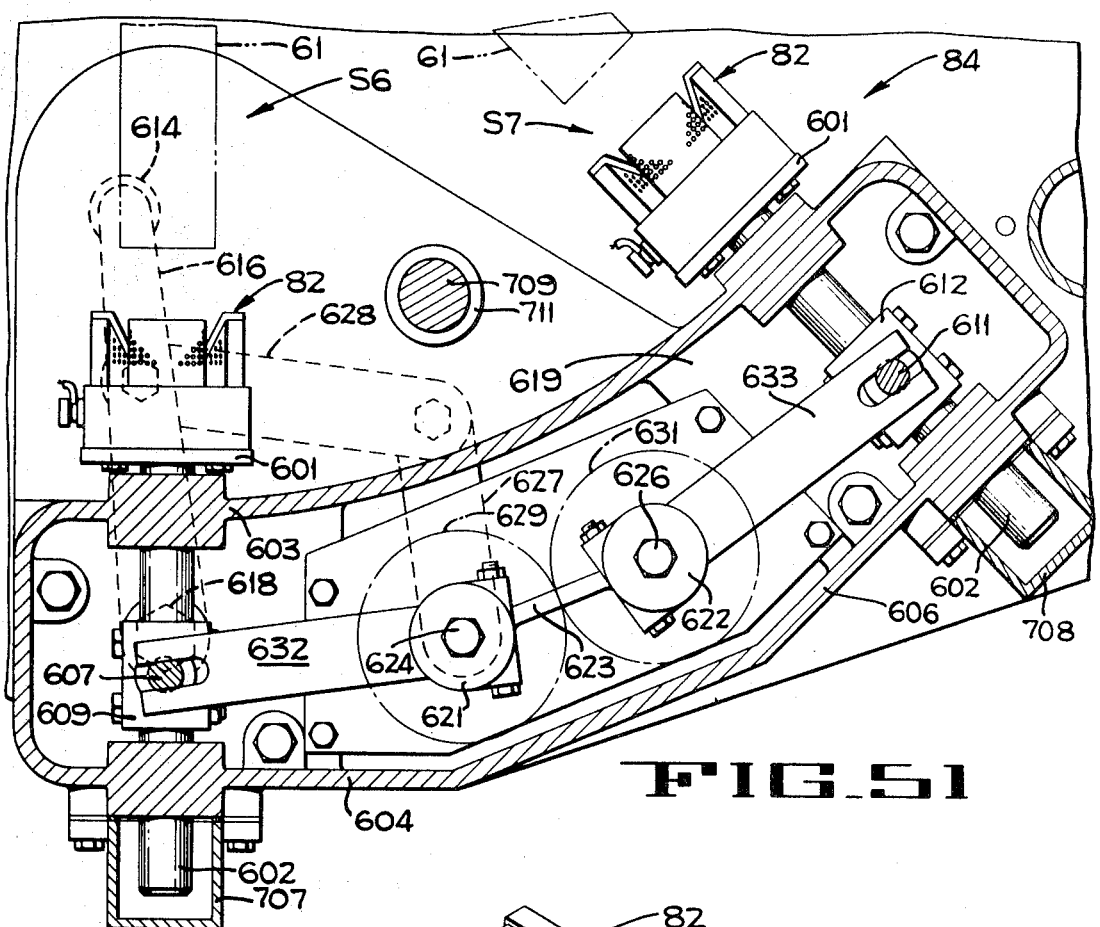
FIG. 51 is a horizontal section taken along lines 51–51 of FIG. 50 illustrating the actuating mechanism for the bottom heating heads.

Although the cartons handled by this machine are not a part of the present invention, it is to be understood that the cartons are made of a thermoplastic laminate, including a laminated cardboard inner base layer with a polyethylene coating on both the outside and the inside of the base layer. The transverse cross section of the bottom closure and of the top closures of each of the referred to carton sizes, i.e., the quart, one-third quart, pint and half-pint sizes, are identical and only the height of the carton varies. It is to be understood, that the machine may be easily modified to handle cartons of other capacities.

GENERAL DESCRIPTION

The carton forming apparatus 49 (FIGS. 1 and 2) of the present invention forms a part of a carton forming and filling machine 50 that is arranged to receive folded carton blanks B (FIGS. 3 and 4), open the blanks to a tubular configuration, seal the bottom closures BC of the blanks B to form cartons C, sterilize the cartons, fill the cartons, seal the top closures TC of the cartons, and thereafter stamp suitable identifying indicia on the cartons before discharging the filled and sealed cartons from the machine. Because of the many operations performed on the cartons as they pass through the machine, the different sections of the machine in which successive operations on the cartons are performed will be identified as consecutively numbered processing stations S1 through S22.

The carton forming and filling machine 50 (FIGS. 1 and 2) broadly includes a forming or dry section 52, and a filling or wet section 54 interconnected to the dry section by a carton sterilizing and accumulating section 56. The carton forming apparatus 49 of the present invention is disposed in the forming section 52 and performs the blank opening and bottom sealing functions. The cartons are advanced through the forming section 52 (Stations S1—S11) in two rows by an intermittently driven carton forming turret 58 having an upper and a lower series of horizontally disposed, equally spaced, mandrels 60 and 61, respectively. The two rows of cartons are then transferred into the sterilizing and accumulating section 56 (Station S12 and S13) where a pair of continuously driven accumulating conveyors 62 and 64 of an accumulator 65 advance the two rows of cartons into accumulating guideways 66 of the accumulating section 56. The two rows of cartons form two columns of cartons in the guideways, permitting the lower carton in each column to be transferred upon demand of the filling section 54 into a common continuously-driven carton transport conveyor 68 of the filling section 54 (Stations S14 to S22) during which time the cartons are filled, sealed, marked, and subsequently discharged from the machine 50.

In general, the cartons progress through the following operating components at the twenty two processing stations in the following manner. An upper magazine 70 at Station S1 (FIGS. 1 and 2) and a lower magazine 71 at Station S2, each receives a stack of flat folded carton blanks B (FIGS. 3 and 4). The folded carton blanks B are withdrawn from the upper magazine 70 (FIGS. 1 and 2) by an upper erecting mechanism 72 at the station S3 which overbends the blanks and places them one at a time in the form of an open-end tube of square cross section in position to be engaged by an upper loader 74 which is also located at station S3 and pushes the squared carton blanks onto the associated upper mandrels 60 with the bottom closures projecting outwardly therefrom. Similarly, carton blanks are withdrawn from the lower magazine 71 by a lowered carton erecting mechanism 76 at the Station S4 which places the carton blanks B in position to be engaged by a lower loader 78 which pushes the carton blanks one at a time onto the lower mandrels 61 as the lower mandrels are intermittently registered with the loader 78 at station S4. Thus when erected cartons are disposed on the mandrels 60 and 61 the top end of each carton is disposed inwardly toward the axis of the turret while the bottom of the carton is positioned near the periphery of the turret.

After a pair of open-ended, tubular carton blanks B have been placed on an upper mandrel 60 and on a lower mandrel 61, which mandrels lie in common vertical planes, the intermittently driven forming turret 58 indexes the cartons to Station S5 where identical bottom forming heads 80 of a bottom former 81 engages the bottom closure flaps of the carton blanks and bend the flaps about score lines formed in the bottom closure. The cartons are then advanced to Station S6 where heating heads 82 of a bottom heater 84 direct hot air at only those portions of the bottom closure flaps which are subsequently sealed together. After being partially heated at Station S6, the cartons are advanced to Station S7 where other bottom heating heads 82 of the bottom heater 84 direct additional hot air at only those flaps of the bottom closures which are subsequently sealed together to complete the bottom heating operation, leaving the thermoplastic material on the bottom flaps thereon in a tacky condition suitable for sealing. The cartons with the heated bottom closures are then moved past roller plows 86 at Station S8 which folds the bottom closure flaps together so that they are in sealing position as they reach the preliminary bottom sealing heads 88 of a preliminary bottom sealer 89 at the preliminary bottom sealing Station S9. After the bottom closures are partially sealed at Station S9, they are advanced to Station S10 where final sealing heads 90 of a final bottom sealer 91 completely seal the bottom closures and crush certain portions of the bottom closure flaps to block any potential undesirable flow passages in the bottom closures. The cartons with their bottom closures sealed are then advanced to Station S11 wherein an unloading mechanism 92 removes the partially closed cartons from the mandrels 60 and 61 of the forming section 52 and moves the cartons into positions to be received by the accumulator conveyors 62 and 64 of the sterilizing and accumulating section 56.

The two rows of cartons are then continuously moved upwardly by the conveyors 62 and 64 past ultraviolet lights 94 at station S12 thereby sterilizing the cartons. Continued movement of the accumulator conveyors 62 and 64 carries the cartons to Station S13 wherein the cartons are deflected from the conveyors 62 and 64 and gravitate into the carton accumulating guideways 66 where two stacks or columns of cartons with their bottom closures sealed are accumulated for subsequent feeding into the filling section 54 upon demand from the filling section.

At Station S14, two cartons, one from each guideway 66, are transferred onto the continuously driven carton conveyor 68 by a carton feed mechanism 96. The feed mechanism 96 cooperates with certain parts of a crimping turret 98 (FIG. 2) at Station S15 to crimp certain tabs of the top closures of the cartons and positively seat the cartons on the conveyor 68. The cartons are then advanced to Station S16 where a top forming turret 100 bends certain flaps of the top closures around score lines formed in the top closures. The cartons then move past a no-carton no-fill turret 102 at Station S17 and into a filling turret 104 at Station S18 where all cartons are filled by one of eight identical filling heads 105 with the liquid being processed. After being filled, the cartons are advanced to a top heating turret 106 at Station S19 where those flaps of each top closure, which are subsequently sealed together, are heated to the bonding temperature by hot air. The cartons are then advanced to a top sealing turret 108 at Station S20 where the heated top closures are sealed. The filled and sealed cartons are then advanced past the marking Station S21 where a marking turret 110 impresses suitable carton identifying indicia upon the cartons. The cartons are then discharged from the carton former and filler 50 by a continuously driven discharge conveyor 112 at Station S22.

THE CARTONS

Although the cartons per se form no part of the present invention, the construction of the quart carton C FIGS. 3 to 11) will be described in detail in order to facilitate the understanding the carton closing and filling machine 50. Since the one-third quart carton C1 (FIG. 7), the pint carton C2 and the half-pint carton C3 have top closures TC and bottom closures BC which are identical to the top and bottom closures of the quart carton C, only the quart carton C will be described in detail.

The material from which the carton C is formed is cardboard having a polyethylene coating on both surfaces to provide a finished carton of five barrier construction with the polyethylene coating on its outside and inside surfaces. Each carton blank B (FIGS. 3 and 4) is supplied in flat folded form by the carton manufacturer. The carton blank B includes a top closure TC and a bottom closure BC which are formed from opposite ends of four walls, i.e., a front wall 121, a rear wall 123, and sidewalls 122, and 124 (FIG. 5). The walls 122 and 123 are connected together by a flange 125 (FIG. 4) which is formed on wall 123 and connected thereto along fold line 125a, and is sealed to the wall 122 in overlapping relation. The front or pouring wall 121 is provided with a central longitudinally extending score line 126 and an inverted V-shaped score line 127 to facilitate slight outward bending of the carton wall 121 principally along the central score line 126 when milk is to be poured therefrom by the customer. Transverse score lines 128 and 129 are formed across the lower end and upper end, respectively, of each wall 121, 122, 123 and 124 to facilitate the bending of the bottom closure BC and the top closure TC relative to the sidewalls during closure of the ends of the carton.

The bottom closure BC includes a front flap 132 (FIG. 5) projecting from and forming part of the wall 121, and a flap 133 projecting from wall 123, each flap being provided with a V-shaped score line 134 to facilitate the inward bending of the flaps and to define triangular sections 132a, 132b, 133a and 133b (FIG. 5). The bottom closure also includes a flap 136 that is an extension of wall 122 and which is slightly longer than the opposed bottom flap 138 so as to provide a lip 137

(FIG. 6) which is adapted to overlap and be subsequently sealed to the bottom flap 138.

The top closure TC (FIGS. 8 to 11) includes a front flap 139 projecting from wall 121, a flap 141 projecting from rear wall 123, a flap 142 projecting from wall 124 and an opposing side flap 143 projecting from wall 122. Each upper flap includes an upper transverse score line 144 which is disposed above and is parallel to an adjacent score line 129. The cardboard base, but not the polyethylene coating, at the score line 144 on the front flap 139 and along portions of the score line 144 on the flaps 142 and 143 adjacent the flap 139 are partially perforated to weaken this area so that the top closure TC can easily be opened by the customer by tearing along this perforated line. As shown in FIG. 8, tabs 146 and 147 on the front and rear flaps 139 and 141, respectively, are bent outwardly, while oblique score lines 148 on the front and rear flaps permit the upper flaps to be bent inwardly. Shallow ears 149 project from the front and rear flaps on the side adjacent the flap 142, long ears 151 on the other side of the front and rear flaps, a narrow lip 152 on flap 143, and a wide lip 153 on the flap 142 cooperate when the top of the carton is closed as indicated in FIG. 11 to provide a rigid interlaced joint for the top closure TC.

THE CARTON FORMING TURRET

The carton forming turret 58 (FIGS. 12—21) of the carton forming apparatus 49 in the forming section 52 is provided for the purpose of supporting the carton blanks B while the necessary operations are performed on the bottom closures BC to seal the bottom closures of the cartons. As mentioned previously, the turret 58 includes an upper series of radially projecting mandrels 60 and a lower series of radially projecting mandrels 61, said mandrels being identical and each lower mandrel 61 lying in a common vertical plane with an associated one of the upper mandrels 60. The turret 58 is intermittently driven so that each pair of vertically aligned mandrels 60 and 61 is indexed step-by-step from Station S3 to Station S11 during which time the bottom closures of the preformed, heated and sealed, and are then pulled free from the mandrels at Station S11 after their bottom closures have been sealed.

The turret 58 (FIGS. 12—15) is supported by a rigid cast frame 160 which is mounted on adjustable legs 161 that may be adjusted so as to compensate for minor variations in the elevation of the floor of the dairy thereby assuring that the axis of rotation of the turret will be maintained vertical. Tie rods 159 (FIG. 13) are provided for rigidly connecting the frame 160 of the forming section 52 to the filling section 54. The frame 160 has an intermittent driving unit 162 (FIG. 15) such as a Ferguson drive, bolted thereto. The Ferguson drive may be Model QPF125 Roller Gear Drive, Code 8, 5304M-90 marketed by Ferguson Machine Corporation, 7818 Maplewood Industrial Ct., St. Louis, 17, Missouri. The intermittent driving unit 162 intermittently advances the upper row and the lower row of cartons through the forming section 52 at approximately 60 cartons per minute. In operation the turret is in motion 20 percent of the time and is stationary while the cartons are at the various stations for 80 percent of the time. The drive unit 162 includes a vertically extending tubular shaft 163 journaled for rotation in a drive housing 165 which is bolted to the frame 160. The shaft 163 has a turret-supporting flange 164 welded to the upper end thereof. The base 166 of a cylindrical turret hub 167 is bolted to the flange 164 and has a central aperture 168 therein which communicates with a passage 169 in the tubular shaft 163.

As clearly indicated in FIGS. 14 and 15, eight upper mandrels 60 and eight lower mandrels 61 are bolted to the periphery of the turret hub 167 and project radially outwardly therefrom at evenly spaced intervals to define an upper and a lower horizontal series of mandrels.

It will be appreciated that each mandrel is a substantially solid metal member and is subjected to considerable heat at the heating Stations S6 and S7 and, accordingly, must be cooled to prevent the cartons from adhering to the mandrels after prolonged operation. Therefore, each upper mandrel 60 has a U-shaped liquid coolant passage 171 therein which communicates with an associated radial inlet passage 172 formed in the tubular hub 167, and with a radial outlet passage 173 formed in the hub 167 above the inlet passage. Similarly, each lower mandrel 61 has a liquid coolant passage 174 (FIG. 15) therein which communicates with an associated radial inlet passage 175 and with an associated radial outlet passage 176 formed in the tubular hub 167.

In order to direct coolant water through the mandrels, a supply conduit 177 (FIG. 15) is connected to a source of water under pressure and to a swivel joint 177a which is of the type that permits rotation of the turret while maintaining a fluidtight connection. The joint 177a communicates with an axial supply passageway 178 formed in a water distribution manifold 179 that is inserted within the tubular hub 167. The manifold 179 includes a cover 180 which is bolted to the upper end of the tubular hub 167 and is sealed thereto in fluidtight relationship by an O-ring 181. An annular groove 182 formed in the outer periphery of an upper, large diameter distribution disc 183 of the manifold 179 communicates with all the upper inlet passages 172 in the tubular hub 167 and with the axial supply passageway 178 through four radial passages 184 in the disc 183. O-rings 186 are provided on both sides of the annular groove 182 to seal the disc 183 to the internal surface of the hub 167. A lower, large diameter distribution disc 188 is provided with an annular groove 189 which is connected with the axial supply passageway 178 by radial passages 191 and supplies high pressure coolant water to each of the lower inlet passages 175 for distribution through the lower mandrel 61. O-rings 192 are provided on opposite sides of the groove 189 in the periphery of the disc 188 to seal the disc 188 to the internal surface of the hub 167. A plug 194 blocks the lower end of the supply passageway 178 and accordingly, all inlet water must be directed through the mandrels 60 and 61 prior to being returned to the hub 167 through the upper outlet passages 173 and lower outlet passages 176. This heated coolant water then flows through vertical passageways 196 formed in the upper disc 183 and in the lower disc 188 and in the hub portion connecting the discs. From the passages 196 the heated water passes into and through the aperture 168 in the base 166 of of the hub 167 before being discharged from the machine through the passage 169 in the tubular shaft 163 of the intermittent driving unit 162.

The upper mandrels 60 and lower mandrels 61 are identical, accordingly, only one of the upper mandrels 60 (FIGS. 16—21) will be described in detail. As mentioned previously, each mandrel 60 serves the purpose of supporting the associated carton C while the several bottom closing operations are being performed on the bottom closure BC of the carton to seal the same. The mandrel also features an adjustable carton stop 200 thereby adapting the mandrel to handle the previously mentioned four carton sizes.

Each mandrel 60 comprises an elongated carton receiving body 201 having a flange 202 on one end which is bolted to the turret hub 167. An elongated horizontal slot 203 (FIGS. 17 and 19) and an elongated vertical slot 204 (FIGS. 16 and 19) extend longitudinally of the mandrel 60 and cut transversely through the center of the mandrel. The slots 203 and 204 terminate near the opposite ends of the mandrel and cooperate with an upper generally V-shaped groove 206 (FIG. 19) and a lower somewhat V-shaped groove 207 to accommodate the carton stop 200. A latch plate 208 (FIG. 21) with a longitudinally extending slot 209 therein, which registers with the vertical slot 204, is bolted in the lower V-shaped groove 207 and is provided with transversely extending locking grooves 210, 211, 212, and 213 that selectively receive locking ears 214 of a latch plate 215 to thereby lock the adjustable stop 200 in either the quart, one-third quart, pint, or the one-half pint positions.

The adjustable carton stop 200 comprises a vertically extending slide block 216 (FIGS. 19 and 20) which is slidably received in the vertical slot 204 and includes a pair of spaced downwardly projecting ears 217 which project outwardly of the lower V-shaped groove 207 in position to be engaged by a leading edge of the top closure of the carton blank B as the blank is moved onto the mandrel. An upper angle member 219 is bolted to the slide block 216 and includes a pair of upwardly projecting spaced ears 221 which engage another edge of the top closure of the carton blank to hold the carton blank in desired position on the mandrel. A horizontally disposed tab breaking plate 223 is slidably received in the horizontal slot 2030 and is slotted at 224 (FIG. 19) to receive a portion of the vertically extending slide block 216. The vertical block 216 is provided with a similar slot 226 (FIG. 20) to receive a portion of the tab breaking plate 223 which plate is rigidly secured to the body 216 by a capscrew 227. The breaking plate 223 has ears 228 and 229 (FIG. 16) which project outwardly of the body 201 and includes curved tab breaking surfaces which bend the tabs 146 and 147 outwardly. The carton blank B is held in desired position on the mandrel by a spring clip 232 which is bolted at one end to the tab breaking plate 223 while the other end resiliently engages the carton blank to hold the same on the mandrel.

In order to shift the adjustable carton stop 200 from the quart carton position to any of the other carton size positions, a double shouldered bolt 236 (FIG. 20) is slidably received in a mating bore 238 formed in the vertical slide block 216. The latching plate 215 is rigidly secured between a shoulder 239 on the bolt 236 and a nut 241 screwed on the lower end thereof. A compression spring 242 is disposed between a shoulder 243 on the bolt 236 and a shoulder 244 in the bore 238, and normally urges the locking ears 214 upwardly into the preselected groove 210, 211, 212 or 213, depending upon what size carton is being handled. When it is desired to change carton sizes, the bolt 236 is merely pushed downwardly against the urging of the spring 242 and the adjustable carton stop 200 is moved to the desired position longitudinally of the mandrel. The bolt 236 is then released so as to urge the ears 214 in the proper locking grooves 210, 211, 212 or 213.

As shown in FIGS. 16 and 17, each mandrel is provided with a flap engaging head 246 which is secured to the free end of the mandrel by studs 247 and cooperating nuts 248. The head 246 has a flat pressure resisting face 249 with an open centered, triangle-shaped raised portion 251 thereon. When the flaps of the bottom closure are folded during the sealing operation, the triangle-shaped portion fits within the carton to compensate for varied bottom wall thickness caused by different numbers of layers of bottom closure walls being used to define the sealed bottom closure of the carton. The periphery of the head 246 is chamfered so as to more readily receive the carton blank B, and grooves 252 and 253 (FIG. 18) are formed in the upper and lower edges of the head 246 to provide for the subsequent mechanical discharge of the cartons from the mandrels. A recess 254 (FIG. 18) is provided in one corner of the head 246 to accommodate the extra carton thickness at this point resulting from a portion of the carton wall flange 125 (FIG. 3) being disposed in this area during the bottom sealing operation.

It will be understood that the carton engaging stop ears 217 and 221 of the adjustable carton stop 200 are locked by the locking ears 214 in positions which will cause the transverse score lines 128 on the bottom of the carton to lie in the plane of the pressure resisting face 249 at the outer end of the head regardless of what size carton is positioned on the mandrel.

The drive train 260 for the turret 58 and other components of the forming section 52 is best illustrated in FIGS. 12 and 13. The drive train 260 receives power from a variable speed motor 3M which includes a magnetic brake to immediately stop the motor when deenergized. The motor 3M is connected by a belt drive 266 to an overload clutch 264, such as a Maxitorq clutch Model No. 24 marketed by Carlyle Johnson Co., 52 Main St., Manchester, Connecticut. The clutch 264 drives a gear reducer 268 having cams 270 and 272 secured to output shafts thereof. Another output shaft 273 of the gear reducer 268 is connected by a flexible coupling 274 to the input shaft 276 of the intermittent driving unit 162 thereby intermittently driving the forming turret 58.

A continuously driven output shaft 277 of the driving unit 162 is connected by a flexible coupling 278 to a lower right angle gear box 279 which is, in turn, coupled to an upper right angle gear box 281 which includes an output shaft 282 which has its axis angled at approximately 45° relative to the axis of an output shaft 283 of the lower right angle gear box 279. The upper right angle gear box 281 includes a second, vertically extending output shaft 284. A second continuously driven output shaft 286 (FIG. 13) of the driving unit 161 has a sprocket 287 and a barrel cam 288 secured thereto which sprocket and cam drive other components of the forming section 52 and sterilizing and accumulating section 56 of the carton former and filler 50. The sprocket 287 is connected by a chain drive 289 to a sprocket 289a on the input shaft 290 of a right angle gear box 291.

CARTON MAGAZINES

As illustrated in FIGS. 1 and 2, two carton magazines are provided. The upper magazine 70 is disposed at Station S1 to supply carton blanks B to the upper series of mandrels 60, and the lower magazine 71 is disposed at Station S2 to supply carton blanks to the lower series of mandrels 61. Since the carton forming and filling machine 50 is adapted to handle four different carton sizes, the magazines 70 and 71 feature adjustable means which adapt them to selectively handle each of the four sizes of carton blanks B illustrated in phantom lines in FIG. 23. The magazines 70 and 71 are inclined downwardly approximately 30° so that the carton blanks B will gravitate from the upper inlet end 292 of each magazine to the lower discharge end 293 thereof. The upper magazine 70 and lower magazine 71 are identical, accordingly, only the upper magazine 70 will be described in detail.

The magazine 70 comprises a cast subframe 294 (FIGS. 22 and 23) having a pair of upstanding arms 296 and 297 formed integrally therewith, the arms 296 and 297 being on the same side of the magazine, with the arm 296 being disposed adjacent the inlet end 292 of the magazine and the arm 297 being disposed adjacent the discharge end 293. An elongated, fixed guiding and supporting rail 298 is rigidly bolted to the arms 296 and 297 and extends the full length of the magazine in order to engage and guide the bottom closures of the folded carton blanks B from the inlet end of the magazine to the discharge end thereof. The fixed rail 298 includes a carton supporting flange 299 (FIG. 23) upon which one edge of the bottom closure is supported, a lower vertical guiding surface 301 and an upper vertical guiding surface 302 which serves to guide the left end (FIG. 23) of the bottom closure of the carton blanks B, and an elongated flange 303 which fits over a horizontal edge 304 of a lower carton flap to prevent upward movement of the carton blanks as they gravitate down the inclined magazine 70.

A pair of adjustment shafts 306 and 307 are secured to the frame 294 below the guide rail 298 and extend transversely thereof. Upstanding movable arms 308 (FIG. 24) and 309 (FIG. 23) are slidably supported on the shafts 306 and 307, respectively, and have an elongated moveable guiding and supporting rail 311 secured thereto. The rail 311 includes a carton supporting flange 312, a lower vertical guiding surface 313, an upper vertical guiding surface 314, and an angle flange 316 which fits within a slot 317 in the top closure flaps of the carton blanks B when the blanks are in the flatfolded condition.

It will be appreciated that the flat carton blanks are positioned transversely to the magazine, and in FIG. 23, cartons of four different sizes are shown in phantom lines, the largest carton extending from the fixed rail 298 to the movable rail 311. In order to accommodate all four sizes of carton blanks, the rail 311 is selectively movable on the shafts 306 and 307, each of which is provided with annular grooves 318, 319, 320, 321, 322 and 323, certain ones of which accommodate resilient hairpin locks 324 (FIGS. 23—25) for locking the movable rail 311 in selected position. Each hairpin lock 324 is received in a slot 326 (FIG. 25) form in the hubs 308a and 309a of the arms 308 and 309 and is resiliently urged into the appropriate annular groove. The grooves 321 are provided for one-half pints, grooves 322 for one-third quarts, grooves 323 for pints, and grooves 324 for the quart size carton blanks. In order to change carton sizes, the pins 324 are first withdrawn from their slots, the arms 308 and 309 with the rail 311 attached thereto, are then shifted to the new carton size position, and the pins 324 are then inserted into the proper annular grooves thereby locking he movable rail 311 in desired carton guiding position.

In order to assure positive movement of the carton blanks B downwardly to the discharge end 293 of the magazine 70, a weighted pusher 327 (FIGS. 22 and 23) is provided. The pusher 327 includes an apertured carrier 328 which is slidably received on an elongated shaft 329 which extends longitudinally of the magazine 70. Carrier stabilizing rollers 331 are journaled on bolts 332 secured to the carrier and projecting downwardly into position to slidably engage a shaft 333 which is parallel to and is disposed below the shaft 329. The shafts 329 and 333 are bolted at their lower ends to a slide block 334 and have their upper ends received within parallel holes in a second slide block 338. The slide blocks 334 and 338 are slidably supported for transverse movement on the adjustment shafts 306 and 307.

Resilient hairpin locks 339 are provided to lock the pusher 327 in selected position for the four sizes of carton blanks and are selectively inserted in slots 341 formed in the slide blocks 334 and 338. The hairpin locks 339 are selectively positioned to resiliently engage the aforementioned annular grooves 318, 319 or 320 in the adjustment shafts 306 and 307. When the locks 339 are fitted in the slots 320, the pusher 327 is in proper position to handle quart size carton blanks. When the blocks 334 and 338 are locked in the position shown in FIG. 25 by engagement of the locks 339 with the grooves 318 the pusher 327 is locked in position to handle ⅓ quart and ½pint size carton blanks. Engagement with the slot 319 locks the pusher in position to handle pint size blanks.

The pusher 327 includes a pivotal pusher plate 343 having an upper end 344 which engages the rearmost carton blank in the magazine 70 near its vertical midpoint. The plate 343 is journaled on a shaft 345, and the shaft 345 is journaled in the ears 346 projecting upwardly from the carrier 328. A torsion spring 347 is wound around the shaft 345 and has one end secured to the carrier 328 while the other end engages the pusher plate 343 and urges it in a clockwise direction, as viewed in FIG. 22, to normally hold the free end of a stop finger 348 in abutting engagement with the carrier 328. The stop finger 348 is integral with the plate 343 and accordingly the plate 343 is held in the position shown in FIG. 22 during normal operation of the machine.

When the supply of carton blanks B in the magazine 70 becomes low and it is desired to add additional blanks to the magazine, a new case of approximately 250 sterilized carton blanks is inserted into the upper inlet end 292 of the magazine 70. The operator grips a handle 349 projecting outwardly from the carrier 328 and pulls the carrier toward the upper inlet opening 292 while holding the new supply of cartons from movement. The pusher plate 343 at this time pivots downwardly against the urging of the spring 347 until the plate is moved below and past the new supply of carton blanks. When the plate is on the upper side of the blanks, the spring returns the plate to its normal carton pushing position behind all the carton blanks in the magazine. Release of the handle 349 by the operator then causes the plate to gravitate against the rearmost carton blank thereby urging all of the blanks toward the lower discharge end 293 of the magazine 70.

The foremost carton blank in the magazine is held from gravitation discharge therefrom by upper carton arresting fingers 351 (FIG. 23) and lower carton arresting fingers 352 and 353. The upper fingers 351 project downwardly from a support bar 354 that is bolted to an inverted U-shaped bracket 356 which is, in turn, bolted to upstanding legs 357 (FIG. 24) and 358 (FIG. 22) of the subframe 294 at the lower discharge end 293 of the magazine 70. The lower arresting finger 353 is bolted to the fixed arm 297, and the other lower finger 352 is bolted to the movable arm 308 and accordingly is adjusted with the adjustable rail 311. It will be understood that the fingers 351, 352 and 353 cooperate to retain the carton blanks B in the magazines 70 or 71 until the associated carton erecting mechanisms 72 or 76 remove the carton blanks B therefrom. If the supply of cartons in the magazine is diminished to such an extent that the supply of cartons is moved off a normally open limit switch 3LS thereby permitting the switch to open, certain electrical controls fully described in the parent application will be actuated to prevent further removal of cartons from the magazine 70 during normal automatic operation of the machine 50.

ERECTING AND LOADING MECHANISMS

The upper carton erecting mechanism 72 (FIG. 26) is located at Station S3 (FIG. 2) and receives flatfolded carton blanks B from the upper magazine 70, squares and overbends the carton blanks, and then places the squared blanks B one at a time in position to be engaged by the upper mandrel loader 74 and be pushed onto one of the upper mandrels 60 of the carton forming turret 58. At station S4, the lower carton erecting mechanism 76 (FIGS. 43 and 44) similarly receive carton blanks B from the lower magazine 71, squares and overbends the carton blanks, and then place the squared blanks in position to be engaged by the lower mandrel loader 78 which pushes the squared blanks onto the lower mandrels 61 of the turret 58.

Because the upper erecting mechanism 72 and upper loader 74 are quite similar to the lower erecting mechanism 76 and lower loader 78, only the upper erecting mechanism and loader, and the parts common to both upper and lower components, will be described in detail. Parts of the lower erecting mechanism 76 and lower loader 78 which are equivalent to parts of the upper erecting mechanism 72 and loader 74 will be assigned the same numerals followed by the letter a.

The upper carton erecting mechanism 72 (FIGS. 26—42) comprises a cast subframe 366 (FIGS. 26—30 and 42) which is bolted to the main frame 160 of the carton forming section 62 and is oriented with the subframe 366a of the lower carton erecting mechanism 76 as indicated in phantom lines in FIG. 42. The discharge end 293 of the upper magazine 70 is connected to a cross-shaft 367 (FIGS. 26 and 27) that is supported by brackets 368 and 369 that are bolted to upstanding sidewalls 370 and 371 of the subframe 366.

A suction head 372 (FIGS. 26—30) having three suction cups 373, 374 and 376 thereon is bolted to an L-shaped bracket 377 (FIG. 28) that is journaled on a bolt 378. The bolt 378 is secured to one end of a head supporting bell crank 379 that is journaled on a bolt 380 secured to the upstanding wall 371 of the subframe 366. An actuating arm 381 of the bellcrank 379 is pivotally connected to one end of the connecting rod 382 that has its other end journaled on a stud 383. The stud is eccentrically mounted on a crank disc 384 that is concentric with and is bolted to the flat face of a cam 386 that is keyed to the output shaft 282 of the aforementioned gear box 281 (FIGS. 13 and 27). The crank disc 384 may be mounted for a limited amount of angular adjustment relative to the cam 385 by any suitable means such as that illustrated in FIG. 26. Thus, rotation of the output shaft 282 will cause the bellcrank 379 to swing through a predetermined arc about the axis of the bolt 380.

In order to cause the suction head 372 to pivot about the axis of the bolt 378, a suction head shifting bellcrank 387 has a cam follower 388 journaled on one end thereof which cam follower rides in a cam way 389 defined by two plates 391 and 392 bolted to the L-shaped suction head supporting bracket 377. The bellcrank 387 is journaled on a bolt 393 that is secured to the upstanding frame wall 371. The other end of the bellcrank 387 is pivotally connected by an adjustable link 394 to a stud 396 which projects outwardly from the head supporting bellcrank 379 as clearly indicated in FIGS. 29 and 30. Thus, one complete rotation of the output shaft 282 and the disc 384 will cause the suction head 372 to move from the carton pickup position shown in FIG. 29 to the carton discharge position shown in FIG. 30 and thereafter will return to the pickup position.

The suction head 372 (FIGS. 28, 31, 32 and 33) comprises a body 401 having an elongated passage 402 formed therein which passage communicates with a flexible suction supply conduit 403 and with ports 404 and 406 (FIG. 32) formed in the bolts 407 which secure the suction cups 374 and 376 to the body 401. A second elongated passage 408 (FIG. 31) communicates with the supply conduit 403 through a valve housing 409, which is part of the body 401 and with the suction cup 373 through passages 411 and 412 (FIG. 31).

When quart size carton blanks B are being handled, the blanks are gripped by the three suction cups 373, 374 and 376. However, when pint, ⅛ quart and ½pint size blanks are being handled, the suction cup 373 does not engage the blank and accordingly the vacuum supply to the cup 373 must be interrupted. Such interruption is rapidly and effectively accomplished by a shutoff valve 414 that is partially inserted within the valve housing 409.

The valve 414 comprises a conical valve head 416 which is secured to a valve stem 417 slidably received in a cap 419 which is screwed into the open end of the valve housing 409. A helical compression spring 421 disposed between the valve head 416 and the cap 419 normally urges the head toward port closing position against a valve seat 422 formed in the valve housing 409 which, when closed, prevents suction from being created within the housing. An operator's control pin 423 extends transversely through the end of the valve stem 417 and may be gripped by an operator when it is desired to shift the valve between an open and a closed position. The valve head 416 is maintained in the open position by a lock pin 424 which is secured to the stem 417 and bears against the outer face of the cap 419. When it is desired to close the valve 414, the stem is pivoted 90° allowing the lock pin 424 to seat in a slot 426 formed in the cap 419.

A rotary vacuum control mechanism 429 (FIGS. 34—39 is provided in order to control the application of vacuum to the suction distribution conduit 403 and to the suction cups when the cups are moving between the carton blank pickup position shown in FIG. 29 and the carton blank discharge position shown in FIG. 30, and to thereafter vent the suction cups when the cups are returning to the pickup position.

The vacuum control mechanism 429 is driven in timed relation with the movement of the suction head 372 from the vertical output shaft 284 (FIGS. 13, 34 and 35) of the aforementioned upper right angle gear box 281. The shaft has a crank arm hub 432 keyed thereon which has a vacuum control drive gear 433 (FIG. 35) bolted to the lower surface thereof. The drive gear 433 meshes with an idler gear 434 which is journaled on a bolt 436 that is secured to a bracket 437 bolted to the gear box 281. The idler gear 434 meshes with a vacuum distribution gear 438 that is journaled on a shouldered bolt 439 which is secured to the bracket 437. The gear 438 is sandwiched between an upper nylon disc 440 and a lower nylon disc 441 and is held firmly thereagainst by a compression spring 442 which is disposed between the head of the bolt 439 and a pressure plate 443. The upper disc 440 communicates with a source of vacuum by means of a vacuum supply conduit 444 which is fitted through an opening in the pressure plate 443 and is screwed into a port 445 in the upper disc 440. The upper disc 440 is held from rotation by an angle stop bar 446 which is bolted to the bracket 437 and is notched at 447 to receive the vacuum supply conduit 444. Similarly, the lower disc 441 establishes communication with the source of vacuum and is held from rotation by a supply conduit 448 which fits through a hole in the bracket 437 and is screwed into a port 449 in the lower disc 441.

As illustrated in FIGS. 36—39, an arcuate groove 454 is formed in the upper surface of the distribution gear 438 and registers with the upper vacuum supply conduit 444 during the time the upper suction head 372 moves between the carton pickup position and the discharge position illustrated in FIGS. 29 and 30, respectively. During this time, suction is communicated to the upper suction head 372 from the source of supply, through the conduit 444, through the upper arcuate groove 454, through a radial groove 456, (FIG. 38) formed in the lower surface of the upper nylon disc 440 and into the upper suction head 372 through the conduit 403.

After the carton blank has been removed from the upper magazine 70 and is being placed in the discharge position, the gear 438 which is rotating in a counterclockwise direction is moved to the position shown in FIG. 36 wherein the arcuate groove 454 has moved out of registry with the radial groove 456. At this time, the suction cups 373, 374 and 376 are vented to the atmosphere through the conduit 403, through a short arcuate groove 457 (FIGS. 36 and 37) in the gear 438 and to the atmosphere through a radial passage 458 in the gear. Continued counterclockwise rotation of the gear 438 will terminate the venting and the vacuumizing of the cups until the conduit 444 again establishes communication with the arcuate groove 454 which occurs as the suction head 372 moves into the pickup position illustrated in FIG. 29.

Similar grooves in the lower surface of the distribution gear 438 and in the upper surface of the lower nylon disc 441 control the venting and supply of suction to the lower suction head 372a (FIGS. 43 and 44).

Since the material from which the carton blanks B are formed is rather stiff and tends to remain in the flatfolded position, it is desirable to overbend the carton blanks, i.e., to bend the carton blanks past a squared position as indicated in FIG. 40 so as to reduce the resilience of the carton material which tends to return the carton blank to the flatfolded position. Accordingly, an overbend plate 462 (FIGS. 22, 26 and 40) is provided and has flanges 463 (only one being shown) projecting downward therefrom and connected to brackets 464 by bolts 465. The brackets 464 are rigidly secured to the frame 294 of the magazine 70 by cap screws 466 and cooperating tubular spacers 467 (FIG. 24). The position of the overbending plate 462 may be varied by pivoting the plate 462 about one of the bolts 465 while the other bolt swings within an arcuate slot 468 in the associated flange 463. The plate 462 includes an edge engaging section 469 which is maintained in a substantially horizontal plane, and an upwardly inclined side engaging section 471 which is provided with a curved outer edge 472.

In order to aid the suction head 372 and sharply overbend the carton as indicated at 374 in FIG. 40, a nylon overbend bar 476 is bolted to a bracket 477 which is in turn bolted to the suction head 372. As clearly indicated in FIG. 40 the overbending bar 476, when positioned at 374, moves quite close to the curved edge 472 thereby sharply overbending the carton blank prior to its introduction in the form of a square, open-ended tube in position to be engaged by the upper loader 74 (FIG. 41).

The upper loader 74 (FIGS. 26, 27, 29, 41 and 42) includes a pivotal gate 481 which pivots from an inclined position to a vertical position to first receive the carton blank B and thereafter hold the blank in squared position as it is being moved onto the associated upper mandrel 60. A reciprocable pusher 482 (FIGS. 27 and (FIGS. having a Y-shaped pusher finger 483 bolted thereon is provided for pushing the squared carton blank pushes the onto the particular upper mandrel 60 that is indexed at Station S3.

As shown in FIG. 40, the squared carton blank B is received upon a support table 484 which defines a pair of support rails 486 and 487 (FIGS. 27, 29, 40 and 41) having a slot 488 therebetween. A vertically extending fixed carton squaring plate 489 is bolted to the rail 486 and projects upwardly therefrom to engage one wall of the squared carton blank. The table 484 is of one-piece cast construction and is bolted to an angle bracket 491 which is, in turn, bolted to the subframe 370.

The pivotal gate 481 is welded to a tubular shaft 492 which is journaled on a fixed shaft 493 that is secured to the table 484 adjacent the rail 487. A lever arm 494 is secured to and projects outwardly from the tubular shaft 492 and has its free end pivotally connected to one end of an adjustable link 496. The other end of the adjustable link 496 is pivotally connected to one end of a bellcrank 497 which is journaled on a bolt 498 that is secured to a bracket 499 (FIG. 28) bolted to the frame 160 of the forming section 52. A cam follower 501 is journaled on the other end of the bellcrank 497 and rides in a cam groove 502 in the aforementioned face cam 385 thereby actuating the gate 481 in timed relation with the movement of the suction head 372.

With the carton blank held in the squared position by the rails 486 and 487, the fixed squaring plate 489 and the pivotal gate 481, the reciprocable pusher 482 engages the carton blank and pushes it through a guide chute 504 (FIGS. 27, 29 and 41) which is formed integrally with the table 484 and projects through an opening in the upstanding wall 370 of the subframe 366. The chute 504 includes a lower wall 505 that is aligned with the rails 486 and 487, an upstanding wall 506 aligned with the fixed plate 489, a second upstanding sidewall 507 aligned with the pivotal gate 481 when the gate is in the vertical position, and a top wall 509. The walls 507 and 509 have outwardly flared inlet flanges 508 and 511, respectively, to aid in guiding the carton into the chute 504. As indicated in FIG. 41, the discharge ends of the walls 505, 506 and 509 terminate at a point immediately adjacent the associated upper mandrel 60 so as to accurately guide the carton blank onto the mandrel. The second upstanding wall 507 terminates at 512 which is spaced outwardly from the end of the mandrel 60 a distance sufficient to permit the bottom closure of the carton blank which projects outwardly from the mandrel, to swing freely out of the chute 504 as the turret is indexed between station S3 and station S4.

The reciprocable pusher 482 comprises a main body 516 which is slidably mounted on shafts 517 and 518 which extend transversely of the frame 370 and are rigidly secured thereto. The Y-shaped finger 483 (FIG. 29) is bolted to the body 516 and projects upwardly through the slot 488 in the table 484. Flat faced pusher bolts 519 are screwed into the upper end portions of the Y-shaped finger 483 and are locked into desired position by nuts. The bolts 519 engage the uppermost edge of the bottom closure of the carton blank B at station S3 and, upon reciprocation of the pusher 482, pushes the squared blank onto the associated mandrel 60.

As best shown in FIG. 42, the pusher 482 is reciprocated in timed relation with the other components of the upper erecting mechanism 72 and loader 74 from a crank disc 522 which is locked in adjusted position onto the aforementioned crank arm hub 432 (FIGS. 35 and 42) by capscrews 523. The crank disc 522 has a crank pin 524 projecting upwardly therefrom which pin is journaled in one end of a connecting rod 526. The other end of the connecting rod 526 is pivotally connected to an arm 527 of a bellcrank 528 which is journaled on a shaft 529 secured to the frame 160 of the dry or forming section 52 of the machine. Another arm 530 of the bellcrank 528 is pivotally connected by an adjustable link 531 to the body 516 of the pusher 482. In this way, the pusher 482 is intermittently reciprocated between the carton receiving position shown in phantom lines in FIG. 42 and the mandrel loading position shown in solid lines in FIG. 42.

As mentioned previously, the lower carton erecting mechanism 76 (FIGS. 42, 43, and 44) and lower loader 78 are substantially identical to and operate at the same time as the upper erecting mechanism 72 and upper loader 74. Accordingly, only the drive parts of the lower mechanisms will be described in detail, and parts of the lower mechanisms which are equivalent to those of the upper mechanisms will be assigned the same numerals followed by the letter a.

The lower erecting mechanism 76 and loader 78 are positioned at Station S4 (FIGS. 2 and 42). The lower suction head 372a (FIGS. 43 and 44) is operated by a connecting rod 382a which is pivotally connected to a crank pin 534 that is eccentrically secured to a cam 536. The cam 536 is keyed to the previously mentioned output shaft 283 (FIGS. 13, 43 and 44) of the lower right angle gear box 279. The pivotal gate 481a of the lower loader 78 is operated from the bellcrank 479a which has a cam follower 501a which rides in a cam groove 537 in the cam 536.

The reciprocable pusher 482a (FIG. 42) of the lower loader 78 is pivotally connected by the adjustable link 531a to the bellcrank 538 that is pivoted on a shaft 539 secured to a bracket 541 that is bolted to the subframe 366a. An adjustable link 543 pivotally connects the bellcrank 538 of the lower loader 78 to the bellcrank 528 of the upper loader 74. Thus, all components of the lower erecting mechanism 76 and lower loader 78 operate at the same time and in the same manner as the upper erecting mechanism 72 and upper loader 74.

BOTTOM FORMER

After the carton blanks B have been loaded onto the upper mandrel 60 at Station S3 (FIGS. 1 and 2) and onto the lower mandrels 61 at Station S4, the carton blanks are advanced to Station S5 and are indexed with the associated bottom forming heads 80 (FIGS. 14 and 45—48) of the bottom former 81. Each bottom forming head 80, one being provided for the upper series of mandrels 60 and one being provided for the lower series of mandrels 61, engages and bends the flaps of the bottom closure BC FIGS. 5) about the score lines 128 and 134 to assure that the V-shaped front flap 132 and V-shaped rear flap 133 will bend inwardly, rather than outwardly during the subsequent bottom sealing operation.

The bottom former 81 (FIGS. 45 and 46) comprises a subframe 551 that is bolted to the main frame 160 of the form section 52 and includes parallel upstanding end walls 552 and 553 formed integrally with sidewalls 554 and 556. An upper forming head shaft 557 and a lower forming shaft 558 are aligned with the axes of the upper mandrel 60 and lower mandrel 61 when indexed at Station S5. Split blocks 559 and 561 are clamped onto the shafts 557 and 558, respectively and have opposite ends of a vertical stub shaft 562 secured thereto to rigidly interconnect the shafts 557 and 558 for simultaneous reciprocatory movement toward and away from the associated mandrels. A cam roller 563 journaled on the stub shaft 562 is received in the forked end of an arm 564 which arm is secured to the upper end of a vertical shaft 566 journaled in ears projecting outwardly from the wall 556 of the subframe 551. An actuating arm 567 is keyed to the lower end of the shaft 566 and has a cam follower 568 journaled on its free end, which cam follower 568 rides in a cam groove 569 formed in the previously mentioned continuously driven cam 270 (FIG. 13).

The bottom forming heads 80 are identical and each head includes a mounting plate 571 which is secured to the associated shaft 557 of 558 as by welding. A pair of flap engaging plows 572 and 573 are rigidly secured to a support plate 574 which is secured to and held in spaced relation from the mounting plate 571 by a plurality of bolts 576 which extend through tubular spacers 577. The plows 572 and 573 have adjacent flap engaging surfaces 578 and 579 which engage the bottom closure flaps 138 and 136, respectively, and cause them to bend inwardly about the score lines 128 when the head is moved from the position shown in FIG. 47 to the position shown in FIG. 48.

In order to assure that the bottom closure walls 132 and 133 are bent inwardly rather than outwardly, wall bending rollers 581 and 582 are journaled on the ends of bellcranks 583 and 584, respectively, and engage the walls 132 and 133, respectively, prior to engagement of the plow surfaces 578 and 579 with the carton walls 138 and 136, respectively. The bellcranks 583 and 584 are journaled on bolts 586 and 587, respectively, which bolts are secured to pairs of ears 588 (FIG. 46) that are secured to the support plate 574 and project toward the plate 571. The rollers 581 and 582 are urged toward each other by compression springs 591 (FIG. 47) which are disposed between the plate 574 and the other ends of the bellcranks 583 and 584, to the positions shown in FIGS. 47 wherein bosses 592 on the bellcranks limit the amount of inward movement permitted the rollers 581 and 582 and maintain the rollers in positions to engage the carton flaps 132 and 133, respectively.

When the forming heads 80 are moved to the active end of the forming stroke as indicated in FIG. 48, it will be noted that the rollers pivot slightly outwardly against the urging of the springs 591, which springs are of sufficient strength to sharply bend the associated carton walls. It will also be noted that the edges of the heads of mandrels 60 or 61 lie closely adjacent to the flap engaging surfaces 578 and 579 of the plows 572 and 573, and also lie closely adjacent to the flap contacting surfaces of the rollers 581 and 582 thereby assuring that the bottom closure flaps will bend sharply about the score lines 128 alleviating any tendency for the carton walls 132 and 133 to bend outwardly during any subsequent operation on the bottom closure.

BOTTOM HEATER

After the flaps of the bottom closure BC of the cartons on the mandrels 60 and 61 at the bottom forming Station S5 has been preformed and assume the position shown in FIG. 5, the turret 58 (FIGS. 2 and 14) indexes the cartons first at the preliminary bottom heating Station S6 wherein the bottom closure flaps are subjected to a preliminary hot air heating step, and thereafter index the carton to the final bottom heating Station S7 where the flaps are subjected to a final hot air heating step. The initial heating step at Station S6 and final heating step at Station S7 combine to raise the temperature of those polyethylene surfaces of the bottom closure flaps which are substantially sealed together to a bonding temperature which is approximately 800° F.

The bottom heater 83 (FIGS. 48—57) encompasses the two stations S6 and S7, as mentioned above, and includes four identical bottom heating heads 82 which direct hot air only at those surfaces of the bottom closures that are subsequently sealed together. Two of the heads 82 are reciprocated into and out of heating position with the bottom closures BC of the cartons on the upper and lower mandrels 60 and 61 at Station S6 while the other two heads simultaneously reciprocate into heating position with the partially heated bottom closures when the cartons are indexed at Station S7.

As best shown in FIGS. 49—53, each heating head 82 is bolted to an apertured plate 601 which is welded to one end of a tubular shaft 602. Two tubular shafts 602 are slidably received upstanding walls 603 and 604 of a bottom heater subframe 606, with the axis of one shaft being in alignment with the particular mandrel 60 at Station S6 while the other shaft is in alignment with the mandrel 61 that is indexed at Station S6. Similarly, the other two tubular shafts 602 are slidably received in the walls 603 (FIG. 51) and 604 and are in alignment with the longitudinal axes of the upper mandrel 60 and lower mandrel 61 that are indexed at Stations S7. The two shafts 602 at Station S6 are interconnected by a vertically extending stub shaft 607 which is received in adjacent hubs formed in split blocks 608 and 609 that are rigidly secured to the upper and lower tubular shafts 602, respectively, at Station S6. Similarly, the shafts 602 at Station S7 are connected together by a vertical stub shaft 611 (FIG. 51) that is received by split blocks 612 that are rigidly secured to the shaft 602 at station S7.

The four shafts 602 are simultaneously reciprocated toward and away from the associated mandrels by a cam groove 613 in the aforementioned continuously driven cam 272 (FIGS. 13 and 50). A cam follower 614 is journaled on one end of an actuating lever 616 and is received in groove 613 thereby swinging the lever 616 about the axis of a pivot bolt 618 that pivotally receives the other end of the lever and supports the lever 616 from the floor 619 of the subframe 606. Two spaced, vertically extending bearing housings 621 and 622 (FIGS. 50 and 51) which are interconnected by a web 623 are also bolted to the floor 619 of the subframe 606 and pivotally receive heating head actuating shafts 624 and 626, respectively. One end of an arm 627 is rigidly secured to a portion of the shaft 624 that projects below the floor 619 of the frame 606. The other end of the arm 627 is pivotally connected to the lever 616 by a link 628. Thus, pivotal movement of the actuating levers 616 also causes pivotal movement of the shaft 624.

The shafts 624 and 626 having meshing gears 629 and 631 of equal size keyed thereon, and accordingly the shafts 624 and 626 pivot equal amounts in opposite directions. Levers 632 and 633 (FIG. 51) are secured to the upper ends of the shaft 624 and 626, respectively, and have forked ends which slidably receive the stub shafts 606 and 611. Accordingly, rotation of the cam 272 through one complete revolution will cause the heating heads to move toward and away from the associated mandrels while the mandrels are indexed at Stations S6 and S7 and will permit other mandrels to move into Stations S6 and S7 prior to starting another cycle of operation.

Each bottom heating head 82 (FIGS. 52 and 53) comprises a housing 635 which defines a plenum chamber 636 that is secured to the plate 601 by capscrews 637 and has a combination temperature gauge 638 and thermocouple screwed therein to indicate the temperature of the air entering the head 82. The plenum chamber housing 635 includes a skirt 639 that is sealed in airtight engagement against plate 601 and is integral with an end distribution wall 641. The wall 641 is provided with large apertures 642 and 643 near its ends, and with a plurality of smaller apertures 644 between the apertures 642 and 643. An intermediate wall 645 and stiffening ribs 646 are provided to assure that the housing 645 will be of sufficient rigidity. Ports 647 and 648 in the wall 645 establish a free flow of hot air from the tubular shaft 602 into the plenum chamber 636.

The hot air from the plenum chamber 636 flows through apertures 642 and 643 into outer distribution chambers 651 and 652, respectively, which directs air against certain outside surfaces of the bottom closure flaps. Hot air is also directed through the small apertures 644 into an inner chamber 653 which directs the hot air against certain internal surfaces of the bottom closure BC.

The outer distribution chambers 651 and 652 are identical and are each defined by a housing 654 which includes an outer rectangular wall 656, sidewalls 657 and 658, an end wall 659, an inwardly directed perforated, triangle-shaped distribution wall 661, and two perforated trapezoidal walls 662 and 663, all connected together to define the open-ended housing 654. A pair of capscrews 666 are extended through openings in the intermediate wall 645 and are screwed into the end wall 659 to clamp the open end of the housings 654 of the outer distribution chamber 651 and 652 into fluidtight engagement around the associated aperture 642 and 643 in the end wall 641 of the plenum chamber 636. Since application of heat to the bottom closure flaps tends to return the flaps to the open-ended rectangular position, spacer bars 667 are welded to the triangle-shaped walls 661 to prevent such spreading of the preformed flaps.

Figure 52:
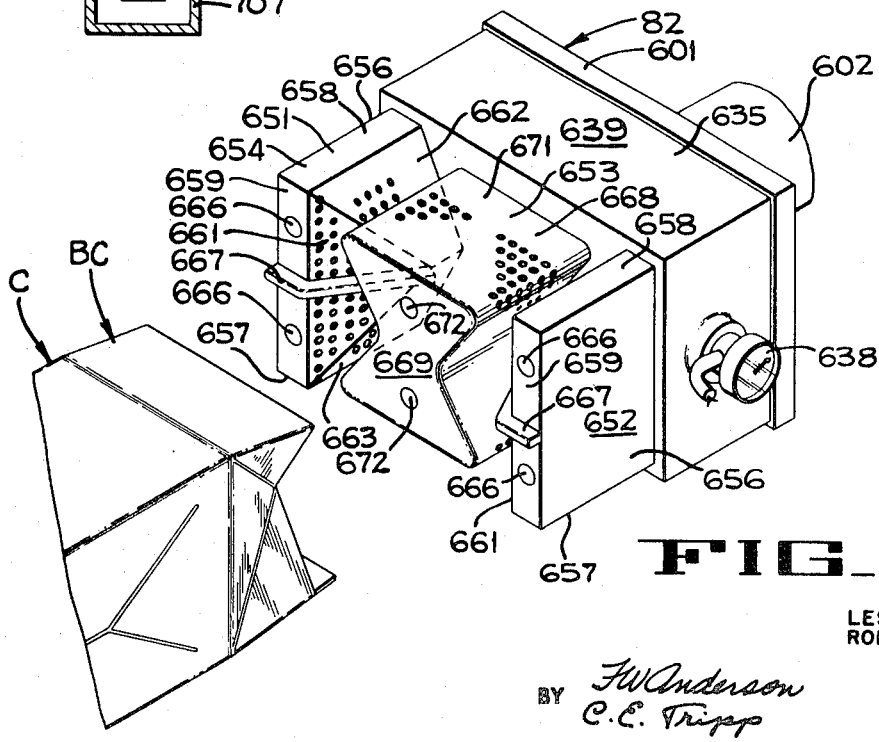
FIG. 52 is an enlarged perspective of one of the bottom heating heads shown associated with the bottom closure of a carton.

As best illustrated in FIG. 52, the inner chamber 653 is defined by an open-ended housing 668 generally X-shaped cross section having an end plate 669 secured to a perforated skirt 671. The housing 668 is clamped against the end wall 641 of the plenum chamber 635 by capscrews 672 which extend through holes in a portion of the intermediate wall 644 and are screwed into a threaded boss formed in the end plate 669 of the housing 668. It will be noted that the location and distribution of the perforations on the skirt 671 of the inner chamber 653, and on the walls 661, 662 and 663 of the outer distribution chambers 651 and 652 are such that hot air will be directed at only those surfaces of the bottom closure BC which are subsequently sealed together. It will be also be observed that the shape of the perforated walls of the chambers 651, 652 and 653 conforms to the shape of the preformed bottom closure BC.

In order to direct low pressure, hot air at approximately 800° F. to the bottom heating heads 82, the bottom heater 84 includes an air heating and control mechanism 676 (FIGS. 49, 50 and 54 to 57) which receives cool, sterile air from a blower system which is fully described in the parent application. A volume of low pressure, sterile air in excess of that required by the bottom heating heads 82 is directed from a conduit 677 into an elbow 678 (FIG. 54) past a butterfly valve 679. The butterfly valve 679 is adjusted and is locked in adjusted position to assure that a desired proportion of the air from the low pressure supply enters the mechanism 676. The air then flows into a distribution manifold 681 having a plurality of radial passages 682 therein. Each passage 682 communicates with a tubular heater housing 683 and with a flow control discharge port 684. Each discharge port 684 is partially closed by a conical valve 686 that is supported by an adjustment bolt 687 screwed into an upstanding flange 688 of the distribution manifold 681. Each conical valve 686 is spaced a desired amount from the associated discharge port 684 and is locked in adjusted position by a locknut 689 so as to permit a certain proportion of the air entering the distribution manifold 681 to be discharged past the valves 686 to the atmosphere. Accordingly, the volume of air flowing downwardly within each tubular heating housing 683 and past a heating coil 691 therein, may be controlled with the result that temperature at the heating heads 82 may be maintained at approximately 800° F. Each heating coil 691 (only one being shown in FIG. 54) is connected by a conductor 692 to a junction box 693 located at the upper end of the heating and control mechanism 676 and connected to a suitable source of electrical power.

The lower end of each heating housing 683 (FIG. 54) is secured in airtight relation to an associated sleeve 694 formed integrally with the upper wall 696 of an upper distribution housing 697 which defines an annular hot air chamber 698 therein. The upper housing 697 includes a central hub 699 having a cap 701 bolted to its upper end. A vertical shaft 702 (FIG. 54) having a reduced diameter upper portion 703 projecting into the hub 699 and into the cap 701 is provided with a mounting flange 704 that is bolted to a lower wall of a lower distribution housing 706 which serves as a support frame and manifold for the air heating and control mechanism 676. The lower distribution housing 706 also communicates with the upper housing 697 through passages soon to be described and serves as a conduit to direct the hot air to the bottom heaters 82 at Stations S6 and S7.

As indicated in FIG. 49, the lower housing 706 is somewhat triangular in shape, and has one apex supported by and communicating with a rectangular housing 707 that is bolted in fluidtight engagement through the wall 604 of the bottom heater subframe 606 at Station S6. Another apex of the lower housing 706 is supported by and communicates with the rectangular housing 708 that is bolted to the wall 604 at Station S7 (FIG. 51). The third apex of the housing 706 is supported by a vertical post 709 secured to a hub 711 of the subframe 606 as best illustrated in FIG. 50. It will be noted that the free ends of the tubular shafts 602 which support the bottom heating heads 82 project into the associated rectangular housings 707 or 708. Thus, all the hot air which enters the lower housing 706 will eventually flow out of the bottom heating heads 82. A thermocouple 712 is inserted into the upper housing 697 to sense the temperature of the air therein.

In order to prevent scorching of cartons positioned at the bottom heating Stations S6 and S7 during temporary stops of the bottom forming turret 58, and yet prevent cooling of the heating heads 82 or flow passages to the heads, a rotary control valve 716 (FIGS. 54—57) is provided between the upper distribution housing 697 and the lower distribution housing 706. The rotary control valve 716 comprises a centrally apertured disc 717 (FIG. 54) which is pivotally mounted about an annular lip 718 projecting downwardly from the bottom wall 719 of the upper distribution housing 697 and resting on a nylon disc 721 secured to the upper wall of the lower housing 706. A compression spring 722 is positioned around the reduced portion 703 of the shaft 702 and bears against the cap 701 and a washer 723 supported on a shoulder 724 formed on the shaft 702. The spring 722 serves to support a portion of the weight of the upper housing 697 and parts carried thereby.

As best shown in FIG. 49, a pneumatic cylinder 726 is pivotally supported by a utility post 727 and has its piston rod 728 pivotally connected to an arm 729 secured to and projecting outwardly from the disc 717. The pneumatic cylinder 726 holds the disc 717 in the position illustrated in FIG. 55 during normal operation, and shifts the disc 717 to the position shown in FIG. 56 only when the turret 58 is momentarily stopped. When the disc 717 is held in its normal operating position as indicated in FIG. 55, short arcuate slots 731 in the disc near its outer periphery are held out of registration with the corresponding slots 732 in the bottom wall 719 of the upper housing 697 and accordingly prevents air from flowing therepast. At this time, all the heated air entering the upper distribution housing 697 flows into the lower housing 706 through a plurality of circular holes 736 in the floor 719 of the upper housing 697, through a plurality of circular holes 737 in the disc 717, and through a plurality of arcuate slots 738 in the nylon disc 721 and in the upper wall of the lower housing 706. When positioned as above-mentioned, the holes 736, 737 and the slots 738 provide unrestricted flow passages from the upper housing 697 to the lower housing 706.

When the carton forming turret 58 is momentarily stopped with carton blanks indexed at the bottom heating Stations S6 and S7, the pneumatic cylinder 726 is activated by means to be described hereinafter, thereby shifting the disc 717 to the position shown in FIGS. 56 and 57. Shifting of the disc 717 causes the slots 731 and 732 to register thereby diverting the major portion of the hot air to the outer atmosphere away from the bottom heating heads 82 at Stations S6 and S7. However, the holes 737 in the disc 717 remain in partial registration with the holes 736 and slots 738 thereby permitting sufficient hot air to flow through the bottom heating heads 82 to prevent cooling of the heads while maintaining the heads and passages connected thereto at the desired operating temperatures. It will be understood, however, that insufficient hot air will be directed against the cartons to scorch or otherwise injure the cartons. Thus, all cartons which are carried out of Station S7 upon actuation of the carton forming turret 58 are heated to the desired sealing temperature.

ROLLER PLOWS

After the cartons have been given their final heat treatment at Station S7 (FIGS. 2 and 14), they are moved past the roller plows 86 at the bottom folding Station S8. While moving past the roller plows 86 at Station S8, the bottom closure flaps are gradually folded from substantially horizontal positions into substantially vertical positions so as to be received and subsequently sealed by the preliminary bottom sealer 89 at Station S9 and the final bottom sealer 91 at Station S10.

The roller plows 86 include a subframe 746 (FIG. 14) which is bolted to the frame 160 of the forming section 52 adjacent the arcuate path of movement of the upper mandrels 60 and lower mandrels 61. The subframe 76 (FIGS. 58—62) comprises a base 747 having an upstanding inlet bracket 748 and an upstanding outlet bracket 749 welded thereto. Four horizontally disposed, roller supporting bars 751, 752, 753 and 754 are secured to the brackets 748 and 749, the bars 751 and 752 being associated with an upper plow 756 disposed opposite the upper mandrels 60, and the bars 753 and 754 being associated with a lower plow 757 disposed opposite the lower mandrels 61. Since the upper and lower plows are identical the lower mandrels 61. Since the upper and lower plows are identical, only the upper plow will be described in detail.

An upper stationary deflector 758 (FIGS. 58 and 60) of the upper plow 756 is bolted to an angled surface 759 of the inlet bracket 748 and slidably engages the short flap 138 of the bottom closure BC to assure that the short flap 138 will be folded under the lip 137 of the long flap 136 in proper sealing position. A lower inlet roller 761 is journaled on a bolt 762 secured to another angled surface 763 of the inlet bracket 748, which inlet roller engages the long flap 136 and lies in a plane which is substantially perpendicular to the plane of the long flap.

As best indicated in FIGS. 59—62, a series of lower inclined rollers 764 to 764d are journaled on split blocks 766–766d that are rigidly secured to the lower bar 752, and cooperate with a series of upper rollers 767–767d which are journaled on split blocks 768–768d rigidly secured to the upper bar 751. The cooperating upper and lower rollers progressively spiral from nearly vertical position adjacent the inlet bracket 748 to nearly horizontal positions adjacent the outlet bracket 749 during which time the planes of rotation of the inclined rollers 764 to 764d and 767 to 767d are maintained substantially normal to the planes of the lower and upper carton flaps respectively. A horizontally disposed upper discharge roller 769 (FIG. 62) is journaled on a capscrew secured to a horizontal surface of the outlet bracket 749, while a similar horizontally disposed lower discharge roller 771 is journaled on a capscrew 772 which is secured to another horizontal surface of the bracket 749.

Thus, it will be noted that the stationary deflector 758, the upper inclined rollers 767–767d, and the upper discharge roller 769 engage the short flap 138 and gradually deflect it from a substantially horizontal to a substantially vertical position as the turret 58 moves the carton past Station S8. At the same time, the long flap 136 is progressively engaged by the inlet roller 761, the lower inclined rollers 764–764d, and the discharge roller 771 which gradually bend the long flap 136 from the horizontal to the vertical position with the lip 137 being disposed outside the short flap 138. It will also be noted that as the end surfaces of the carton are engaged by flap deflecting rollers, that little friction occurs between the flaps and the rollers resulting in an accurate folding operation with little if any tendency for the bottom closure flap to be frictionally forced out of the desired squared position which is necessary for proper sealing.

BOTTOM SEALER

After the heated bottom closure flaps of the cartons have been moved past the roller plows 86 (FIGS. 2 and 14) at Station S8, they are first indexed at Station S9 where the heads 88 of a preliminary bottom sealer 89 squeeze the bottom closure flaps against the heads of the associated mandrel 60 or 61 to partially seal the bottom closures BC. The cartons are then advanced to Station S10 where the heads 90 of a final bottom sealer 91 apply a final sealing pressure to the bottom closures, which final sealing pressure is localized to certain critical areas so as to partially crush the carton material therebelow and positively block all potential flow or leakage passages in the bottom closure BC.

Since the final bottom sealer 91 is substantially the same as the preliminary bottom sealer 89, only the preliminary sealer will be described in detail and parts of the final sealer 91 which are equivalent to those of the preliminary will be assigned the same numerals followed by the letter a.

The preliminary bottom sealer 89 (FIGS. 63 to 66) comprises a subframe 776 which is bolted to the frame 160 of the forming section 52. The subframe 776 includes a base plate 777 which is integral with a tubular hub 778 and an upstanding bracket 779. A vertically extending, head actuating body 781 is pivotally mounted in the hub 778 on bearings 782 and 783 (FIG. 64), the bearing 783 being held in position on a reduced diameter portion 784 of the body 781 by locknuts 786. A shroud 787 formed integrally with the body 781 is fitted over the upper end of a tubular hub 778 and is sealed thereto by packing rings 788. An aperture cap 789 is bolted to the lower end of the hub 778 and has an oil seal 791 fitted therein and is rotatably received on the reduced diameter portion 784 of the body 781. The body 781 is pivoted through a predetermined arcuate range relative to the subframe 776 by motion imparted to an actuating lever 792 which is rigidly clamped on the lower end of the reduced diameter portion 784 of the body 781.

A pair of ears 793 are integral with and project outwardly from the side of the body 781 near the upper end thereof. One end of a toggle link 794 is received on a bolt 795 journaled in the ears 793. The other end of a toggle link 794 receives a pivot bolt 796 that is journaled in bearings 797 fitted in a pair of parallel arms 798 of a bellcrank 799 (FIG. 66) which includes a hub 801 and a second pair of parallel arms 802 (FIG. 66) projecting outwardly from and formed integrally with the arms 798. The hub 801 of the crank 799 is pivoted about a bolt 803 that is secured to the bracket 779 (FIG. 65) while the free ends of the arms 802 are pivoted on a bolt 804 secured to a sealing head mounting bracket 806 having a control arm 807 formed integrally therewith and projecting outwardly therefrom. The free end of the control arm 807 is pivotally connected by a bolt 808 to one end of a link 809. The other end of the link 809 is pivoted on a reduced diameter stub shaft 811 formed on the upper end of the body 781.

As best shown in FIGS. 63 and 65, the pair of preliminary bottom sealing heads 88 are each secured to the mounting bracket 806 by four bolts 816 which are slidably received in holes in the bracket 806. A compression spring 817 encompasses each bolt and is disposed between the bracket 806 and the associated head 88. The springs 817 urge the associated head 88 outwardly with sufficient force to insure proper sealing of the bottom closure flaps but will yield prior to applying a force strong enough to adversely affect the bottom closure seal. A sealing pressure within the range of 300 to 400 p.s.i. gauge has been found to be adequate to properly seal the bottom closures.

As indicated in FIG. 64, one head 88 is disposed in alignment with the upper mandrel 60, while the other head 88 is disposed in alignment with lower mandrel 61 at Station S9. A flat faced carton engaging pressplate 818 (FIG. 68) is bolted to each preliminary sealing head 88 and has beveled lead-in edge 819 which aids in guiding the carton from the roller plows 86 into proper sealing position. Each pressplate 818 is provided with a horizontal groove 821 which accommodates the extra wall thickness due to the lip 137 (FIG. 70 and 72) of the long flap 136 overlapping a portion of the short flap 138.

Since the plates 818 are heated by the hot bottom closure flaps being sealed, cooling water is circulated through passages 822 in each head 88 from supply conduits 823 (FIG. 63) to discharge conduits 824 thereby cooling the heads.

In order to actuate the preliminary bottom sealer 89 and final bottom sealer 91, a double armed bellcrank 827 (FIGS. 63 and 67) is pivotally mounted on a vertically extending shouldered shaft 828 which is rigidly secured to and projects downwardly from a bracket 829 by a nut 831 that is screwed on the upper end of the shaft 828. The bracket 829 is bolted to the frame 160 adjacent the previously described, continuously driven cam 288 (FIG. 13).

The bellcrank 827 is of two-piece construction and includes a hub 832 which is pivotally mounted on bearings 833 and 834 secured to the shaft 828 by locknuts 836. A crank arm 837 is formed integrally with the hub 832 and has a cam follower 838 journaled thereon which is received in a cam groove 839 in the cam 288. A cap 841 having arms 842 and 843 (FIG. 63) projecting outwardly therefrom is bolted to the hub 832. An adjustable link 844 (FIG. 63) pivotally connects the arm 842 to the actuating lever 792 of the preliminary sealer 89, while a similar link 846 pivotally connects the arm 843 to the actuating lever 792a of the final sealer 91. Thus, pivotal movement of the bellcrank 827 by the cam 288 causes the bottom sealing heads 88 and 90 to be actuated in timed relation with the other components of the forming section 52.

The final bottom sealing heads 90 (FIG. 63 of the final bottom sealer 91, one head being positioned in alignment with the upper mandrel 60 at Station S10 and the other head being in alignment with the lower mandrel 61 at Station S10, are identical the preliminary sealing heads 88 with the exception that press plates 848 (FIG. 69) are substituted for the plates 818. Like the plates 818, the plates 848 each have a beveled lead-in edge 849 and a lip accommodating slot 851 therein. The plate 848 is additionally provided with a plurality of raised generally rectangular bosses 852 and circular bosses 853 which partially crush certain critical areas of the bottom closure flaps to block potential flow passages therein arising from the manner in which the bottom closure flaps are folded.

As illustrated in FIGS. 69 to 72, movement of each final sealing head 90 against the bottom closure BC of the associated carton C caUses a lip 137 to be received in the slot 851 of the pressplate 848 and causes the rectangular bosses 852 and circular bosses 853 to partially crush the carton material along certain fold lines of the bottom closure of the carton. Accordingly, the localized forces affected by the bosses applies a positive indentation in the potential flow areas, which indentations extend transversely across all flow passages in the bottom closure BC resulting in a leakproof bottom closure. In order to firmly resist the sealing pressure applied by the sealing heads, each mandrel includes the previously mentioned flap engaging head 246 with the raised triangular portion 251 on the flap engaging surface. The triangular portion of the head 246 is received opposite the central portion of the lip 137 within a triangular-shaped cavity 854 defined by the flaps 132 and 133 (FIG. 5) which, when folded into sealed position defines double thickness triangle-shaped inner walls 132a and 133a (FIG. 71).

It will be particularly noted that the use of the pressplate 818 having a smooth flap engaging face at the preliminary sealing Station S9, in combination with the roller plows 86 at Station S8 which sharply folds the bottom closure flaps into sealing position, permits the bottom closure flaps to be indexed between the pressplate 818 and flap-engaging head 246 when the plate and head are quite close together as indicated in FIG. 63. Thus, the bottom closure flaps do not separate to any measurable extent when they are released from the roller plows 86, and, accordingly, provide for a better seal. Similar close tolerances are maintained between the mandrel head 246 and the pressplate 848 at Station S10 when the final bottom sealer 91 is in the inactive position shown in FIG. 63.

When the preliminary bottom sealer 89 is in the active position of FIG. 66, the sealer 89 is adjusted so that a clearance of approximately 0.35 inches is present between the plate 818 and the raised triangular portion 251 of the mandrel head 246 when no cartons are present on the mandrel. When a carton is present on the mandrel, the spacing between the plate 818 and the mandrel head 246 is determined by the wall thickness of the bottom closure flaps disposed therebetween. The springs 817 obviously are provided so as to accommodate different flap thicknesses. It will be understood that similar tolerances are present at Station S10 between the mandrel head 246 and the pressplate 848. It will also be noted that during application of sealing pressure, the linkages are arranged so that the axes of bolts 795, 796 and 804 lie in a common plane thereby substantially locking the heads in sealing position eliminating the need for prolonged sealing forces being applied directly from the cam 288.

Upon release of the pressure by the final sealing heads 90, the cartons are moved out of station S10 to the unloading station S11 with the bottom closure BC sealed as indicated in FIG. 72.

MANDREL UNLOADING MECHANISM

After the final sealing operation has been performed upon the bottom closure BC at Station S10 (FIGS. 2, 14 and 73), the turret 58 indexes the cartons C at the unloading Station S11. While at the unloading Station S11, the unloading mechanism 92 simultaneously withdraws the cartons from the upper mandrel 60 and lower mandrel 61 and moves the upper carton into position to be deflected into the first accumulator conveyor 64 of the sterilizing and accumulating section 56 while moving the lower carton to an intermediate position below the upper carton. The intermittently driven turret 58 is then actuated to position another set of cartons at station S11 permitting the unloading mechanism 92 to withdraw the second set of cartons from the mandrel 60 and 61 and position them as above described. At the same time, the mechanism 92 moves the first mentioned lower carton from the intermediate position into a position to be directed into the second accumulator conveyor 62 of the sterilizing and accumulating section 56.

The unloading mechanism 92 (FIGS. 73—81) comprises a mandrel unloading carrier 861 and a carton transfer carrier 862 which carriers are slidably mounted on the shaft 863. The shaft 863 (FIGS. 73 and 74) is supported a short distance above the frame 160 of the form section 52 on pedestals 864 and 866, the pedestal 866 being disposed below the path of movement of the lower mandrels 61. The carriers 861 and 862 are held from rotation about the shaft 863 by cam followers 867 and 868, respectively, journaled thereon and slidably received between spaced plates 869 and 871 (FIG. 75) which define a cam track 872. The plates 869 and 871 are held in spaced parallel relationship to each other and to the shaft 863 by capscrews 873 which extend through the plates, through spacers 874, through pedestals 876 and are screwed into the frame 160.

The mandrel unloading carrier 861 is generally L-shaped (FIG. 77) and has a lower horizontal portion 877 to which the cam follower 867 is journaled and includes a vertical arm 878 projecting upwardly from the shaft 863. Four carton engaging stripper fingers 879, 881, 882 and 883 are pivotally mounted on the vertical arm 878, the fingers 879 and 881 cooperating to strip the carton from the upper mandrel 60 which is indexed at Station S11 and the fingers 882 and 883 cooperating to strip the carton from each lower mandrel 61 when at Station S11.

The carton transfer carrier 862 (FIG. 78) has a single stripper finger 884 pivotally mounted thereon and disposed in position to engage the lowermost wall of the lower carton and move the carton from the aforementioned intermediate position into the position to be deflected into the second accumulator conveyor 64.

Since each of the stripper fingers are identical, the description of the stripper finger 879 (FIGS. 79 to 81) will suffice for all.

The finger 879 is pivoted on a bushing 886 (FIG. 81) which is disposed between collars 887 and 888 and clamped rigidly thereagainst by a bolt 889 secured to the vertical arm 878 of the carrier 861. A torsion spring 891 has one end connected to the collar 887 and the other end connected to the hub 892 of the finger 879 and urges the finger into position shown in FIG. 79 wherein a carton engaging surface 893 is disposed in position to engage a carton on the mandrel 60 at Station S11. An abutment surface 894 of the finger 879 is normally urged against a boss 896 on the vertical arm 878 of the carrier 861. Thus, when the unloading carrier 861 is moved to the left as viewed in FIG. 79, the carton engaging surfaces 893 of the fingers 879 and 881 will engage adjacent edges of flaps of the top closure TC of the carton C and will strip the carton from the mandrel 60. It will be noted that the fingers 879 and 881 will pass through the previously described slots in the mandrel 60 and will at no time contact any surface of the mandrel 60.

Prior to returning the reciprocable carrier 861 to the active stripping position shown in FIG. 79, another mandrel 60 is indexed into Station S11. When the carrier 861 is returning to the active position, the surfaces 893a of the fingers 879 and 881 will engage the carton on the mandrel 60 and will pivot the fingers 879 and 881, against the urging of the torsion springs 891, to positions which will permit the fingers to slide over the upper and lower walls, respectively, of the carton until they move free of the carton and snap into the active position shown in FIGS. 79 and 80. It will be apparent that the fingers 882 and 883 operate in an identical manner on the carton disposed on the lower mandrel at Station S11, and that the finger 884 on the transfer carrier 862 operates in a similar manner during reciprocation of the carrier 862.

In order to reciprocate the carriers 861 and 862 in timed relation with the movement of the turret 58 and other components of the forming section 52, and in timed relation with the conveyors 62 and 64 of the sterilizing and accumulating section 56, the pivotal motion of the previously mentioned shaft 529 (FIGS. 13 aNd 27) of the upper loader 74 is employed to drive the mandrel unloading mechanism 92. A crank arm 898 is rigidly secured to the shaft 529 and is pivotally connected to one end of an adjustable link 899. The other end of the link 899 is pivotally connected to an arm 901 which is secured to a vertical extending pivot shaft 902. The shaft 902 (FIGS. 73 and 74) is pivotally mounted on bearings in the frame 160 and has a carrier actuating arm 903 secured on its upper end.

The carton transfer carrier 862, which carrier need not be adjusted to accommodate the four different carton sizes, is pivotally connected to the free end of the carrier actuating arm 903 by an adjustable link 904. When the turret 58 and accumulator 65 are adjusted to handle quart size cartons as indicated in FIGS. 73 and 74, the mandrel unloading carrier 861 is pivotally connected to one end of an adjustable link 906. The other end of the link 906 is connected by a pivot pin 907 to a yoke 908 formed adjacent the free end of the arm 903.

Although the transfer carrier 862 need not be adjusted to accommodate the several different sizes of cartons because the top closures TC of all sizes of cartons will be deposited at the same location when advanced by the carrier 862 into position to be loaded into the second accumulator conveyor 64, it will be appreciated that the mandrel unloading carrier 861 must be adjusted to accommodate each size of carton so as to position the top closures thereof in a common location when the cartons are in position to be loaded into the accumulator conveyors 62 and 64. Accordingly, a second yoke 909 is secured to the arm 903 and is arranged to selectively receive the pivot pin 907 in a ½pint aperture 911, a ⅓ quart aperture 912, or a pint aperture 913. Thus, when cartons other than quart cartons are being processed, the link 906 is pivotally connected to the appropriate aperture 911, 912 or 913 by the pin 907.

Since it is imperative that the vertical arm 878 of the mandrel unloading carrier 861 be moved outwardly of the free end of the mandrels 60 and 61 prior to the indexing of the mandrels, a protective chain link 914 covered by a flexible tube 916 is permanently fixed between the carriers 861 and 862. The link 914 is of sufficient length to draw the carrier 861 out of the path of movement of the mandrels in the event that an operator neglects to attach the free end of the link 906 to one of the yoke 908 or 909.

Since the operation of the several components of the carton forming apparatus 49 of the present invention has been covered with the description of the components, the operation will not be repeated herein. Also, the electric control system which controls the operation of the several components of the carton forming and filling machining 50 including the components of the carton forming apparatus 49 will not be described since the details of the electrical system are not critical to the invention. If a description of the electrical control system or the overall operation of the machine 50 is desired, reference may be had to the parent application.

From the foregoing description, it will be apparent that the carton forming apparatus of the present invention includes a forming turret having a plurality of mandrels thereon which receive open-ended tubular carton blanks thereon with the bottom closure flaps projecting outwardly therefrom. The turret intermittently advances the cartons through a plurality of stations wherein apparatus is provided to seal the bottom closures thereof. The forming apparatus is also adjustable to handle cartons of different sizes.

Although the best mode contemplated for carrying out the present invention has been herein shown and described, it will be apparent that modifications and variations may be made without departing from what is regarded to be the subject matter of the invention as set forth in the appended claims.

We claim:

1. In a carton forming and filling machine having a plurality of stations, a forming apparatus for forming from carton blanks having bottom closures and top closures and for sealing the bottom closures thereof, comprising a forming turret, a plurality of evenly spaced mandrels on said turret projecting radially outward from the axis of rotation of said turret, carton stop means on each mandrel, means for intermittently driving said turret to advance said mandrels past said stations, means at one station for placing an erected carton on each mandrel with its bottom closure outermost and its top closure in engagement with said carton stop means, means at other stations for sealing the bottom closures of the cartons, means at an unloading station for withdrawing the cartons with their bottom closures sealed from the mandrels, and means for adjusting said carton stop means longitudinally of said mandrels for accommodating cartons of different sizes.

2. An apparatus according to claim 1 and additionally comprising resilient carton clamping means secured to said stop means and adapted to engage the top closures of the cartons to hold the carton blanks on the associated mandrels in bottom closure sealing position.

3. An apparatus according to claim 1 wherein said mandrels have slots in opposed longitudinal surfaces thereof, and wherein said means at said unloading station is a reciprocable unloading carrier which includes opposed stripper fingers movable in said opposed slots in each mandrel and arranged to engage the top closure of the carton on the mandrel to strip the carton from the mandrel.

4. An apparatus according to claim 3 wherein said unloading carrier is reciprocated into the path of movement of the mandrels when the mandrels are stationary and when one mandrel is positioned at the unloading station, said carrier being moved out of the path of movement of said mandrels when the mandrels are moved between said stations, means for reciprocating said carrier in timed relation with the movement of said turrets, said opposed stripper fingers being pivotally mounted on said carrier, and resilient means for normally urging said stripper fingers into stripping position in said slots and into engagement with the top closure of the carton at the unloading station, said resilient means being arranged to yield to allow the fingers to ride over surfaces of the carton when the fingers are being moved into stripping position, and to engage the edges of the top closure and strip the carton from the mandrel when the carrier is moving toward the free end of the mandrel.

5. An apparatus according to claim 4 wherein means are provided for adjusting the reciprocable stroke of said carrier in accordance with the size of carton on said mandrel so that said fingers will be moved into stripping position immediately adjacent the finger engaging edges of the top closure thereby minimizing impact with said edges during the carton stripping operation.

6. An apparatus according to claim 1 wherein said one station is a mandrel loading station, said apparatus additionally comprising a magazine adjacent said mandrel loading station for supporting a plurality of flatfolded carton blanks, means for unloading and erecting one carton blank at a time from said magazine and for placing each blank in said mandrel loading station in the form of an open-ended tubular carton blank and reciprocable mandrel loading means driven in timed relation with the movement of said turret for loading each tubular carton blank onto a mandrel when the mandrels are indexed at the loading station.

7. An apparatus according to claim 6 and additionally comprising means for adjusting said magazine to handle carton blanks of different sizes, and means for adjusting said unloading means longitudinally of said mandrels for accommodating cartons of different sizes.

8. An apparatus according to claim 6 and additionally comprising means for overbending each carton blank as it is being moved between said magazine and said mandrel loading station.

9. An apparatus according to claim 6 and additionally comprising means on said mandrel loading means for effecting three point contact with the tubular carton blanks for evenly distributing the pushing force on said blanks.

10. An apparatus according to claim 7 and additionally comprising means for overbending each carton blank as it is being moved between said magazine and said mandrel loading station.

11. An apparatus according to claim 10 and additionally comprising means on said mandrel loading means for effecting three point contact with the tubular carton blanks for evenly distributing the pushing forces on said blanks.

12. An apparatus according to claim 6 and additionally comprising a guideway at said mandrel loading station for receiving each carton blank and for guiding each blank into the mandrel, a pivotal gate in said guideway adapted to be opened for receiving the carton blank and to be pivoted to carton confining position when the carton is being moved onto a mandrel to retain the tubular carton blank in a squared position.

13. An apparatus according to claim 12 and additionally comprising means for adjusting said magazine to handle carton blanks of different sizes, means for adjusting said unloading means longitudinally of said mandrels for accommodating cartons of different sizes, and means for overbending each carton blank as it is being moved between said magazine and said mandrel loading station.

14. An apparatus according to claim 6 wherein said erecting means includes a plurality of suction gripping means for gripping large carton blanks and for carrying the carton blanks from said magazine to said mandrel loading station before releasing the blanks at said station, and means for deactivating one of said suction means when handling cartons blanks of a smaller size.

15. In a carton forming and filling machine having a plurality of carton manipulating stations, a forming section for forming from thermoplastic blanks cartons having bottom closures and top closures and for sealing the bottom closures thereof comprising, a forming turret, a plurality of evenly angularly spaced mandrels on said turret projecting radially outward from the axis of rotation of said turret, adjustable means on each mandrel for handling cartons of different sizes, means for intermittently driving said turret for advancing said mandrels past said stations and for indexing said mandrels at each of said stations in turn, means at one station for placing an erected carton blank on each mandrel with its bottom closure outermost, means at a preforming station for engaging flaps of the bottom closure of each carton for folding said flaps inwardly, bottom heating means at a preliminary bottom heating station and at a final bottom heating station cooperating to heat certain thermoplastic portions of the bottom closure flaps to a bonding temperature while said bottom closure flaps are at said heating stations, bottom sealing means at a preliminary bottom sealing station and at a final bottom sealing station cooperating to squeeze the bottom closure flaps between said sealing means and said mandrels to seal the bottom closures, said final bottom heating station being angularly spaced from said preliminary bottom sealing station the same amount as the angular spacing between adjacent mandrels, means for folding the bottom closure flaps into sealing position prior to entering said preliminary sealing station, and means at said discharge station for discharging the cartons from said mandrels, said folding means being disposed between said final bottom heating station and said preliminary bottom sealing station and being effective to fold the bottom closure flaps of the cartons together while being moved between said final heating station and said preliminary bottom sealing station for minimizing heat loss from the bottom closure flaps.

16. An apparatus according to claim 15 wherein said preforming means includes a pair of opposed rollers movable toward and away from the mandrel positioned at the preforming station for engaging and rolling along the outer surface of a pair of opposed bottom closure flaps to deflect said flaps inwardly without scratching the outer surface thereof, and means for resiliently urging said rollers toward each other and against the opposed bottom closure flaps.

17. An apparatus according to claim 15 wherein each bottom sealing means includes a main body and an associated pressplate, and resilient means connecting each plate to its associated body for applying equal sealing pressure to all bottom closures regardless of variation in the thickness of bottom closure walls, and for self-aligning each pressplate with the surface of the bottom closure being sealed.

18. In a carton forming and filling machine, a bottom former for bending the bottom closure flaps of a tubular carton blank inwardly, said bottom closure flaps including an opposed pair of scored flaps provided with V-shaped score lines to encourage inward bending of said flaps and an opposed pair of interconnecting flaps; comprising the combination of a plurality of mandrels, each mandrel supporting a tubular carton blank in a predetermined position with its bottom closure flaps projecting outwardly, carton stop means on each mandrel, a forming head mounting plate, a pair of arms pivotally mounted on said plate, a roller journaled on one end of each of said arms in position to engage an associated one of the scored flaps, resilient means connected to said arms for urging the rollers toward each other, a pair of flap-engaging plows secured to said plate and having converging inner surfaces for engaging said interconnecting flaps, means for reciprocating said plate toward and away from said mandrel causing said rollers to engage and commence bending the scored flaps inwardly prior to said interconnecting flaps being bent inwardly by said plows, and means for adjusting said carton stop means longitudinally of said mandrels for accommodating cartons of different sizes.

19. In a carton forming and filling machine having a plurality of stations, a bottom heater for simultaneously heating the bottom closure flaps of a plurality of thermoplastic carton blanks; comprising means for supporting a plurality of carton blanks at said bottom heating stations with their bottom closure flaps projecting outwardly; drive means for intermittently driving said carton supporting means for indexing the carton blanks at the heating stations for a predetermined interval and for thereafter moving the carton blanks away from said stations; a plurality of heating heads; each head being in alignment with a carton supporting means and being movable toward or away from the associated carton supporting means in timed relation with the movement of the carton blank supporting means; means for directing heat to said heads for heating the themoplastic material on the bottom closure flaps to a bonding temperature; and means for diverting a portion of the heat away from each of said heads in the event said drive means is deactivated and the carton blanks remain in said associated heating station for an interval in excess of said predetermined interval; said means for directing heat to said head including an air distribution manifold, means for directing a volume of sterile air into said manifold in excess of that required for heating the bottom closure flaps of the carton blanks to a bonding temperature, a plurality of open-ended heater housings connected between said distribution manifold and an upper valve housing, a heating element in each heater housing, a plurality of vent valves in said distribution manifold with each vent valve being associated with one of said heater housings, means for separately adjusting each vent valve to vent a certain portion of the air entering said distribution manifold so as to control the volume of air and accordingly the temperature of air flowing past the heating elements to that which will heat the bottom closure flaps to a bonding temperature, a lower valve housing having ports in its upper wall, a pivotal valve disc disposed between said upper valve housing and said lower valve housing and having a plurality of ports therein, said upper valve housing having a plurality of distribution ports in its lower wall in alignment with the ports in said lower valve housing and having vent ports for venting air to the atmosphere, means for directing the hot air in said lower valve housing to and through said heating heads for heating certain portions of the thermoplastic material on the bottom closure flaps to a bonding temperature, power means for normally holding said pivotal valve in position wherein certain ports therein register with the aligned ports in said upper housing and in said lower housing to direct all the hot air into said heating heads, said power means adapted to shift said pivotal valve to a position wherein said vent ports are open and said aligned ports are partially closed in the event said drive means is deactivated and the carton blanks remain in said associated heating stations for an interval in excess of said predetermined interval.

20. In a carton forming and filling machine, a bottom sealer for sealing the bottom closure flaps of a thermoplastic carton which flaps are heated to a bonding temperature and are folded into sealing position, the combination of means for supporting a carton blank with its bottom closure flaps folded in sealing position and for resisting sealing pressure applied to the flaps, a sealing head support bracket, means for moving said bracket through a predetermined range toward and away from said carton supporting means, a sealing head, means slidably connecting said sealing head to said bracket for movement with said bracket against the folded bottom closure flaps, and prestressed resilient means disposed between said bracket and said head for yielding after said head has been moved into sealing engagement with the bottom closure flaps so as to apply equal sealing pressure to the bottom closure flaps regardless of slight variations in thickness.

21. An apparatus according to claim 20 wherein said slidable connecting means also mounts said head for self-aligning movement relative to said bracket about axes normal to each other, and wherein said prestressed resilient means accommodates self-aligning movement of said head relative to the bottom closure flaps.

22. An apparatus according to claim 20 wherein said slidable connecting means includes a plurality of bolts loosely received in said head and secured to said bracket for slidably connecting said head to said bracket and to permit self-aligning movement of said head relative to said bracket, and a plurality of compression springs with one spring being received around an associated one of said bolts and between said head and said bracket, said springs being prestressed to provide a predetermined sealing force and to permit self-alignment of said head relative to the bottom closure flaps.

23. In a carton forming and filling machine, a bottom sealer for sealing the bottom closure flaps of a thermoplastic carton which flaps are heated to a bonding temperature and are folded into sealing position, the combination of means for supporting a carton blank with its bottom closure flaps folded in sealing position and for resisting sealing pressure applied to the flaps, a sealing head support bracket, means for moving said bracket through a predetermined range toward and away from said carton supporting means, a sealing head, means slidably connecting said sealing head to said bracket for movement with said bracket against the folded bottom closure flaps, prestressed resilient means disposed between said bracket and said head for yielding after said head has been moved into sealing engagement with the bottom closure flaps so as to apply equal sealing pressure to the bottom closure flaps regardless of slight variation in thickness, said slidable connecting means also mounting said head for self-aligning movement relative to said bracket, said prestressed resilient means accommodating self-aligning movement of said head relative to the bottom closure flaps, a sealing head actuating body mounted for pivotal movement about an axis through a predetermined arcuate range, a stabilizing arm secured to said bracket and projecting rearwardly therefrom, a link pivotally connected between said arm and said sealing head actuating body for maintaining said sealing head substantially parallel to said folded bottom closure flaps, a crank having one end pivoted about a fixed axis, means pivotally connecting said bracket to the other end of said crank, an actuating lever secured to and projecting outwardly from said actuating body, a toggle linkage, a first pivot pin pivotally connecting one end of said toggle linkage to said crank intermediate the ends thereof, a second pin pivotally connecting the other end of said toggle linkage to said actuating lever, and means for pivoting said actuating body through a predetermined arcuate range wherein said first pivot pin, said second pivot pin and the axis of said actuating body lie in a common plane when sealing pressure is being applied against carton flaps thereby reducing the torque applied to said body to a minimum when applying the requisite sealing pressure to the flaps.

24. In a carton forming and filling machine a bottom sealer for sealing the bottom closure flaps of a thermoplastic carton which flaps are heated to a bonding temperature and are folded into sealing position, the combination of an intermittently driven turret, a mandrel on said turret movable by said turret between a preliminary sealing station and a final sealing station, said mandrel having a thermoplastic carton blank thereon with its bottom closure flaps heated to a bonding temperature and folded in sealing position, a preliminary sealing head support bracket at said preliminary sealing station, means for moving said bracket through a predetermined range toward and away from the mandrel indexed at said preliminary station, a sealing head having a flat unobstructed sealing plate thereon in position to engage the carton flaps, said sealing plate having a groove therein to accommodate overlapping portions of flaps being sealed together, means slidably connecting said sealing head to said bracket, prestressed resilient means disposed between said head and said bracket, a final sealing head support bracket at said final sealing station, means for moving said final support bracket through a predetermined range toward and away from the mandrel indexed at said final station, a final sealing head having an embossed sealing plate thereon in position to engage the carton flaps, means for slidably connecting said final sealing head to said final sealing bracket, prestressed resilient means disposed between said final sealing head and said final sealing bracket, and means for intermittently driving said turret in timed relation with the movement of said heads so as to apply a substantially equal sealing force to all areas of the bottom closure flaps when the mandrel is at said preliminary sealing station and to apply localized sealing forces at specific areas of the bottom closure flaps when the mandrel is indexed at the final heating station.

PO-1050
(5/69)

UNITED STATES PATENT OFFICE
CERTIFICATE OF CORRECTION

Patent No. __3,566,762__  Dated __March 2, 1971__

Inventor(s) __LESLIE VADAS ETAL__

It is certified that error appears in the above-identified patent and that said Letters Patent are hereby corrected as shown below:

Column 4, line 33 - after "enlarged" insert -- vertical --.
Column 4, line 46 - change "closure" to -- closures --.
Column 7, line 39 - after "the" (second occurrence) insert -- cartons are --. Column 8, line 44 - after "16 " delete "of" (first occurrence). Column 9, line 13 - change "2030" to -- 2 Column 12, line 64 - change "386" to -- 385 --. Column 14, 68 - after "and" insert -- 29) --. Column 14, line 70 - after "blank" delete "pushes the". Column 16, line 12 - change "47 to -- 497a --. Column 16, line 35 - after "BC" insert -- ( Column 17, line 42 - change "substantially" to -- subsequent Column 17, lin 44 - change "48" to -- 49 --. Column 17, line after "received" insert -- in --. Column 19, line 6 - after delete "be". Column 21, line 3 - delete "since the upper and lower plows are identical". Column 21, line 4 - delete "the lower mandrels 61." Column 22, line 31 - change "65" to -- 6 Column 23, line 21 - change "caUses" to -- causes --.

Column 25, line 18 - cha "aNd" to -- and --. Column 25, line 66 - change "machining" to -- machine --. Column 26, line 16 - after "blanks" insert -- cartons --.

Signed and sealed this 14th day of March 1972.

(SEAL)
Attest:

EDWARD M. FLETCHER, JR.
Attesting Officer

ROBERT GOTTSCHALK
Commissioner of Patents